United States Patent [19]
Kadlec et al.

[11] Patent Number: 5,684,650
[45] Date of Patent: Nov. 4, 1997

[54] DIGITAL SERVO CONTROL SYSTEM FOR USE IN DISK DRIVES

[75] Inventors: Ronald James Kadlec, Colorado Springs, Colo.; Thomas James Frederick, Coconut Creek, Fla.; Paul Henry Kelley, Boca Raton, Fla.; Philip Saxton Weilbacher, Coconut Creek, Fla.

[73] Assignee: Rodime, PLC, Santa Fe, N. Mex.

[21] Appl. No.: 202,371

[22] Filed: Feb. 25, 1994

Related U.S. Application Data

[60] Division of Ser. No. 856,954, filed as PCT/US91/06602, Sep. 17, 1991, Pat. No. 5,646,797, which is a continuation-in-part of Ser. No. 583,972, Sep. 18, 1990, abandoned.

[51] Int. Cl.[6] .................................................. G11B 5/596
[52] U.S. Cl. .................................. 360/77.06; 360/77.04; 360/78.14; 369/48; 369/54
[58] Field of Search .......................... 360/77.08, 77.06, 360/77.07, 78.04, 77.02, 78.14, 67, 65, 25, 27, 31, 1; 369/48, 54, 124

[56] References Cited

U.S. PATENT DOCUMENTS

| | | | |
|---|---|---|---|
| 3,458,785 | 7/1969 | Sordello | 360/77.11 |
| 3,881,184 | 4/1975 | Koepcke et al. | 369/32 |
| 4,057,832 | 11/1977 | Kappert | 358/342 |
| 4,135,217 | 1/1979 | Jacques et al. | 360/77.09 |
| 4,412,161 | 10/1983 | Cornaby | 318/561 |
| 4,486,797 | 12/1984 | Workman | 360/78.07 |
| 4,536,809 | 8/1985 | Sidman | 360/77.04 |
| 4,575,776 | 3/1986 | Stephens et al. | 360/78.09 |
| 4,590,526 | 5/1986 | Laatt et al. | 360/78.14 |
| 4,591,933 | 5/1986 | Quackenbush | 360/78.07 |
| 4,616,276 | 10/1986 | Workman | 360/77.04 |
| 4,638,383 | 1/1987 | McGinlay et al. | 360/77.08 |
| 4,679,103 | 7/1987 | Workman | 360/78.07 |
| 4,755,977 | 7/1988 | Abed | 369/32 |
| 4,775,903 | 10/1988 | Knowles | 360/78.07 |
| 4,783,705 | 11/1988 | Moon et al. | 360/77.08 |
| 4,786,990 | 11/1988 | Overton et al. | 360/65 |
| 4,788,608 | 11/1988 | Tsujisawa | 360/77.04 |
| 4,803,572 | 2/1989 | Haruna et al. | 360/60 |
| 4,821,125 | 4/1989 | Christensen et al. | 360/46 X |
| 4,823,212 | 4/1989 | Knowles et al. | 360/77.08 |
| 4,835,632 | 5/1989 | Shih et al. | 360/78.14 |
| 4,835,633 | 5/1989 | Edel et al. | 360/78.12 |
| 4,879,612 | 11/1989 | Freeze et al. | 360/78.06 |
| 4,890,172 | 12/1989 | Watt et al. | 360/77.04 |
| 4,907,107 | 3/1990 | Sukurai | 360/77.04 |
| 4,907,109 | 3/1990 | Senio | 360/78.04 |

(List continued on next page.)

FOREIGN PATENT DOCUMENTS

| | | |
|---|---|---|
| 0 249 020 | 4/1987 | European Pat. Off. . |
| 0 353 767 | 8/1989 | European Pat. Off. . |
| 0 390 467 | 3/1990 | European Pat. Off. . |
| 37 13 397 | 10/1987 | Germany . |
| 57-127904 | 8/1982 | Japan .................. 360/67 |
| 59-154629 | 9/1984 | Japan .................. 360/67 |
| 63-316380 | 12/1988 | Japan . |
| 90/10930 | 9/1990 | WIPO . |

OTHER PUBLICATIONS

D.H. Pennington et al, "Digital Velocity Reference Curve Anticipator," *IBM Technical Disclosure Bulletin*, vol. 26, No. 3B, Aug. 1983, pp. 1741 and 1742.

J.P. Mantey, "Offset Force Correction for Disk File," *IBM Technical Disclosure Bulletin*, vol. 21, No. 5, Oct. 1978, pp. 1792–1794.

*Primary Examiner*—Andrew L. Sniezek
*Attorney, Agent, or Firm*—Reid & Priest, L.L.P.

[57] ABSTRACT

A servo control system provides adaptive compensation for a variety of tracking and seek problems found in disk drives. The servo control system is ideally implemented in digital form for accuracy, speed and compactness. A first embodiment includes two modes, a tracking (or position) mode and a seek (or velocity) mode, each mode employing a variety of compensation functions. A second embodiment includes a single comprehensive control system which functions during both tracking and seek operations.

15 Claims, 30 Drawing Sheets

U.S. PATENT DOCUMENTS

| | | | |
|---|---|---|---|
| 4,914,644 | 4/1990 | Chen et al. | 369/43 |
| 4,914,725 | 4/1990 | Belser et al. | 318/560 |
| 4,942,564 | 7/1990 | Hofer et al. | 369/58 |
| 4,954,909 | 9/1990 | Sengoku | 360/78.04 |
| 4,969,059 | 11/1990 | Volz et al. | 360/78.04 |
| 5,038,333 | 8/1991 | Chow et al. | 369/44.28 |
| 5,047,880 | 9/1991 | Ohno | 360/78.14 |
| 5,109,307 | 4/1992 | Sidman | 360/77.05 |
| 5,182,684 | 1/1993 | Thomas et al. | 360/78.09 |

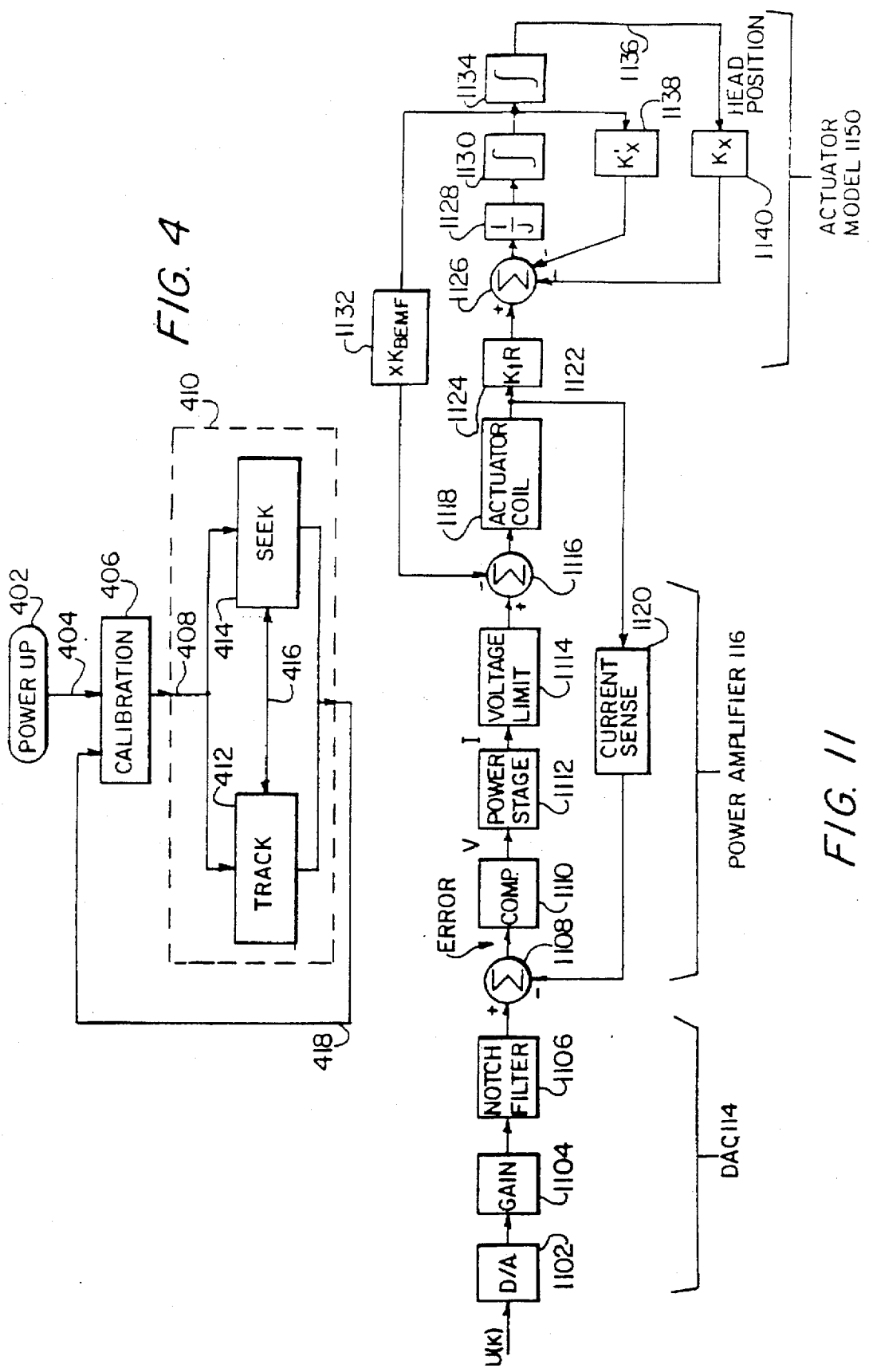

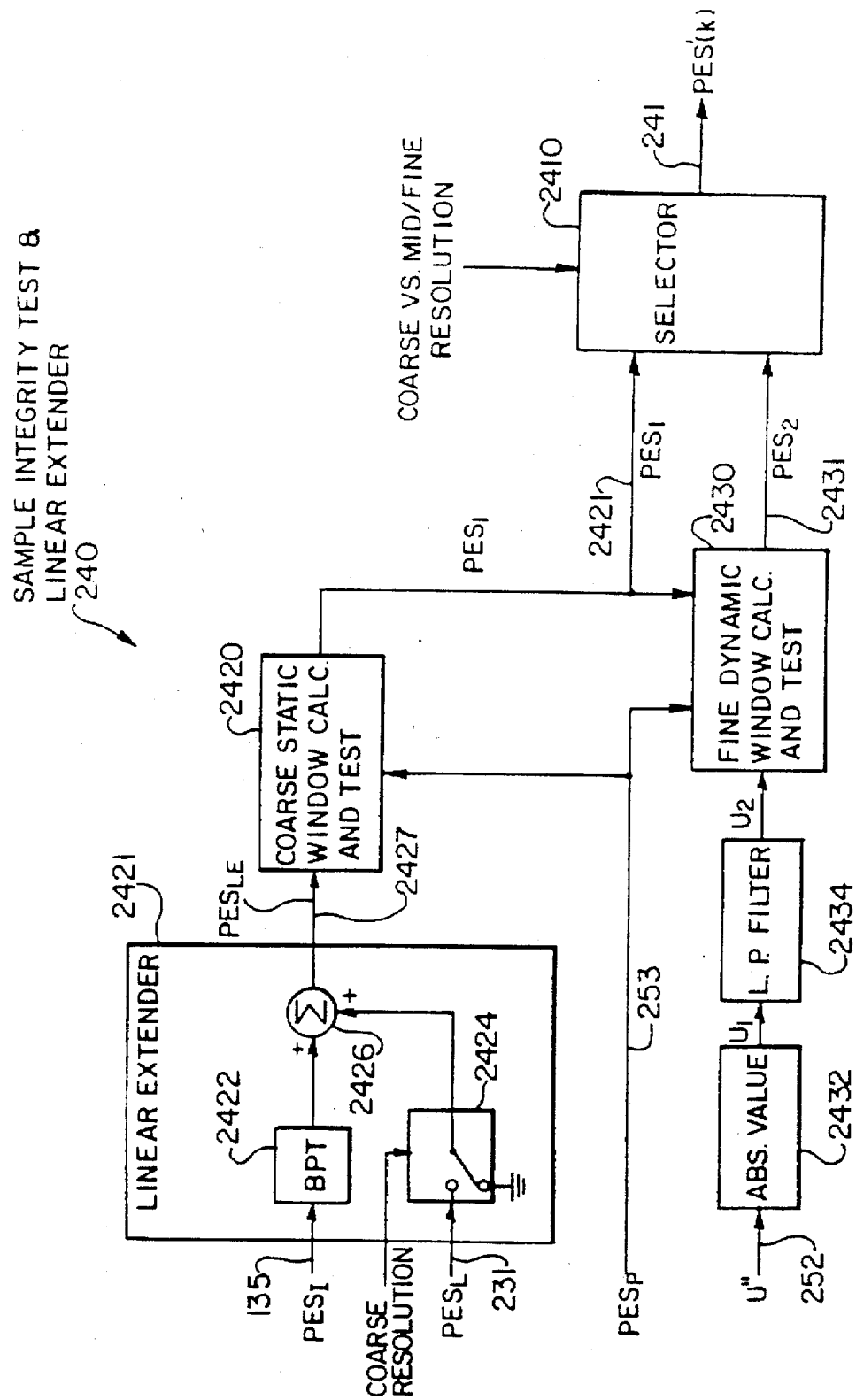

FIG. 23B
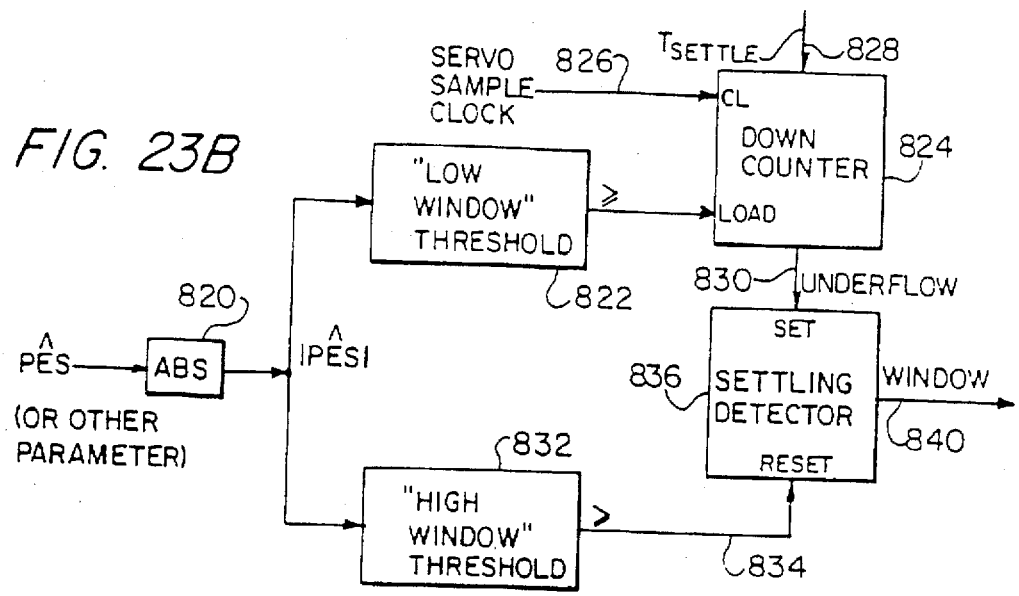
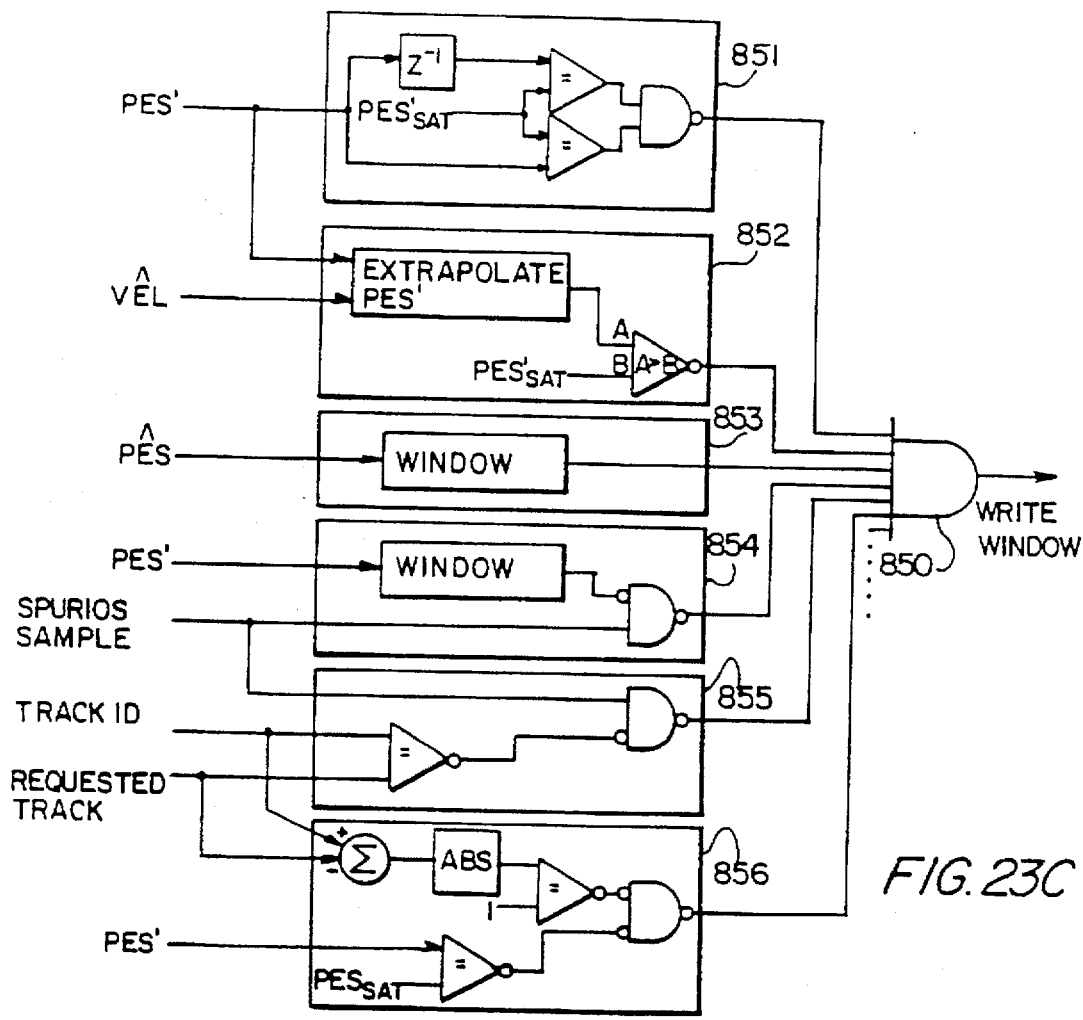
FIG. 23C

DIGITAL SERVO CONTROL SYSTEM FOR USE IN DISK DRIVES

This application is a divisional of Ser. No. 07/856,954, filed May 14, 1992 but granted an official U.S. filing date of Jul. 7, 1992, which is a PCT national phase application of PCT/US91/06602, filed Sep. 17, 1991, which in turn is comparable to a CIP based on U.S. Ser. No. 07/583,972, field Sep. 18, 1990, now abandoned.

TECHNICAL FIELD

The present invention relates to servo control systems which may be used in controlling the head positioning actuators in storage devices such as disk drives. More specifically, the invention relates to digital servo control systems involving efficient implementations of tracking and seeking servo control methods.

BACKGROUND ART AND BACKGROUND OF THE INVENTION

Various servo control systems are known in the art. U.S. Pat. No. 3,458,785 (Sordello) discloses an early example of a servo control system employing quadrature signals for providing position and velocity information, the system having fine and coarse positioning control algorithms. U.S. Pat. No. 4,135,217 (Jacques et al.) discloses a system which compensates for repeatable errors such as wobble of a disk, with stored "run-out" information being used to compensate for the errors. U.S. Pat. No. 4,412,161 (Cornaby) generally discloses a digitally implemented recursive servo control system. U.S. Pat. No. 4,486,797 (Workman) discloses a servo control system in which a preprogrammed velocity profile is used. U.S. Pat. No. 4,783,705 (Moon et al.) discloses an embedded sector servo system divided into separate track and seek control systems, the system including an automatic gain control function. U.S. Pat. No. 4,788,608 (Tsujisawa) discloses a control system for positioning read/write heads over a non-circular track, by using harmonics of the rotation period of the disk. U.S. Pat. No. 4,835,632 (Shih et al.) discloses a servo control system having different sampling and control frequencies for tracking and seek operations, the system apparently scaling or normalizing certain values during operation. U.S. Pat. No. 4,835,633 (Edel et al.) discloses a servo control system involving values calibrated for voice coil motor acceleration as a function of radial position using a polynomial curve fit.

U.S. Pat. No. 4,879,612 (Freeze et al.) discloses a servo control system claiming a purely digital seek mode but a hybrid tracking mode, the system using track identity information and sample testing to reduce errors. U.S. Pat. No. 4,890,172 (Watt et al.) discloses an automatic gain calibration system for a disk drive servo system. U.S. Pat. No. 4,907,107 (Sakurai) discloses a low level circuit for generating signals corresponding to sampled magnetic pulses. U.S. Pat. No. 4,914,644 (Chen et al.) discloses a servo control system including a model of coil current involving comparison of a velocity error to a predetermined value during long seeks, when the power amplifier is saturated. U.S. Pat. No. 4,914,725 (Belser et al.) discloses a servo control system including a "piggy-back" construction including a fine positioner carried by a coarse positioner, the dynamic range of the fine positioner being increased momentarily at the time of track capture, this patent naming a common inventor with an inventor of the present patent application. U.S. Pat. No. 4,942,564 (Hofer et al.) discloses a gain compensation system in which a test signal is introduced to determine the system's response for comparison to a previously stored value. U.S. Pat. No. 4,954,909 (Sengoku) discloses a system for determining movement of a recording head, especially for determining when it has hit a disk surface. U.S. Pat. No. 5,038,333 (Chow et al.) discloses a track-seeking apparatus having a track crossing detector for providing position information, this patent naming an inventor who is also a named inventor in the present patent application.

European Patent Application 0,390,467 (Ogino) discloses a digital servo control system in which certain variables are not calculated when an error value is substantially zero. Japanese Patent Document 63-316380 discloses a control system having a plurality of servo bit sample periods.

These patents, as well as any documents cited in this patent application, are incorporated herein by reference in their entirety.

In the field of magnetic disk drives, servo systems are required to accurately position read/write heads over a given substantially circular track on the disk, as well as efficiently move the heads from above one track to a new desired position above a second track. It is desirable in the "tracking" (or "position") mode that the position of the read/write heads with respect to the track be maintained in the proper center position above the track. Similarly, when moving the heads from one track to another in the "seek" (or "velocity") mode, it is desirable that the heads become stably centered above the destination track as soon as possible. These goals must be met even in the presence of anomalies such as changes to or occurrences in the disk drive mechanism, or deviations from perfect circularity in the tracks. These anomalies may involve aging, temperature changes, changes in orientation of the disk drive, humidity, shock and vibration. Specific performance objectives embodying these broad goals include reduction of tracking error (expressed as a percentage of the radial separation of the tracks), average access time (reflecting the average time required to move the read heads to a destination track in a typical read operation and provide the outside world with data from the disk), and bit error rate (BER, in bits per $10^n$).

Meeting these goals allows the disk drive's performance to be improved. If these goals are not met, misalignment or delayed alignment of the read/write heads with respect to the tracks cause increases in read/write errors and a slowdown in read or write operations.

Further objectives include reduction of the size of the disk drive itself. As recording densities improve, a hindering factor in reducing overall disk drive physical dimensions may be the size of the circuitry required to implement the servo system. Therefore, there is a need to provide a high-performance, reliable, and fast servo control system which is both economic and compact.

More specifically, various schemes are known today for placing position information on the surface of disks so that the position of the head over the disk can be determined. This position information, commonly referred to as servo information, may in some schemes occupy an entire surface of one disk. This "dedicated" scheme has the disadvantage that it occupies a substantial portion of the total area allotted for useful information. For example, in a two-disk system, there are four surfaces. If one of the surfaces is dedicated to servo information, at least 25% of the otherwise useable surface of the disks is used, purely for positioning information. As the physical size of disks becomes smaller with the progress of technology, dedication of an entire disk surface to servo information becomes increasingly unacceptable.

In a second scheme, called an "embedded" servo design, the servo information is recorded on every disk surface along with the user data areas. Although embedded servo designs have increased the servo area efficiency over dedicated schemes, known embedded servo schemes have typically involved complex servo data fields, which has forced larger amounts of disk area to be allocated to the positioning information. As the amount of area dedicated to positioning information increases, either the amount of useable data decreases, or the density of useable data storage increases, both of which are undesirable. Therefore, there is a need in the art to provide a servo control system in which there is no surface dedicated entirely to servo control information, and in which the area allocated to servo control information is reduced to a minimum while maintaining optimum seeking and tracking efficiency.

Known servo systems involve analog circuitry. Use of analog circuitry in servo systems can involve reduced tolerance to noise. Clearly, noise-contaminated signals cause degradation in system performance, so that a commensurate reduction in noise-intolerant components is desirable. Therefore, there is a need in the art to provide a totally digitally-implemented servo control system.

The disadvantages of analog or hybrid circuits are not limited to noise intolerance. Analog or hybrid circuits have typically been larger in size than purely digital circuits. Furthermore, at least partially due to the attempt to partially overcome noise-related problems, analog or hybrid servo control systems have required more than one power supply to be present. Therefore, design objectives such as miniaturization and reduction in the number and output requirements of power supplies, further point out a need for a totally digitally-implemented servo control system.

There are known control systems which are partially implemented using digital hardware. However, many of these systems have several parameters which are frozen at the time of system design, so that the parameters must be selected to be the most acceptable compromise for all operations. For example, the parameters in fixed-parameter systems must be chosen so as to function during both seeking operations and during tracking operations. This compromise degrades performance in each operation, as compared to a system optimized for a tracking operation and optimized separately for a seeking operation. Therefore, there is a need in the art to provide a servo system in which servo parameters may be adaptively changed in accordance with the operation currently being executed by the servo controller.

On a matter related to operation-specific parameter optimization, it is known that age, temperature, humidity, and other environmental factors cause deterioration in system performance. Freezing system parameters at the time of design limits the disk drive's long-term performance under these changing conditions. Therefore, there is a need in the art to provide a servo system in which parameters may be adaptively calibrated over time, as these environmental changes occur.

DISCLOSURE OF INVENTION

The present invention provides a highly adaptive, responsive, comprehensive servo control system allowing stable tracking and efficient seeking in the presence of a variety of structural anomalies and adverse occurrences such as temperature variation, change in physical orientation, shock, vibration, and humidity.

The invention provides adaptive compensation for a variety of tracking and seek problems and is ideally implemented in digital form for accuracy and speed. A controlled entity such as actuator coil current is determined by a control effort signal output from a digital signal processor (DSP) or microcontroller.

In a first embodiment, the DSP may operate in at least a tracking mode or a seek mode. Especially in the first embodiment, repeatable runout which is a function of the angular position of the heads with respect to the rotating disks, and bias which is a function of the radial position of the heads, are adaptively compensated. Further, a one-track seek controller is specially provided within the tracking mode for seeking an adjacent track. A DC offset compensator is provided to correct for offsets in an input position error sensor. In the seek mode, a reference velocity deceleration compensation function is performed to optimize seek and access time for the particular disk drive, this function also being adaptively controlled. Both the tracking servo controller and the seek servo controller may be influenced by a bandwidth compensation function. Compensation for this variety of anomalies is preferably performed in a totally digital manner, speeding operation and simplifying modification of the servo controller's design and parameters.

According to the present invention, especially a second embodiment thereof, an embedded servo design is provided, the servo field occupying a minimal amount of disk surface space. Content of the servo field provides a maximum amount of information to work with a full state-space observer in the servo system. The observer provides predicted state values to allow optimum tracking and seek performance. The servo system is implemented in totally digital form, using firmware to implement a set of functions having dynamically scalable parameters and adaptively calibrated compensation functions. According to the present invention, the digital implementation provides a disk drive with an extremely small form factor, requiring only a single (for example, 5 volt) power supply which consumes a minimal amount of power. Dynamically scaled servo system parameters optimize system performance during successive portions of a seek operation and during close tracking mode. Further, various compensation schemes within the firmware-based servo controller maintain optimum servo performance despite environmental changes and component degradation. Moreover, the compact storage of digital servo information on the disk, and the intelligent prediction models in the servo control system, allow the system to quickly adapt and compensate for unpredictable occurrences, such as vibration and shook, thus making the adaptation and compensation time imperceptible or barely perceptible to the user. In particular, the second embodiment of the present invention allows 120 MB (formatted) storage on four 3.5-inch diameter disk surfaces (two disks), in a package measuring less than 4 inches wide, 1.0 inches high, and 5.75 inches deep.

Other features and advantages of the present invention are apparent from the following Detailed Description of the Preferred Embodiments and the accompanying drawing figures.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

FIG. 4 is a flow chart schematically illustrating the calibration and operational modes provided in the first embodiment of the servo control system;

FIG. 11 is a plant block diagram including a mathematical model of an amplifier and actuator;

FIG. 20A illustrates the linear range extender and the sample integrity tester in greater detail.

FIG. 23B illustrates a basic embodiment of a settling window detector used for detecting whether a given parameter has stably settled to within a given tolerance of a destination value.

FIG. 23C illustrates schematically a more sophisticated settling window detector including multiple tests, this settling window detector especially useful in generating a write window.

In the following Detailed Description of the Preferred Embodiments, the invention is described with reference to first and second embodiments. FIGS. 1A, 1B, 5A, 5B, 11 and 23A apply equally to both embodiments. FIGS. 2–4 and 6–10 apply especially to the first embodiment. FIGS. 12–30 apply especially to the second embodiment. However, it is understood that teachings from one embodiment may readily be applied to the other.

FIRST EMBODIMENT. FIGS. 2 and 3 are the highest level functional diagrams for the first embodiment, FIG. 4 providing the highest level flow chart. FIGS. 5A–10 detail certain functions performed in FIGS. 2, 3, or 4.

SECOND EMBODIMENT. FIG. 12 is the highest level functional diagram for the second embodiment, with FIGS. 13 and 14 being the highest level flow diagrams. FIGS. 14–30 detail certain functions performed in FIGS. 12, 13, or 14.

BEST MODES FOR CARRYING OUT THE INVENTION

Figure 1A:
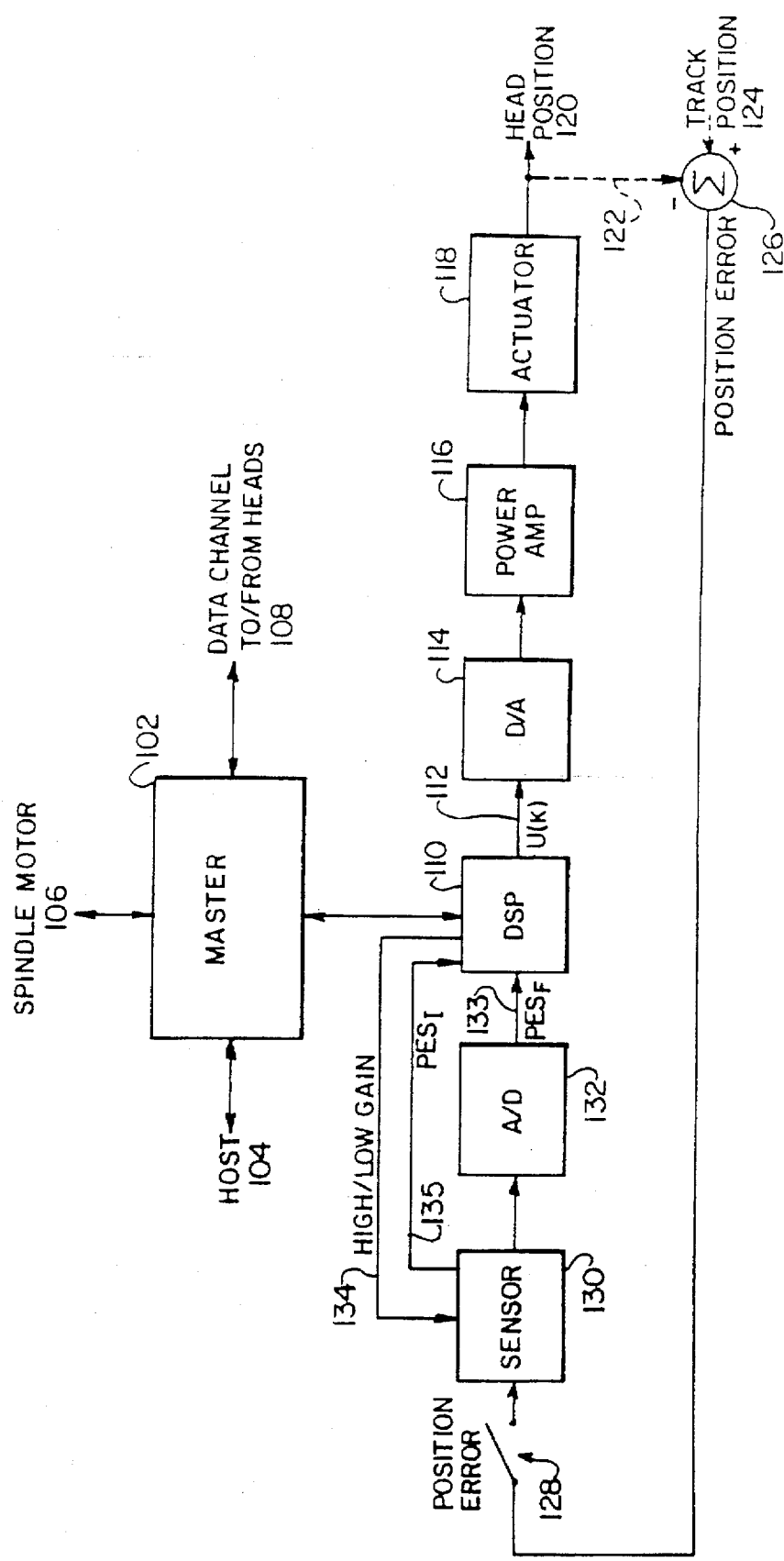
FIG. 1A is a schematic diagram illustrating a preferred embodiment of the servo system according to the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose. Certain elements may be omitted from the drawings and text for clarity or brevity, as they have structures and functions known to those skilled in the art and are readily capable of implementation by such individuals; given the following description and accompanying drawing figures, those skilled in the art are readily capable of implementing the present invention using knowledged possessed by or readily available to them.

The present specification is directed to a digitally servo control system for a storage medium such as a magnetic disk drive. However, many of the functions described and claimed herein may readily be applied to devices other than magnetic disk drives, such as, for example, optical disk drives and other devices. In short, the many features of the invention are applicable to a variety of fields, not limited to those specifically mentioned in this specification.

As is known in the art, a typical disk drive includes one or more disks on which information may be recorded. The disks include a plurality of concentric tracks on which the information is recorded, usually in digital form. Ideally, the tracks are perfectly circular and concentric with the axis of rotation of the disks. However, in practice, the shape of the tracks may vary from the ideal circular shape so that all points on the track are not equidistant from the axis of rotation of the disk.

A typical disk drive further includes read/write heads positioned near the end of an actuator arm. The heads are controlled to move along a path generally (though not usually exactly) along a radial segment projecting from the disks' axis of rotation. The read/write heads may be positioned above any given circular track on the disks. Any deformation of a track makes it more difficult for the head to be continuously positioned over the track as the disks rotate. As seen from a perfectly stationary read/write head, a deformed track would appear to "oscillate" back and forth along a radial line of the disk, as the disks rotate. In order to follow this deformed track accurately, the read/write heads must be controlled with great sensitivity to maintain them in the proper position over the desired track.

The difficulty in moving and positioning the read/write heads is exacerbated by physical shock to the disk drive, as well as mechanical vibrations caused by the disk drive's spindle motor or other vibrating components, and by inertial forces of the actuator mechanism holding the read/write heads. The control problem is complicated by the fact that in most systems, the head positioning actuator itself rotates about an axis beyond the outer diameter of the disks, so that the heads do not traverse a purely radial path over the surface of the disks. Instead, the heads' position above the various tracks is a non-linear function of the rotational position of the head positioning actuator about its own axis.

Typically, the position of the heads is controlled through the interaction of a set of permanent magnets and a "voice coil" disposed on the head positioning actuator. Controlled functions of current are sent through the actuator coil to create magnetic fields which interact with those of the permanent magnets, inducing torque to rotationally displace the head positioning actuator about its axis. Primary control of the position of the heads over the tracks of the magnetic disk drive is thus accomplished through control of the current passing through the actuator's coil. The present invention may also be applied in systems using other means of controlling the positioning the head, including those implementations using, for example, torque motors or servo motors.

The present invention provides a compact, adaptive, responsive servo control mechanism for accurately maintaining the position of read/write heads over a given track on a recording medium; it further provides for quickly moving the heads to a destination track and stably positioning them there. These advantages are provided even in the presence of the above anomalies of the disk, head positioning actuator, and other electrical or mechanical components of the disk drive.

As used in this specification, the term "anomalies" refers generally to quantities which vary from the normal or ideal. The term refers not only to "defects" such as misshapen tracks or traumatic events such as physical shock; the term also encompasses expected variation of some parameter in a properly functioning disk drive, such as variation of bias as a function of the heads' position on the disks. Thus, when it is said that the present servo system compensates for anomalies, it encompasses correction for not only defective or undesirable features, but also for expected deviations variations present in totally "normal" disk drives.

FIG. 1A is a schematic illustration of the servo system according to a preferred embodiment. Some of the blocks shown in FIG. 1A correspond to physical elements on a printed circuit board located in the disk drive, whereas other elements are shown as functional blocks for purposes of illustration. It is to be understood that the present invention may be implemented using any suitable combination of hardware and software, with the functions described herein being suitably allocated to hardware and software elements. Although a particular preferred embodiment involving digital control with assembly language implementation is described in greater detail below, the scope of the invention is not to be limited to any particular embodiment.

Referring to FIG. 1A, a master con,roller 102, or simply "master", is shown operatively connected to control the spindle motor 106 and the data channel 108. The master 102 may be any master controller known in the art such as an INTEL 8032. Usually, the master is a microprocessor disposed on the same printed circuit board as the servo system. The master 102 acts as a supervisor for the disk drive, controlling the speed of the spindle motor 106. It also controls the flow of data in the data channel 108 between the host 104 (typically a computer system in which the disk drive is installed) and the read/write heads. Finally, it issues instructions to, and receiving status signals from, the servo loop 110–132. The master 102 also provides communication between the host 104 and a digital signal processor (DSP) 110 in the servo loop. For brevity, the present specification describes the invention in terms of a DSP, although it is understood that other implementations, such as microcontrollers, may also be used.

Elements 110–132 generally indicate the servo loop to which the present invention is directed. The digital signal processor 110 is shown connected in a loop with a series-connect digital to analog convertor (DAC) 114, a power amplifier 116, the actuator 118, a summer 126, a sampling switch 128, an input position sensor 130, and an analog to digital convertor (ADC) 132 which in turn feeds the digital signal processor 110. Elements 114–132 are typically called the "plant", denoting the system which is controlled by the digital servo control system in DSP 110.

The DSP 110 is advantageously implemented by a single-chip processor, such as the TMS320C15, available from Texas Instruments, Inc., Dallas, Tex. The TMS320C15 includes 4K internal read-only memory (ROM) and 256 16-bit words of random access memory (RAM). In the first embodiment, the DSP executes approximately 2.5 K ROM of assembly language instructions which implement the servo algorithms described in this specification. In the second embodiment, the assembly language occupies approximately 4K ROM. Given the known structure and function of the TMS320C15 and the detailed description of the algorithms provided below and in the accompanying drawing figures, those skilled in the art are readily capable of implementing the algorithms in a disk drive or other apparatus requiring dynamic positioning control. For example, information such as coefficients needed for compensation functions may be stored in the DSP's internal RAM, or may be downloaded from the master, or may be loaded from special tracks on the disks.

The preferred servo system illustrated by elements 110–132 is thus substantially governed by code within the DSP 110. However, it is to be understood that the functions implemented in code may be partially or totally implemented in hardware while remaining within the scope of the invention.

Figure 2:
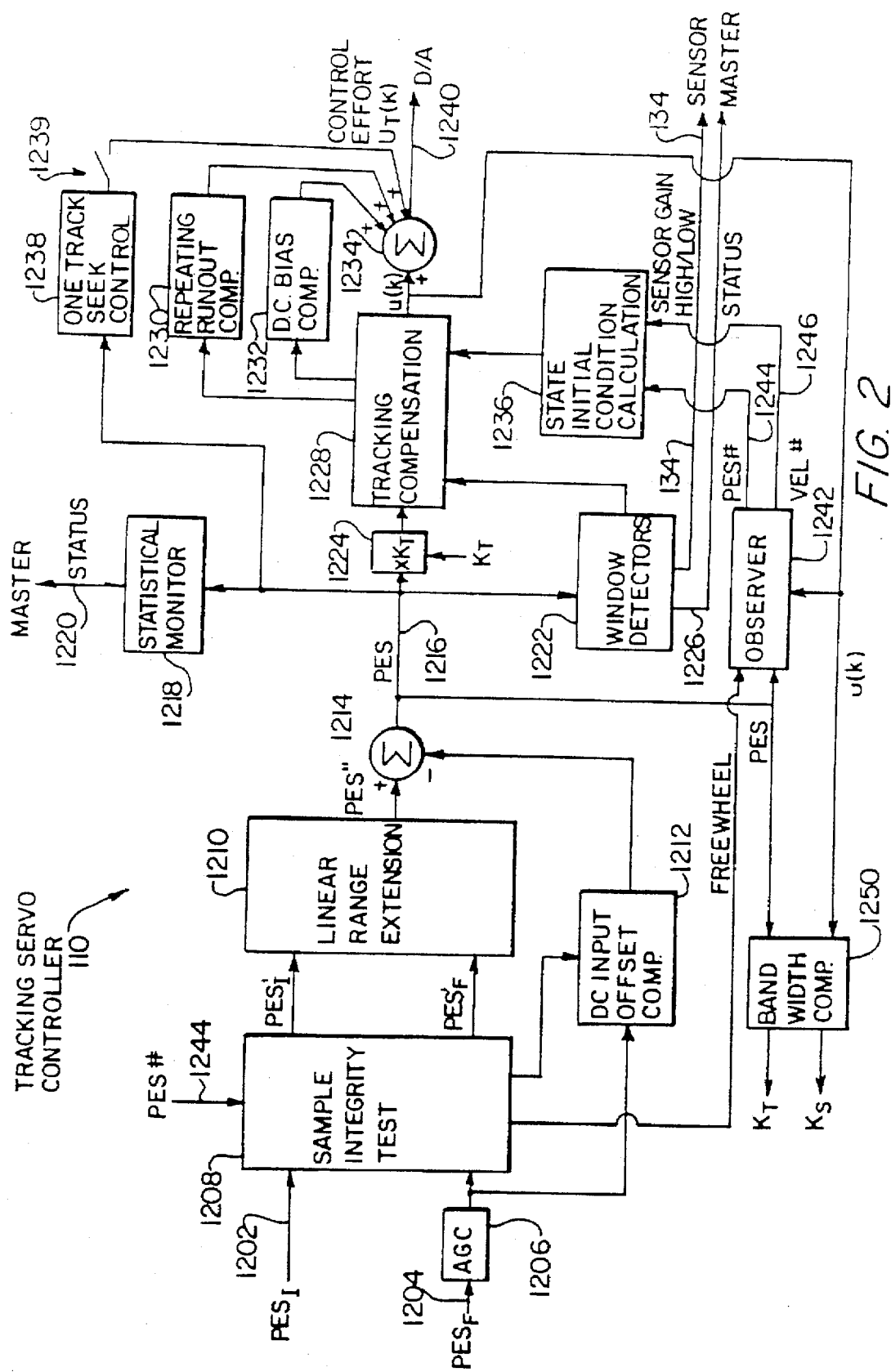
FIG. 2 illustrates schematically a tracking servo controller for maintaining read/write heads over a given track in a first embodiment of the invention.
Figure 3:
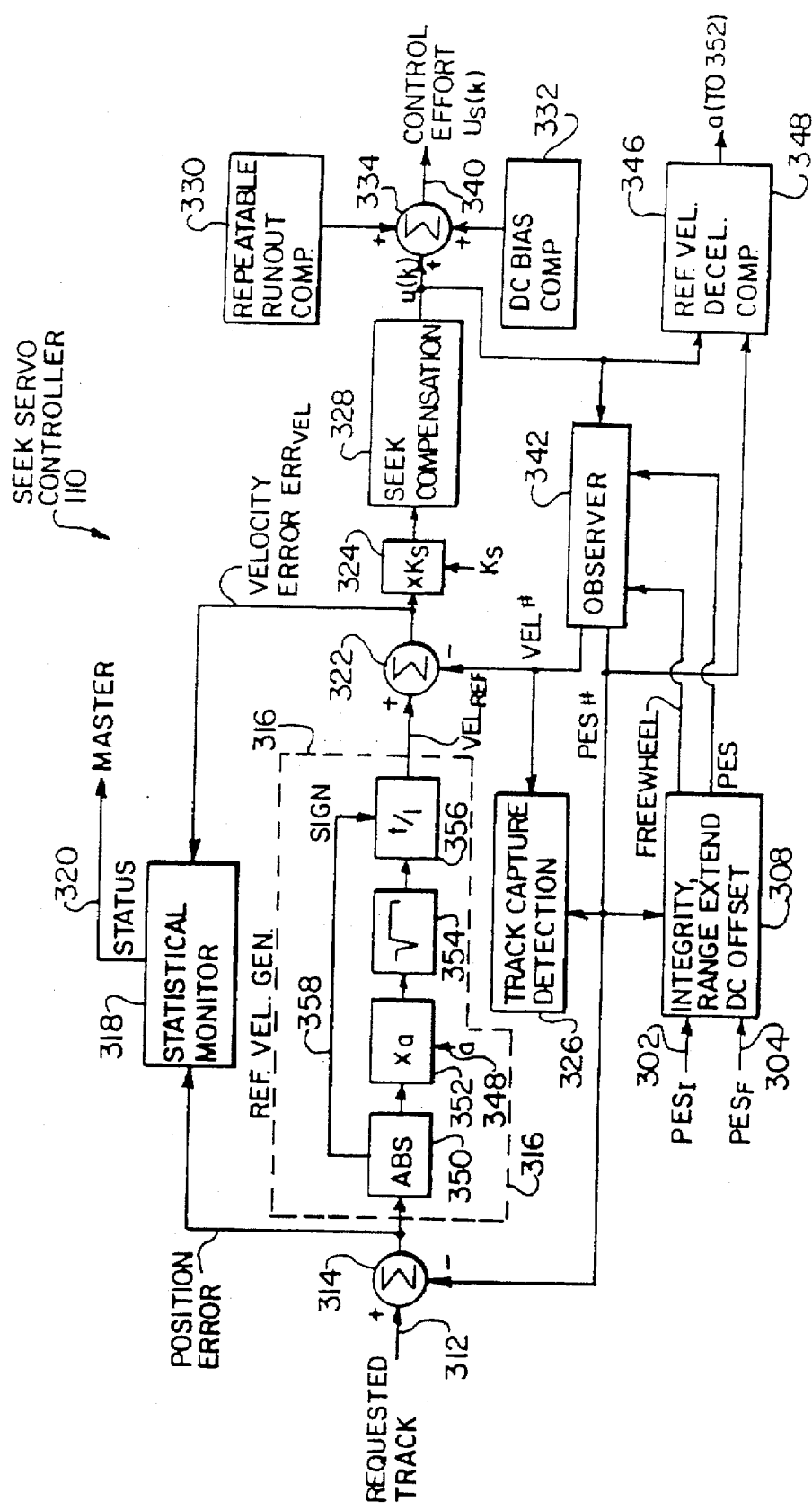
FIG. 3 illustrates schematically a seek servo controller for efficiently moving the read/write heads from a given location to closely approach a destination track in the first embodiment of the invention.

FIGS. 2 and 3 illustrate functions performed within the DSP 110 (FIG. 1A). FIG. 2 illustrates the tracking servo controller which is adapted to cause the heads to follow a given track once they are positioned above it; FIG. 3 illustrates the seek servo controller, adapted to quickly move the heads from an initial position to a destination track to allow the tracking servo controller to stably position them.

In the first embodiment, the functions performed in each of the blocks in FIGS. 2 and 3 are implemented in DSP assembly language software; FIGS. 2 and 3 are presented in lieu of flow charts to illustrate the compensation and control functions which occur concurrently during operation. The functional blocks may each be implemented as blocks of assembly language code performing functions specified in this specification, with the interconnecting pathways indicating passage of data via registers or memory locations for use by executable code from the different blocks. FIGS. 2 and 3 may thus be considered analogues to conventional flow charts. Of course, illustration of certain functions as being within a single block does not imply that the corresponding assembly language code must be in a contiguous block in memory; the code may be organized however design constraints or programmer preference dictate.

It lies within the contemplation of the invention that some or all of the functional blocks may be implemented in hardware if speed or some other design constraint demands it. The capability of implementing the tracking servo controller and the seek servo controller in either hardware or software is demonstrated by the nature of FIGS. 2 and 3: although the preferred embodiment is in software, the block diagrams of FIGS. 2 and 3 allow those skilled in the art to implement their functions in appropriate corresponding hardware elements.

Referring again to FIG. 1A, the schematic illustration of the servo loop may be described as follows. Based on algorithms implemented with in the DSP, the DSP provides a control effort function U(k) to the digital to analog converter 114. In DAC 114, the digital control effort output U(k) of the DSP is converted to an analog signal by a dual 8-bit digital to analog converter which provides an equivalent 14-bit resolution. The dual 8-bit DAC's may be electronically combined by a single operational amplifier to achieve DC voltage shift, provide the desired gain, and minimize the effect of the DAC offset voltage. This implementation provides a large dynamic range in converting the control effort U(k) to the actuator coil current which ultimately controls the position of the heads. Preferably, the analog control effort is processed by a notch filter to remove frequency content in the region of the most significant mechanical resonance mode(s), thus minimizing excitation and preventing instability.

In those implementations using a voice coil to control actuator position, the analog version of the control effort is amplified by the power amplifier 116. The power amplifier 116 operates in transconductance mode, in which a voltage is converted to a current which is sent through the coil of actuator 118 to control the displacement of the head positioning actuator and the read/write heads at 120. The power amplifier 116 should be designed to minimize the effect of the coil inductive time constant when operating in its linear region.

In those implementations not using a voice coil to control actuator position, operation of the power amplifier or corresponding element is correspondingly modified in accordance with principles known to those skilled in the art. For example, if a voltage-controlled element is used instead of a voice coil, no transconductance transformation would be necessary.

The head position 120 with respect to track position 124 is schematically illustrated by inputting them to the summing device 126. Summing device 126 is schematically illustrated as receiving at its non-inverting input the location of the center of a desired track, and receiving at its inverting input the position of the heads. The summing device 126 outputs the difference between these two positions, an analog indication of error head positioning.

The error signal from the summing device 126 is periodically sampled by the sampling switch 128. Sampling switch 128 provides the sample error signal to the position sensor 130. Sensor 130 performs the low level functions conventionally performed in disk drives to distinguish the degree to which the heads are following a given track. Conventionally, this sensing has involved a detection of a first pulse on (for example) the left side of the track during an "A" time frame, and the subsequent detection of a second pulse on the opposite side of the track during a "B" time frame. This sequential detection of the A and B pulses yields a pair of pulses. The A pulse and B pulse are of the same magnitude if the head is properly positioned in the center of the track. However, when the head is not properly centered, the A bit and the B bit have differing magnitudes with the A–B difference having a polarity and magnitude indicating the direction and distance of the heads from the center position.

According to the invention, the track identification process detects synchronizing timing pulses followed by gray codes identifying each particular track. The gray code is converted to binary (integer) form for identifying the particular track. This integer, along with the information derived from the A and B dibit pulses, allows the position of the heads to be determined anywhere within the portion of the disks which are so formatted.

A high/low gain signal is generated by the digital signal processor 110 and is fed back along path 134 to the sensor block 130. The high/low gain signal reflects how closely the heads are stably following a particular track. The method by which the DSP determines how stably and how closely the heads are following a particular track is explained below, with respect to the window detector explained with reference to FIGS. 2 and 23A. The adjustable gain feature in the sensor 130 is adapted to minimize quantization errors, and reduces complexity and component count for reasons of economy. The sensor is placed in a low gain mode when the head has not yet accurately settled onto the center of the track; this low gain mode allows sensing the error to within plus or minus half a track width. The sensor is switched to high gain mode when the head has settled on the center of a track within an error of (for example) plus or minus eight percent of a track width. The high gain allows greater resolution at the smaller distance measurements encountered as the heads closely follow their track. Changing the sensor from low gain to high gain mode does not change overall bandwidth of the loop; rather, an increase in sensor gain is accompanied by a commensurate decrease in compensation gain within seek and tracking compensators in the DSP.

Analog to digital converter 132 schematically indicates the conversion of the sensed error signal into a binary number indicating the fractional positional error signal $PES_F$. The integer positional error signal $PES_I$, already being in binary form, is directly input to the DSP from the sensor 130. These two binary numbers are input to the digital signal processor 110 for processing in accordance with the servo algorithms described below, with special reference to FIGS. 2 and 3.

Figure 1B:
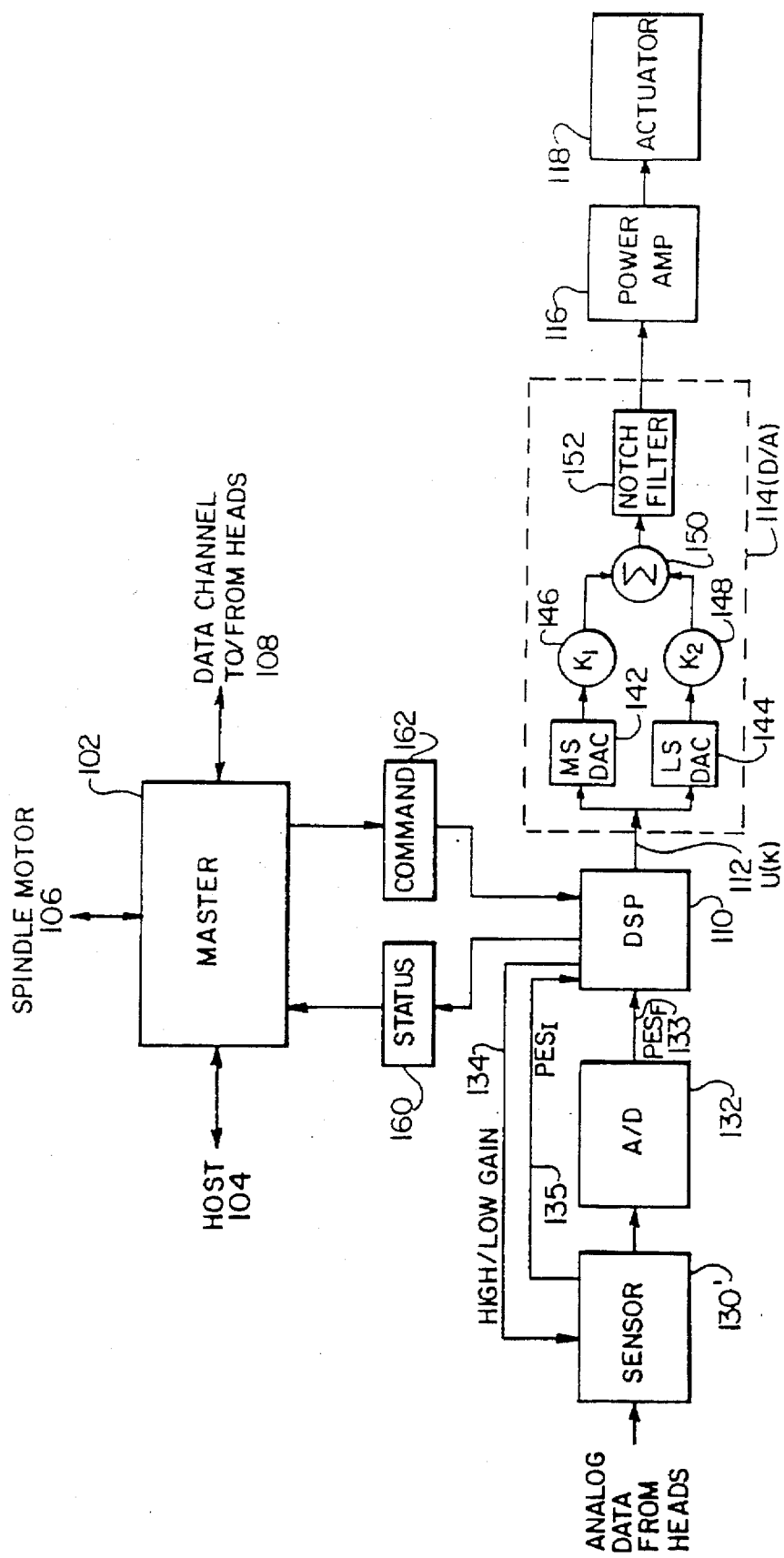
FIG. 1B is a hardware block diagram of the preferred digital servo system illustrated schematically in FIG. 1A.

Referring now to FIG. 1B, a hardware block diagram equivalent to the schematic FIG. 1A is provided. Many of the blocks shown in schematic form in FIG. 1A are analogues of blocks shown in FIG. 1B. For example, sensor block 130, analog-to-digital converter 132, digital signal processor 110, digital-to-analog converter 114, power amplifier 116, actuator 118, and master controller 102 are present in both diagrams. However, the schematic indication of the head position 120 and the track position 124 has been more faithfully rendered in FIG. 1B by simply indicating an output (for example, a coil current) provided to a an element (such as a coil) in actuator 118, and a separate analog data input along path 502 to the sensor 130. The interface between the digital signal processor 110 and master controller 102 is shown specifically to indicate a command register 162 which receives commands from the master controller for presentation to the DSP. Similarly, a status register 160 is provided for storage of status signals from the DSP for presentation to the master controller. Details of sensor 130 are provided in FIG. 5A, and details of the digital-to-analog converter are provided as follows.

The digital-to-analog converter 114 comprises a more significant DAC 142 and a less significant DAC 144 which receive the control effort signal U(k) from the DSP. Scaling blocks 146 and 148 scale the respective outputs of DAC 142 and 144 to reflect their relative significance. The scaling blocks provide the mutually scaled DAC values to a summation device 150 which combines them into a single analog signal indicative of the desired control effort. The summation device 150 may advantageously comprise an operational amplifier configured in a manner known to those skilled in the art. A notch filter 152 eliminates unwanted resonance before the analog control effort signal is provided to the power amplifier 116.

Referring now to FIG. 2, a schematic illustration of the tracking servo controller is provided. In the first embodiment of the invention, each of the illustrated blocks is implemented in DSP assembly language code. However, as stated generally above, it is to be understood that some or all of the blocks may be implemented in firmware or hardware in response to design constraints or designer choice.

Referring now to the specific elements in FIG. 2, the two components of the positional error signal enter on pathways 1202 and 1204. The gray code representation of the track ID integer positional error, $PES_I$, is input to a sample integrity test block 1208. Similarly, the fractional positional error signal $PES_F$ derived from the dibit coding within the given track passes through an automatic gain control (AGC) 1206 before being input to the sample integrity test 1208. The AGC 1206 also feeds the DC input offset compensator 1212.

Based on a predicted PES signal PES# on path 1244, the sample integrity test block 1208 provides respective signals $PES_I'$ and $PES_F'$ at its outputs only when the input signals $PES_I$ and $PES_F$ lie within a range of reasonable possibilities, based on past readings, as determined by a predictive observer block 1242.

Fractional and integer signals $PES_F'$ and $PES_I'$ which are not eliminated by the sample integrity test block are combined in the linear range extension block 1210. The combined (fractional plus integer) signal is input tot he non-inverting input of a summation device 1214. The summation device 1214 receives at its inverting input the output of the DC input offset compensator 1212. The summation device 1214 outputs the final positional error signal PES to a node 1216, the final PES signal being used by a statistical monitor 1218, window detectors 1222, a $K_T$ multiplier 1224 at the input of a tracking compensation block 1228, observer block 1242, a one-track seek controller 1238, and a seek and tracking bandwidth compensation block 1250.

Multiplier block 1224 is provided to multiply the positional error signal PES in node 1216 by a value $K_T$ produced by tracking and seek servo bandwidth compensation block 1250. Multiplier 1224 provides the scaled PES value to the tracking compensation block 1228.

The tracking compensation block 1228 also receives inputs from the window detector 1222, and from a state initial condition calculation block 1236. The tracking compensation block provides an output to repeatable runout compensation (RROC) feedforward block 1230 and to the DC bias compensation feedforward block 1232. The tracking compensation block also produces an interim control effort signal u(k) for the observer 1242 and bandwidth compensator 1250. The tracking compensation block 1238 is described in greater detail below, with reference to FIG. 6.

A summation device 1234 receives the interim control effort signal u(k) from the compensation block, but adjusts it by quantities received from the repeatable runout compensation feedforward block 1230, the DC bias feedforward compensation block 1232, and (during one-track seeks) a one-track seek feedforward controller 1238. Operation of the one-track seek feedforward block 1238 is described in greater detail below, and with reference to FIG. 7. The summation device 1234 outputs the final control effort signal $U_T(k)$ 1240 to digital to analog convertor 114 (FIG. 1A).

The observer block 1242 receives the final PES signal on node 1216 and the interim control effort output signal u(k) and uses them as a basis for generating windows for screening noise-corrupted $PES_I$ and $PES_F$ signals. Particular outputs generated by observer 1242 are the PES# signal on path 1244 and the velocity signal VEL# on path 1246. Both of these signals are input to the state initial condition calculation block 1236; only the PES# signal 1244 is input to the sample integrity text block 1208.

The window detector 1222 produces the high-low sensor gain signal 134 which is fed back to the sensor block 130 (FIG. 1A). Also, window detector 1222 outputs status information to the master along path 1226. Operation of the window detection block 1222 is described in greater detail below, with reference to FIG. 23A.

A statistical monitor block 1218 receives the final positioning error signal from node 1216, providing information to the master along path 1220.

A more detailed description of the functioning of the blocks of FIG. 2 are provided below, after the description of FIG. 4.

FIG. 3 illustrates schematically the functions performed by the seek servo controller.

The integer portion of the positional error signal $PES_I$ is input along path 302, and the fractional $PES_F$ along path 304, to a sample integrity tester, range extender, DC offset compensator block 308 performing generally the same functions as elements 1208, 1210, 1212 (FIG. 2). Block 308 provides a combined PES signal to a seek observer block 342.

Analogous to the tracking observer 1242 (FIG. 2), the seek observer 342 may simply be a closed loop mathematical model of the entire servo system, and may be implemented according to principles of modem control theory known to those skilled in the art. Observer block 342 provides an estimated velocity signal VEL# to both the inverting input of summation device 322 and track capture detector 326. The observer block also provides a positional error signal estimate PES# to reference velocity deceleration compensation block 346, track capture detector 326, the sample integrity tester within 308, and the inverting input of summation device 314.

Requested track information is input along path 312 to non-inverting input of a summing device 314. An inverting input of the summing device 314 receives an estimate of the positional error signal PES# from the observer block 342. The summing device 314 outputs a positional error signal to both a reference velocity generator 316 and a statistical performance analysis block 318. The statistical performance analysis block 318 provides status information to the master along path 320.

The reference velocity generator 316 includes an absolute value block 350 which receives the positional error signal. The absolute value of the positional error is input to a multiplier block 352 which receives a deceleration coefficient "a" along a path 348 generated by the reference velocity deceleration compensation block 346, described below. After being multiplied by coefficient "a", the compensated positional error signal is input to a square root block 354 before being input to a sign block 356. The input quantity is multiplied by either +1 or −1, depending on the value of a signal passed from the absolute value block 350 along a path 358. This arrangement ensures that the sign of the positional error is not lost within the reference velocity generator 316.

The output of the sign block 356 is the reference velocity $VEL_{REF}$ which comprises the output of the entire reference velocity generator 316. The reference velocity $VEL_{REF}$ is input to the non-inverting input of a summing device 322. Summing device 322 includes an inverting input which receives an estimated velocity signal VEL# from the observer block 342. The summation block 322 provides a velocity error signal $ERR_{VEL}$ to both the statistical performance analysis block 318 and to a multiplier 324. The velocity error signal $ERR_{VEL}$ is multiplied by a constant $K_S$ which is generated by the tracking and seek servo bandwidth compensator 1250 (FIG. 2).

Multiplier 324 provides a scaled velocity error to seek compensation block 328, whose details are described below, with reference to FIG. 9. The seek compensation block 328 provides an interim control effort signal u(k) to a summation device 334, the observer block 342, and the reference velocity deceleration compensation block 346.

In a manner similar to the tracking servo controller of FIG. 2, the summation block 334 also receives feedforward compensation signals from a bias feedforward block 332 (compensating for anomalies which vary with the radial position of the heads), and from repeatable runout compensation (RROC) feedforward block 330 (compensating for performance anomalies which vary with the rotational position of the disks). Summation block 334 provides the final control effort signal $U_S(k)$ which is the output of the entire seek servo controller implemented within the digital processor 110 (FIG. 1A) during a velocity mode seek.

The reference velocity deceleration compensation block 346 receives the interim control effort signal u(k) from the seek compensation block 328 and the positional error signal estimate PES#. It generates a deceleration (negative acceleration) gain signal "a" on path 348 which is used in the multiplier 352 in the main data path of the reference velocity generator 316. The details of the reference velocity deceleration compensation 346 are provided below, and with reference to FIG. 10.

More details of operation oft he seek servo controller in FIG. 3 are provided below, after discussion of FIG. 4.

The relationship of FIGS. 1A, 1B, 2, and 3 are better understood with reference to the operational flow chart presented in FIG. 4. FIG. 4 is a flow chart illustrating the operation of the servo loop of FIG. 1A.

After power up, illustrated at 402, control passes along a path 404 to a system calibration block 406. At time 406, parameters used in servo loop adaptive functions are calibrated. For example, parameters are calculated for the DC offset compensation block 1212, the repeatable runout compensation feedforward block 1230, the DC bias compensation feedforward block 1232, the one-track seek feedforward controller 1238, the seek and tracking bandwidth compensator 1250 (all in FIG. 2), and the reference velocity deceleration compensator 346 (FIG. 3).

Calibration is performed, for example, by running the drive's plant through its ranges of pertinent positions, velocities, and movements while taking measurements indicating the amount of compensation needed. An internal profile may then be generated and stored, the profile showing required compensation as a function of the pertinent independent variable (such as radial position, rotational position of the disks, and so forth). Parameters (such as filter multipliers) are calculated and stored. Based on the internal profile generated during the calibration mode, the appropriate compensation or control function uses these customized parameters to optimize system performance.

After the values for these parameters have been calculated for a given power up, control passes along path 408 to the operational block, generally indicated as 410 (FIG. 4). Control may pass to either the tracking servo controller 412 (shown in FIG. 2) or to the seek servo controller 414 (shown in FIG. 3). During operation, control may pass between the tracking servo controller 412 and the seek servo controller 414, as generally indicated by bi-directional path 416. Control passes back and forth along path 416. For example, when track capture detector 326 determines that a seek has approached to a given distance from the destination track with the heads travelling below a certain speed, control transfers from seek mode 414 to tracking mode 412. Conversely, when the master issues a command to move the heads away from a given track, control transfers from tracking mode 412 to seek mode 414.

The operational mode 410 may be exited for recalibration, as generally indicated by path 418 leading to calibration block 406. Scenarios in which the operational mode of the servo loop controller may be temporarily exited include detection of a reduction in performance of any of the adaptive algorithms in blocks 1212, 1230, 1232, 1238, 1250 or 346. Such degradation in performance may be caused by, for example, heating of components, reorientation of the computer in which the disk drive is housed, or physical jarring or vibration. Alternatively, the calibration may occur at selected periodic intervals, on the assumption that the adaptive parameters will vary as time passes, even if no traumatic event has occurred. Preferably, the operational mode 410 is not exited during a critical read or write operation, but the re-calibration is performed during a lull in activity demanded by the master 102 (FIG. 1A).

Details of FIGS. 2, 3. The tracking and seek servo controllers of FIGS. 2 and 3, as well as their interrelationship in FIG. 4, have been briefly described above. Now, a more detailed description of operation of certain functional blocks in the servo controllers is presented.

FIG. 2. First, details of operation of the tracking servo controller of FIG. 2 are presented.

Automatic Gain Control (AGC) 1206. The fractional PES, $PES_F$, is normalized by the AGC function. This algorithm divides the sensor's difference signal (A−B) by the sum signal (A+B) to minimize effects of varying signal strengths due to sensor variations over time, temperature, media uniformity, and so forth.

Sample Integrity Tester 1208. This algorithm determines if the integer and fractional position error signals for the current sample is realistic when compared to the observer estimate and the physical constraints on the available acceleration environment.

Specifically, the integer PES signal $PES_I$ must fit within a window which is equal to the observer positional estimate, plus or minus a given number of tracks (e.g., 4). If $PES_I$ passes the test, it is used as the current sample; otherwise, the observer's positional estimate PES# is used for the PES. If the PES fails a given number of consecutive times (for example, twice), then it is assumed valid and is used for the PES.

The integrity of the fractional PES, $PES_F$, is tested by using the two data measurements of A−B and A+B. The separate measurements provide two equations and two unknowns A, B. A and B are compared to verify that if A is large then B is small and vice versa. If the test is passed, then the sample is used. Otherwise, the sample is assumed contaminated with noise and the observer positional estimate PES# is used.

PES Linear Range Extension 1210. The fractional PES has a linear range of ±0.5 tracks. During nominal tracking conditions, this is adequate; however, during track capture or after external shocks, extended linear PES range is desirable. The range extension algorithm uses integer PES information which is equal to the requested track minus the current track, and multiplies this by the number of bits per track inherent in the fractional PES signal. This product is summed with the fractional PES after the fractional PES has been correctly signed. The result in one embodiment is a linearly extended PES with a range of ± several tracks, the number of tracks of extension being limited by the number of bits used to represent the PES. If the PES exceeds limits of the linearly extended range, then the controller automatically issues a seek to the desired track.

Tracking Compensator 1228. The preferred tracking compensator (presented in FIG. 6 and described in greater detail below) includes a double phase lead compensator (two poles and two zeros) and a low frequency integrator (one pole and one zero). The arrangement of the filters is mathematically configured such that the pure integrator is in parallel with the double phase lead compensator. This arrangement allows switching of the integrator upon settling within a specified tracking error.

State Initial Condition Calculation 1236. The phase lead compensator and integrator may b e represented in a state space representation, having initial conditions determined by state initial condition calculation block 1236. The compensation configuration is structured such t hat the states can be easily computed at the time of track capture from a velocity mode seek to cause the heads' velocity to be decelerated so that they arrive at track center with zero velocity.

The integrator is initialized to zero. The DC bias feedforward compensator 1232 minimizes effects of bias forces; the integrator controls the residual of these bias forces. The initial state values for the phase lead compensator are computed by solving filter difference equations as follows. The head position and velocity are measured at the track capture transition point. This data is used to compute the required coil current that causes the head to move to track center and have zero velocity when it arrives. This is accomplished by using a Newtonian Kinematic Equation of motion. The phase lead filter's required output is now defined and the equation is solved for the state values that will produce the desired coil current. Further details on this algorithm are provided below.

Figure 23A:
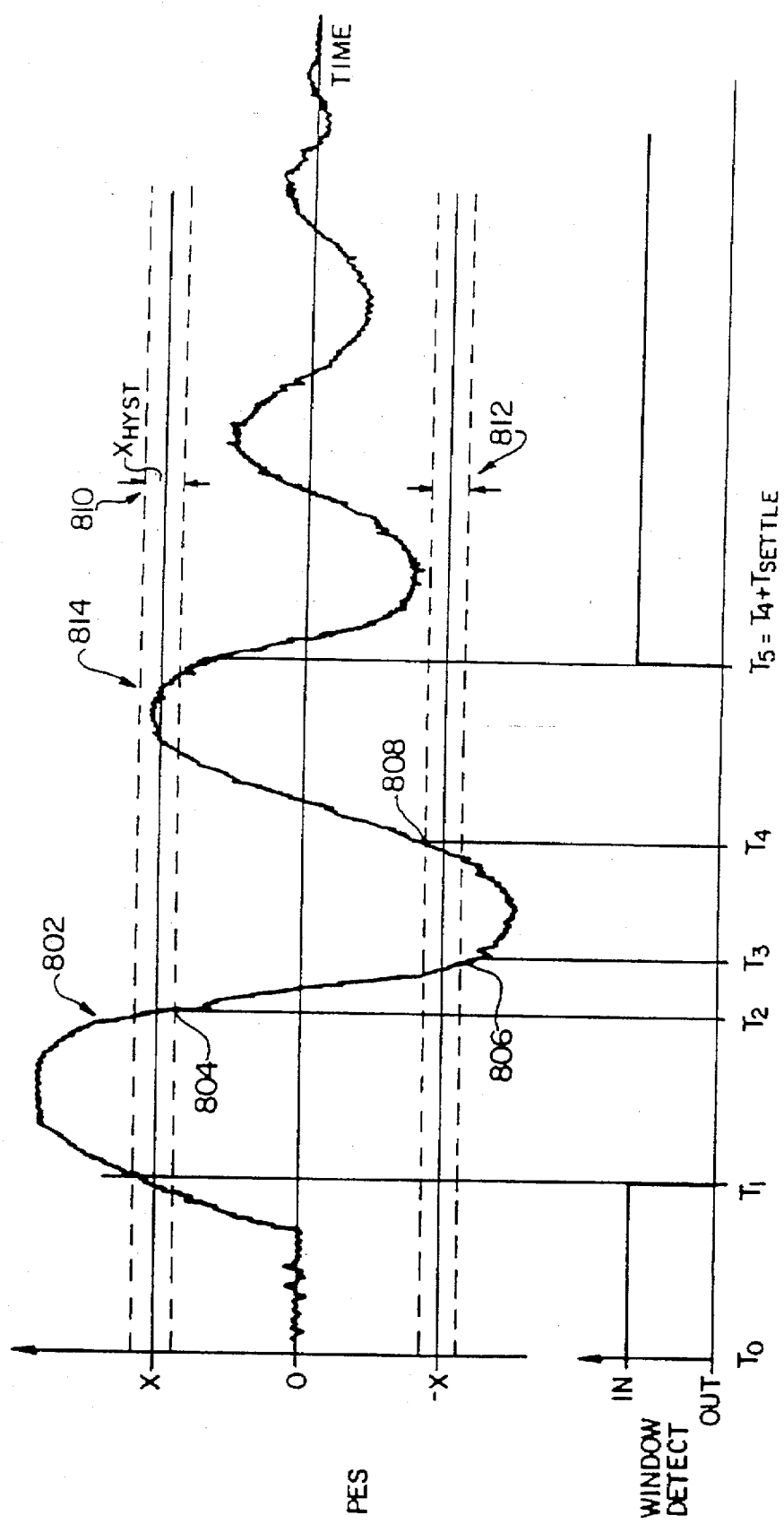
FIG. 23A is a timing diagram illustrating a typical positional error signal useful for explaining the operation of the window detector block in FIG. 2.

Window Detectors 1222. The PES signal is monitored to determine when the magnitude of the error signal has decayed to stably remain within a specific error window. The general concept of the algorithm for detecting when the error is within the window may be identical for all windows; therefore it will suffice to describe window detection in general, without reference to a specific parameter being measured. Reference is made to FIG. 23A for a timing diagram of a typical PES waveform approaching a suitable window.

The magnitude of the window has hysteresis to minimize the effects of noise from falsely tripping the window detector. The exiting of a window is detected by the PES exceeding the upper bound of the limit plus hysteresis. The entry into a window is detected when the PES magnitude is less than or equal to the upper bound of the window minus the hysteresis. When the PES has remained within the window for a given amount of time as may be measured by counting sectors (preferably half the natural period of the closed loop servo system), settling within the window is declared complete.

Tracking Observer 1242. The tracking observer provides a discrete model of the plant. The output of the observer includes estimates of the heads' velocity and position.

Statistical Monitor 1218. The statistical monitor derives real time data on the performance of the tracking servo system relative to the PES signal. Several forms of data are available for use in determining when the drive requires re-calibration or simply for manufacturing process control. Minimum, maximum, mean and standard deviation of the PES and seek settling times are provided. The number of times that the PES has exited each window during tracking is accumulated. Also, the number of bad samples is provided.

DC Input Offset Compensator 1212. The DC input offset compensator block 1212 provides a compensation signal to subtractor 1214 only when the sample integrity tester 1208 selects the measured sample $PES_F$ rather than the observer-generated value PES#. As will be appreciated by those skilled in the art, no input compensation is needed if the value being input is not used by the system beyond the integrity tester itself. The path between sample integrity tester 1208 and the DC input offset compensation block 1212 illustrates this disablement of the latter during freewheel mode. The indication to the observer of the freewheel mode is schematically indicated by a "freewheel" path between the sample integrity tester 1208 and the observer 1242.

The tracking controller can receive an offset value from the master controller in order to improve the BER. The quantity received from the master may be designed to correspond to a percentage of a track displacement in a specified direction. The tracking controller sums this with the PES which results in a DC offset from the sensor's track center indication.

One-Track Seek Feedforward Controller 1238. The single track seek is controlled by the tracking controller (FIG. 2) rather than the seek controller (FIG. 3), as it demands a quick access time because of its frequent use. A feedforward control profile assists the closed loop tracking servo system. The feedforward control pulse includes an acceleration pulse and a deceleration pulse. The acceleration pulse causes a rapid displacement towards the destination for the first portion of motion, corresponding to (for example) half a track of displacement. The deceleration pulse prevents overshoot during the remainder of the motion.

The tracking integrator input is disabled during the motion to prevent unnecessary overshoot, but is enabled at the destination track center. The remainder of the tracking controller is operational during this motion to assist in compensating for inaccuracies of the feedforward pulse amplitude and duration.

Additional details of the one-track seek controller are presented below, with special reference to FIG. 7.

FIG. 3. Details of operation of blocks within the seek servo controller of FIG. 3 are now presented.

Reference Velocity Generator 316. The reference velocity generator emulates an optimal trajectory by solving the Newtonian Kinematic equation:

$$V_f^2 = V_i^2 + 2*a*(x_f - x_i)$$

where $V_f$=(final velocity)=0;
$V_i$=$VEL_{REF}$=Reference Velocity;
a=acceleration constant
$x_i$=current position
$x_f$=final position Solving for $VEL_{REF}$, $VEL_{REF} = \text{sqrt}(2*d*(x_f - x_i))$, where d=deceleration constant, signed as determined in FIG. 3. The deceleration constant "d" is equivalent to the quantity "a" output by the reference velocity deceleration compensator 346 in FIG. 3. This quantity is a calibrated value corresponding to the particular drive's deceleration capabilities.

In the illustrated embodiment, the constant deceleration resulting from this profile causes a constant coil current during the last portion of the seek trajectory profile. The deceleration constant may advantageously be defined such that approximately 75% of available coil current is used, leaving 25% excess capacity for following during a disturbance.

Seek Compensator 328. The input to the compensator is the gain-adjusted velocity error $ERR_{VEL}$. The seek compensator includes two paths, a gain path and a compensated path, which are illustrated in FIG. 9 and described in greater detail below. A double phase lead compensator is in series with an integrator in the compensated path.

The gain path is selected during the acceleration portion of the seek. The phase lead compensator output is monitored during the acceleration phase until the output crosses through zero. The zero crossing occurs prior to the intersection of the reference end feedback velocities due to the inherent differentiating effects of the phase lead compensator. This anticipation assists in preventing overshoot of the reference velocity profile.

The compensated path is switched into the loop in place of the gain path at the zero crossing detection. However, the integrator state is first initialized to a value that provides identical coil current as the gain path would have at the moment of transition, minimizing dynamic transients. The deceleration portion of the seek continues with the compensated path until track capture conditions are satisfied.

Seek Observer 342. A current full state observer is implemented in the servo system. A velocity estimate VEL# is used for feedback velocity; a positional error estimate PES# is used for the sample integrity test and reference velocity generation. Advantageously, the sample integrity tester causes the observer to operate open loop during bad samples. This provides superior performance, provided that the plant is accurately modelled, when compared to allowing a bad sample to affect the observer's input.

Track Capture Detector 326. The track capture detector determines when the velocity mode (governed by FIG. 3) should be exited and the tracking mode (governed by FIG. 2) should be entered. The preferred track capture algorithm requires that (1) the head position to be within ±1.0 track of the destination; and (2) the magnitude of the head velocity be less then 3.0 inches per second in order for the control to be switched to tracking mode. The velocity mode controller remains active if either of these conditions are not satisfied.

If the head is within the positional window but the velocity is still excessive, the reference velocity generator is dynamically modified to operate as a linear function of tracks to go. This linear operation replaces the preferred optimal parabolic function, as the parabolic function inherently has a significantly larger quantization associated with it when oscillating about a small number of tracks. This dynamic modification reduces the magnitude of the limit cycle inherent in a velocity mode servo when attempting to track.

Zone Crossing algorithm. Commonly, disks include zones of different data densities and sampling periods, the different zones arranged at different radial locations. When crossing a zone boundary, the seek servo can encounter unpredictable and sometimes significant variations in the sample period. This variation in sample period can cause dramatic transients to occur, which could ultimately result in a head crash.

The problem is present if the sample time is excessively long or short when compared to nominal.

To deal with this problem, the changes of sample periods across zone boundaries is assumed to have a uniform distribution between 0 and 2 nominal sample periods. A timer is used to time the sample period to determine if the sample is excessively short. The minimal acceptable sample period is 0.5 of nominal. If the sample is unacceptably short, then the sample is ignored; otherwise, the controller difference equations are computed. The controller and observer difference equations are executed in the freewheel mode if the sample becomes unacceptably long.

Statistical Monitor 318. The statistical monitor derives real time data on the performance of the seek servo system. The minimum, maximum, mean and standard deviation of the velocity error during velocity mode seeks are available status information. Velocity mode seek time is compared to a polynomial curve which defines the required access time to verify that the seek servo system is performing specification. This is a valuable tool for use in process controls of the manufacturing line.

Additional Servo Algorithms. In addition to those functions shown in FIGS. 2 and 3, the preferred servo controller provides additional functions, presented here for completeness and as illustration of the DSP's ability to control the plant in special circumstances.

Head Load algorithm. The head load algorithm initiates an open loop control effort (such as a pulse or other suitably controlled waveform) which causes head motion towards the OD (outside diameter), assuming the heads are parked at the ID (inside diameter). If a given number of good samples (for example, ten) have not been detected after a predetermined period of time (for example, 10 msec), the magnitude of the open loop pulse is increased. This process is repeated until good samples are detected or the magnitude of the open loop pulse exceeds a maximum value (for example, 100 mA). If the magnitude exceeds the maximum, a failure to load heads is reported to the master controller. If ten consecutive good samples are detected, a closed loop seek is initiated to a calibration track.

Head Park Algorithm. The head park algorithm involves seeking towards the ID at a low coast velocity until track ID's remain unchanged (indicating that the head is against the stop) or until samples are absent. When the samples are absent, an open loop bias current is supplied to the power amplifier and the head load is completed.

Dynamically Calibrated Compensation and Control Functions. Several of the compensation and control functions in FIGS. 2 and 3 are initially calibrated upon power up, and then adaptively calibrated during operation, either periodically or when performance monitoring indicates a calibration is necessary. Details of certain compensation and control functions in FIGS. 2 and 3 are now presented.

D.C. Bias Compensator 1232. A DC Bias Calibration Algorithm (DCBCA) corrects for electrical and mechanical bias forces acting on the actuator which are functions of the head's radial position on the disks. Electrical bias forces can result from voltage and current offsets in the electrical circuitry. Mechanical bias is typically due to the flex cable.

The DCBCA is invoked at each power on of the disk drive. The servo system seeks the outer diameter of the disk (OD) and measures the average control effort required at this radial position. Multiple seeks (typically 10) are performed, each of which involves measurement of the average bias force. The measurements result in two vectors of data. A least mean square (LMS) algorithm is performed on the data in order to derive a mathematical model of a straight line equation that fits the data such that the least mean square error criterion is satisfied.

The straight line model is continually used by the tracking and seek servo system as a feedforward signal, which is a function of the head radial position.

In operation after the initial power up calibration, the DSP continually monitors the DC control effort required from the tracking servo system and determines if re-calibration of the straight line is necessary.

D.C. Input Offset Compensation 1212. This algorithm compensates for DC offsets inherent at the input position error sensor 130.

Calibration of this compensator uses offset calibration tracks located at the ID and or OD of the disk. The dibit pattern of these tracks deviate from the normal dibit pattern. Approximately 10% of the offset samples per revolution have the A and B dibits servowritten such that the A and B analog signals behave identically, in contrast to the required opposite behavior for tracking. Normally, when the heads are centered on the track, A=B; when they are off center in one direction, A>B, and in the other, A<B. The difference A−B equals the positional error (PES).

By allowing a small percentage of the A and B dibit pairs to behave identically in a predefined timing arrangement, the servo system satisfactorily follows the track by computing the control effort on the normal samples. The dibits at the offset sample should behave identically such that when on track center A=B, when off track in one direction A=B and when off in the other direction A=B. The difference (A−B) at the offset sample equals the total input offset of the sensor system. This input offset measurement is averaged over multiple samples and revolutions. The average offset is subtracted from the PES to cancel out the sensor offsets.

Repeatable Runout Compensator 1230, 330 (RROC). Repeatable runout compensation functions are believed to be performed in accordance with, for example, U.S. Pat. No. 4,788,608 (Tsujisawa), U.S. Pat. No. 4,135,217 (Jacques et el.), and U.S. Pat. No. 3,458,785 (Sordello), all of which are incorporated herein by reference.

In the illustrated embodiment, calibration of this compensator involves generation of a profile synchronous with the disk rotation which is equal to the average control effort at each sampling instant. This profile is used as a feedforward signal at the output of both the tracking and seek controllers. The RROC feedforward signal is a time varying signal, whereas the DC bias feedforward compensator 1232 includes DC values which are a function of radial position.

The first formulation of the RROC profile occurs at the initial calibration after power up. The servo system seeks the middle of each zone (specific sample rate). The control effort is filtered to remove high frequency content by a filter having a low pass frequency response with constant phase delay. A repeatable runout profile vector is generated, the profile vector having a dimension which is equal to the number of samples per revolution. Each sample is equal to the average value of the control effort at that specific sample time over multiple revolutions of the disk. When all profiles are completed (characterizing all zones), they are time-advanced to compensate for inherent time delay in the filter.

The feedforward input to the servo system is turned on. The repeatable component of the control effort from the servo system becomes significantly less; however, a small residual component is present. The profile is continually optimized by adding a weighted measure of the residual control effort to the profile while the feedforward compensator is active. The result is an adaptive self-tuning feedforward signal.

Figure 8:
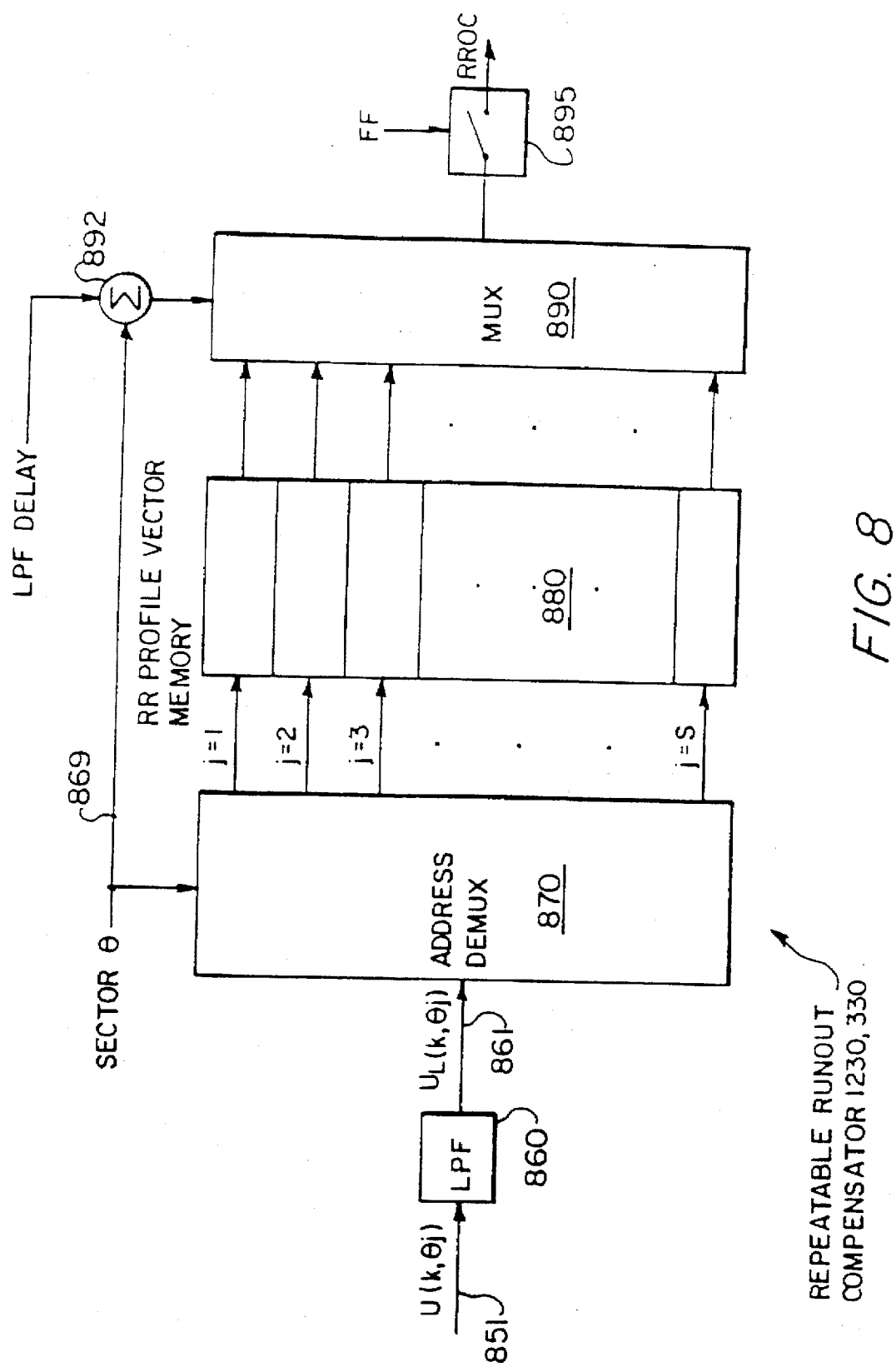
FIG. 8 illustrates an embodiment of the repeatable runout compensator shown in FIGS. 2 and 3.

Schematically, the foregoing repeatable runout compensation process may be illustrated as in FIG. 8.

Referring to FIG. 8, the uncompensated control effort $u(k,\theta_j)$ is input on path 851. In $u(k,\theta_j)$, k is a discrete time variable, $\theta$ is an angular position of the head over the disk, and j is a subscript indicating particular discrete disk angular orientations of $\theta$, j designating which of the "S" disk sectors the head is over (j=1, 2, 3, ... S).

The $u(k,\theta_j)$ signal is input to a low pass filter 860 to remove high frequency noise. The filtered effort signal $u_L(k,\theta_j)$ output from the low pass filter on path 861, is used as an input to an address demultiplexer 870. The select input to the address demultiplexer 870 is a sector signal $\theta$ on path 869. The sector signal $\theta$ may readily be derived as the output of a counter which is reset with a once-per-revolution index pulse and incremented once per sector by a sector pulse or the like.

Based on the value of the disk angular orientation variable j, the addressing demultiplexer causes a particular vector component in a repeatable runout profile vector memory 880 to be modified. The modification of the vector component is made in accordance with the formula:

$$\sum_{i=1...n} [u_L(k,\theta_j)/n] + FF\alpha u_L(k,\theta_j)$$

where $FF\alpha u_L(k,\theta_j)$ is a dynamic term representing a weighted control effort at a corresponding disk angular orientation which enables the compensator to adaptively optimize itself as the repeatable component of the control effort changes, FF is a binary feedforward on flag indicating when the dynamic term is used to adjust the feedforward control effort, and $\alpha$ is the weighting factor chosen by the designer. $[u_L(k,\theta_j)/n]$ is a static term, indicating an average value of the control effort at corresponding disk angular orientations over n samples.

The FF flag is active after the n samples have been averaged for the static component. Once the static component has been calculated, the dynamic component may be used for compensating repeatable runout, as follows.

The components of the repeatable runout profile vector are read out of vector memory 880 in order, by a multiplexer 890. The select input of multiplexer 890 is the sector value $\theta$ modified by an LPF delay factor, compensates for phase delays introduced by LPF 860. This modification is schematically indicated by an adder 892, receiving both the $\theta$ and LPF delay signals, and providing a select input to multiplexer 890.

Finally, a switch 895 is controlled by the FF flag, described above. The repeatable runout compensation signal RROC is provided when the FF flag is active.

Tracking and Seek Servo Bandwidth Compensation 1280. Bandwidth compensation functions are believed to be performed in accordance with, for example, U.S. Pat. No. 4,835,633 (Edel et al.) and U.S. Pat. No. 4,890,172 (Watt et al.), both of which are incorporated herein by reference.

In the illustrated embodiment, this compensator provides gains $K_T$ and $K_S$ for multiplying respective position and velocity error signals before tracking and seek compensation.

A least mean square (LMS) system identification algorithm is implemented in the tracking controller in order to identify the plant parameters (D/A, Power Amp, Actuator, Sensor) during the linear mode of operation.

To calibrate this compensator, several time records of the plant's input and output data are recorded for LMS processing. The resulting identified plant parameters are used to compute the gain of the Z-domain plant transfer function at the prescribed open loop bandwidth. The resulting gain is compared to a nominal reference value saved in memory. The tracking and seek compensator gains are scaled by the ratio of the measured and reference gain values to establish the open loop bandwidth at the compensator*s designed value. The resulting servo system has the desired stability of phase and gain margins.

The observer is designed assuming nominal plant gain. Therefore, observer performance is enhanced by multiplying the control effort input by the gain ratio to account for specific plant gain.

Reference Velocity Deceleration Compensation 346. This block ensures that a deceleration pulse is not too great in magnitude to cause the plant to lose control near the end of seeks. In particular, if the reference velocity is too close to the maximum amplitude negative pulse, and a slight additional control effort is need to compensate for an anomaly such as a shock of vibration, the maximum negative amplitude of the pulse may not be large enough for efficient compensation. Therefore, a trade-off between a large amplitude deceleration pulse for speed purposes, and a smaller amplitude deceleration pulse to allow responsive control, is desirable. More generally, U.S. Pat. No. 4,835,633 (Edel et al.), incorporated herein by reference, generally refers to adjusting the control effort in an optimum fashion.

In the illustrated embodiment, the deceleration ("negative acceleration") constant "a" used in the reference velocity profile is calibrated to optimize the access time for each drive. Typically, the constant would have to be selected to be acceptable over the manufacturing population and over time, temperature and supply voltage variations. Unfortunately, this would result in potentially fast drives from being operated at their maximum potential.

The present algorithm measures the acceleration capability of the drive when a seek of sufficient length is performed. A seek experiencing constant acceleration over a minimum of 15 samples is called sufficient in length.

The acceleration constant is computed by:

$$Accel_{meas} = Distance/(Current*Time^2)$$

This calculated acceleration of the drive is averaged over several measurements. Finally, the deceleration constant of the reference velocity generator is adjusted by comparing the average value of the measured accelerations with a nominal reference value:

$$d=d*Accel_{ref}/Accel_{meas}$$

Other details of operation. A brief overview of the tracking and seek servo systems has been presented, as well as details of the particular blocks shown in FIGS. 2–3. Now, still further structural and functional details of portions of the first embodiment are presented to provide background for the above description.

Figure 5A:
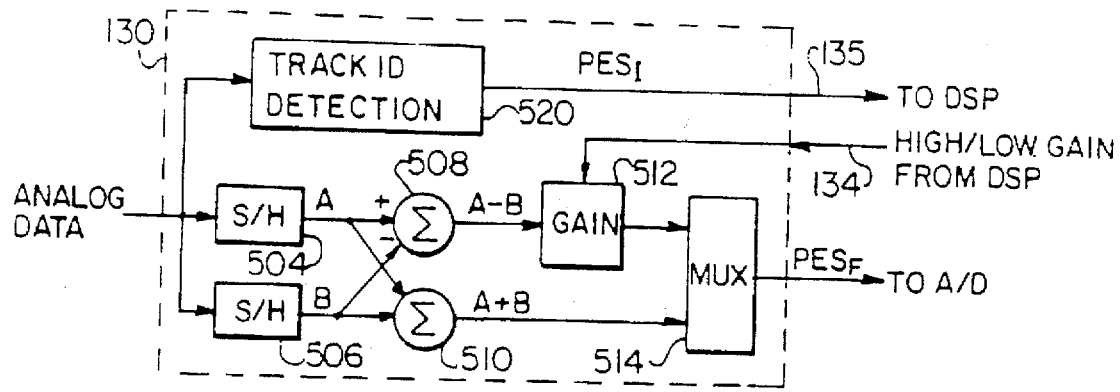
FIG. 5A schematically illustrates a portion of the input position error sensor 130 from FIG. 1A.
Figure 5B:
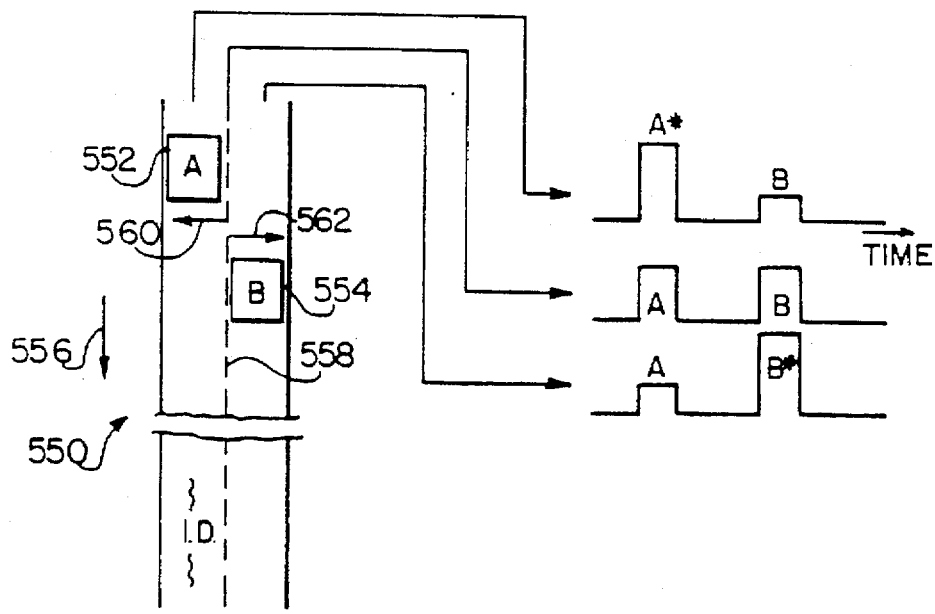
FIG. 5B illustrates a dibit diagram and a timing diagram useful in explaining the input position error sensor of FIG. 5A.

Referring now to FIG. 5A, the servo input position error sensor 130 (FIG. 1A) is displayed in greater detail. Referring also to FIG. 5B, a typical track 550 is illustrated.

A track has recorded on it area 552 and area 554 on opposite sides of the track. Area 552 and area 554 are displaced longitudinally, with the head moving relative to the track in a direction indicated by arrow 556. In this manner, the head first encounters area 552 at a time frame "A" before it encounters area 554 at a time frame "B".

Ideally, the head should be centered in the track, at a position indicated by center line 558. However, for a variety of reasons, the track may be off center in either a first direction 560 or a second direction 562. If the head is displaced in direction 560, it detects a signal A* which is larger in magnitude than a signal B. Conversely, if the head is off-center in direction 562, it detects a signal B* which is larger than the signal A. It is only when the head is exactly centered on line 558 that signals A and B are equal in magnitude. These signals are illustrated schematically in FIG. 5B.

The analog signal represented by one of the three graphs shown in FIG. 5B is input to the sensor 130 (FIG. 5A) on path 502. In time frame A and time frame B, respective sample-and-hold circuits 504 and 506 are strobed so that the magnitude of the A and B pulses are recorded. The non-inverting input of a summation circuit 508 receives the output of sample-and-hold circuit 504, while its inverting output receives the output of sample-and-hold circuit 506. Station device 510 receives the output of the two sample-and-hold circuits at two non-inverting inputs. The first summation device thus provides a signal A−B which is a signed difference in magnitude of the A and B pulses. Similarly, the second summation circuit provides an A+B signal which may be used to normalize the A−B difference in automatic gain control block 1206 (FIG. 2).

The A−B difference signal is input to controllable gain multiplier 512, where it is multiplied by a high gain or low gain value determined in the digital processor and passed back to the gain block 512 along path 134. A multiplexer 514 selectively provides the GAIN (A−B) output of the gain multiplier 512 and the A+B signal from summation device 510 as outputs of the sensor unit 130 for analog-to-digital conversion by ADC 132 (FIG. 1A). Multiplexer 514 sequentially provides its two inputs to the ADC for ultimate use by the AGC 1206; use of the multiplexer avoids needless duplication of ADC circuitry for the two signals.

Track ID detection logic 520 receives signals from the head as it passes over track ID zones which are unique to each track. Preferably, adjacent tracks are coded using a gray code. The detected track ID, a digital quantity, is provided directly to the digital signal processor on path 135.

Figure 6:
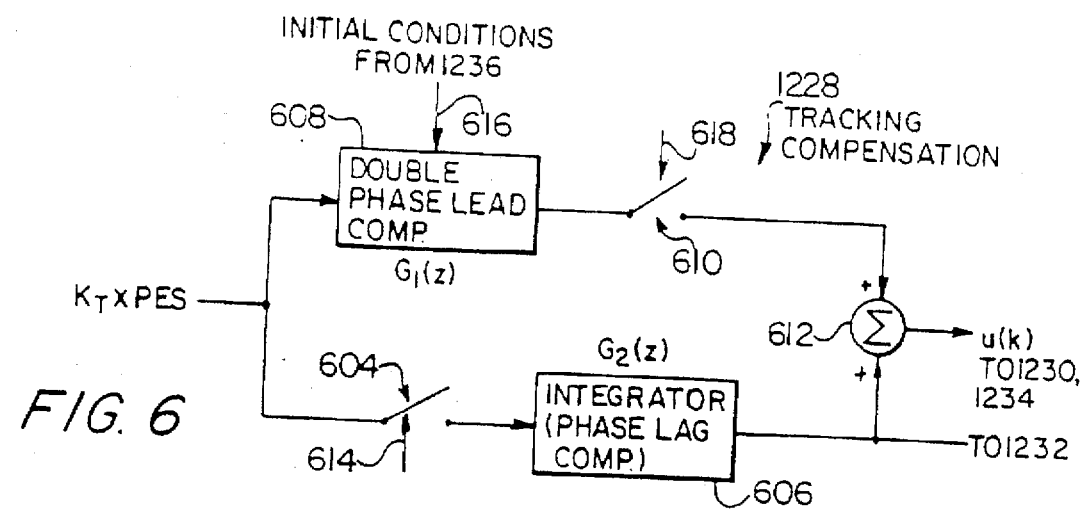
FIG. 6 illustrates details of the tracking compensation block 1228 of FIG. 2.
Figure 7A:
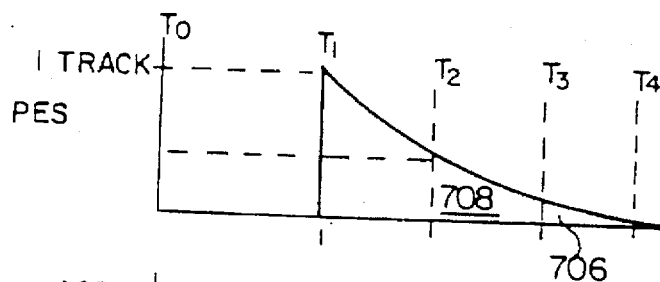
FIGS. 7A–7E are a timing diagram useful in illustrating the operation of the one-track seek controller 1238 from FIG. 2.
Figure 7B:
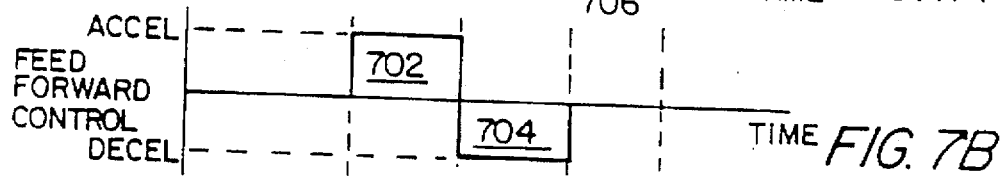
Figure 7C:
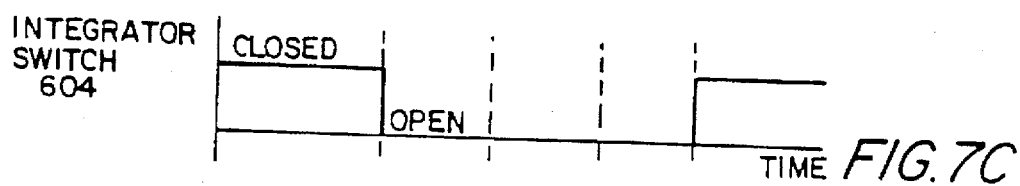
Figure 7D:
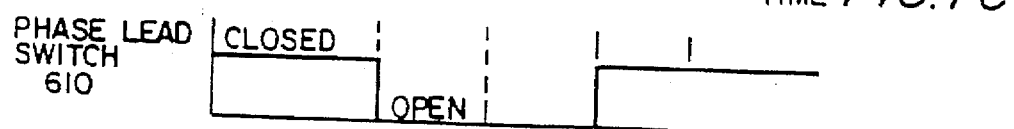
Figure 7E:
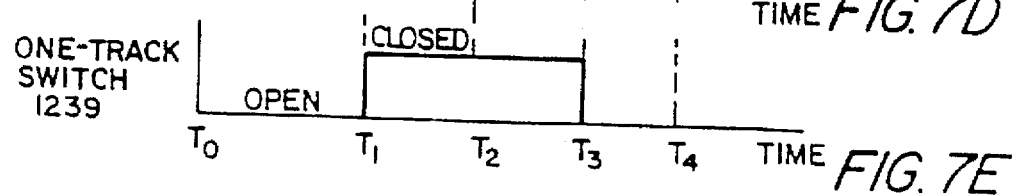

Referring now to FIG. 6, the tracking compensation block 1228 from FIG. 2 is illustrated and described in greater detail than above.

The scaled value $K_T$*PES is input to two parallel paths in the tracking compensation block 1228. Along the first path is a first switch 604 disposed at the input of an integrator 606 having a transfer function generally indicated as $G_2(z)$. The integrator embodies a phase lag compensation function for providing stiffness to the servo system at times selected by switch 604. The integrator 606 provides an output signal to a summation device 612 as well as to bias feedforward block 1232 (FIG. 2).

In the second parallel path, the scaled value $K_T$*PES is input to a double-phase lead compensator 608 having a transfer function generally indicated as $G_1(z)$. A switch 610 is provided at the output of the double phase lead compensator 608. The output of switch 610 feeds another input to summation device 612. Summation device 612 provides the interim control effort signal u(k) to the summation device 1234 and to the repeatable runout compensator 1230 (FIG. 2).

Switches 604 and 610 are controlled by the window detector 1222, as indicated along respective paths 614 and 618. Also, double-phase lead compensator 608 is provided with initial conditions along path 616 from state initial condition calculation block 1236 (FIG. 2).

In operation, when the servo system is changing from seek mode to tracking mode, switch 610 is moved from its open position to its closed position when the heads are within a predetermined distance of their desired destination, such as, for example, one track width. This determination is made by the by the track capture detector 326 (FIG. 3). This allows the double-phase lead compensator to contribute to the interim control effort u(k); it should have made no such contribution to the seek mode control effort.

Subsequently, the window detector closes switch 604, effectively turning on the integrator when the positioned error signal verifies that the heads have stably settled close to the center of the track. Phase lag compensator 606 is thus allowed to integrate the positional error only after it has diminished to a smaller value, minimizing overshoot.

A purpose of the phase lag compensator 606 is to assist in repositioning the heads when they are not ideally placed over the center of the track. Upon power-up a table is formed and stored in memory, the table indicating a function of the integrator output as a function of head positioning error. A least mean squares (LMS) fit of values measured upon power-up is stored for use by the feedforward compensator. The integrator thus adapts to situations when the feedforward blocks (FIG. 2) do not compensate exactly for the previously measured calibrated values. The integrator is initially set to zero when the bias feedforward 1232 is on; otherwise, if the bias feedforward is off, the integrator is maintained at its value retained from the previous tracking.

Referring now to FIG. 7, a timing diagram is presented which illustrates the operation of one-track seek feedforward block 1238. The great frequency with which one-track seeks are experienced in normal operations of a disk drive provides an impetus for this dedicated feedforward compensation function. This diagram may resemble waveforms involved in any seek-to-track transition, regardless of whether it is a one-track seek or a multiple-track seek. However, in seeks other than one-track seeks, the initial acceleration pulse is not generally profiled in the careful manner characteristic of one-track seeks.

In FIG. 7, five waveforms are illustrated. Waveform 7A illustrates positional error signal as a function of time; waveform 7B illustrates feedforward control (resembling coil current) as a function of time, showing first an acceleration pulse of magnitude ACCEL and a deceleration pulse of magnitude DECEL; waveform 7C illustrates the state of integrator switch 604 (FIG. 6) waveform 7D represents the state of differentiator switch 610 (FIG. 6); and waveform 7E represents the state of switch 1239 (FIG. 2) at the output of the one-track seek feedforward block 1238.

In FIG. 7, between time $T_0$ and time $T_1$ it is assumed that the servo loop is in the tracking mode, so that the positional error signal is essentially zero. However, at time $T_1$, a command to move the heads from the present track to an adjacent track is received from the master. At this time, the positional error signal PES rises immediately from zero to a value of one track width, as indicated by the steep rise in waveform 7A. As the servo mechanism operates, the PES signal asymptotically approaches zero.

The reduction of the positional error signal is achieved through the application of an acceleration pulse 702 from $T_1$ until $T_2$ to propel the actuator away from the present track toward the destination track. Immediately following the acceleration pulse 702 is a deceleration pulse 704 of opposite sign. As in the general case of any track seek, the deceleration pulse is determined to cause the heads to approach the destination track with a velocity profile which essentially asymptotically approaches zero at the time of arrival of the heads at the destination. The preferred manner in which to generate the acceleration pulse 702 and deceleration pulse 704 is described below.

Immediately upon receipt of the command to move one track, switches 604 and 610, which have previously been closed, are opened, to allow the one track seek servo controller to control generation of the interim control effort u(k). In any seek, whether one-track or multiple track, these switches are changed from the closed position to the open position at time $T_1$ in waveforms 7C and 7D.

As described briefly above, as the head approaches adequately close to the destination, indicated at time $T_3$, the window detector causes phase lead compensator switch 610 to be switched back to its closed position. It is not until time $T_4$ that integrator switch 604 is closed, allowing the phase lag compensator 606 to contribute to,he generation of the interim control effort signal u(k). Closure of switch 604 is delayed until time $T_4$ so that integrator 606 integrates only the area 706 (under waveform 7A) rather than integrating both areas 706 and 708. Integration of both areas 706 and 708 might cause overshoot and resulting oscillation, the transients of which may delay the final track capture. The closure delay until $T_4$ is normally determined by the window detector confirming adequately close tracking of the heads; however, in the event the window detector malfunctions, a predetermined timing delay will activate the switch so that the system will eventually use the integrator to track. In summary, the deceleration pulse, initiated when the head has been displaced by approximately 0.5 of a track, is terminated at the time marking closure of switch 610, while switch 604 is closed only when the PES has settled within a predefined window.

Speaking more conceptually, tracking servo bandwidth is constrained by sampling rate and mechanical resonances. The one-track seek feedforward controller assists the tracking controller in rapidly settling on the destination track to achieve a reduced access tame after the seek. In the manner described above, the output of the integrator continues to drive the DAC in order to compensate for current bias forces. The output of the double phase lead compensator is disabled from driving the DAC to prevent the natural servo system dynamics from opposing the feedforward control effort. The double phase lead input continues to monitor the PES signal during the motion in order to properly establish the initial conditions on the states when the feedforward controller is terminated.

Switch 1239, disposed at the output of one-track seek feedforward block 1238 (FIG. 2), is closed only between time $T_1$ and time $T_3$. This time period is the only time in which the block 1238 contributes to the final control effort output from summing device 1234 (FIG. 2). This period of closure reflects the ease with which the one-track seek controller is activated; control remains substantially within the tracking servo controller (FIG. 2) during one-track seeks rather than being transferred to the seek servo controller (FIG. 3).

Acceleration and deceleration pulse amplitude calibration in one-track seeks is performed as follows. The amplitude of the pulses for the specific drive and environment are determined by performing one-track seeks and evaluating a performance cost function over a suitably sized (for example, 2 row by n column) matrix of pulse amplitudes as well as a corresponding matrix of time durations. The elements of the matrix include acceleration and deceleration pulse amplitudes and corresponding time durations to be tested.

For example, the rows contain the acceleration pulse amplitudes and the columns contain the deceleration pulse amplitudes. Therefore, there are a variety of possible acceleration/deceleration pulse combinations from which the optimal combination is selected. What comprises optimal pulse amplitudes is determined by minimizing a cost function. The cost function is:

$$\text{Cost}(x) = a1 * \Sigma[abs(PES(k))] + a2 * N$$

for k=1, ... ,N, where

N=Number of samples to settle into tracking window;

a1=Weighting coefficient for the area; and a2=Weighting coefficient for the settling time, the weighting coefficients being chosen by the designer. The average cost=$\Sigma[\text{Cost}(x)]/Y$, for x=1, ... ,Y, where Y=number of one track seeks.

Therefore, the selected pulse amplitudes and durations provide the optimal one-track seek performance in terms of settling time (N) and positional error (PES). The optimal pulse amplitudes for inward and outward seek directions can be independently calculated to account for lack of symmetry in the two seek directions.

Optimal cost is saved as a reference value for continuous monitoring of the single track seeks during drive operation. If the current cost exceeds the optimal calibrated cost by a predefined amount, then a re-calibration may he automatically performed.

The following shows derivation of the initial condition equations for the states of the digital tracking servo controller's phase lead compensator 608 (FIG. 6) during track capture at the end of a velocity mode seek. The initial conditions for the double phase lead compensator are calculated by state initial condition calculation block 1236 (FIG. 2).

The tracking servo system exhibits a significant amount of overshoot at track capture. (For purposes of this discussion, "track capture" is defined as the transition from the seek mode (FIG. 3) to the tracking mode (FIG. 2).) Overshoot can cause an unacceptable settling time, but can be minimized by proper initialization of the phase lead compensator's states. When the phase lead compensator's states are properly initialized at track capture, a deceleration pulse of current is generated which is a function of the head velocity and distance to track center.

As an illustrative example, the following assumptions are made regarding plant nominal parameters:

| | |
|---|---|
| Actuator Inertia = | $6.582 * 10^{-4}$ oz-in-sec$^2$ |
| Torque Constant = | 12.04 oz-in/amp |
| Pivot to Head = | 2.062 in |
| Track Pitch = | $617 * 10^{-6}$ in |
| DAC/Amp Gain = | $21 * 10^{-6}$ amp/bit |

DSP scaling factors, relating the internal representation of bits in the DSP to measurements in the real world, may be as follows:

| | | |
|---|---|---|
| Velocity | 4096 $B_v$ = | 40 in/sec |
| Distance | 200 $B_d$ = | $617 * 10^{-6}$ in | where $B_v$, $B_d$ denotes a bit.

The phase lead compensator may be represented by equations according to state space theory, whose initial conditions may be determined as follows. Those skilled in the art are capable of determining from the known characteristics of the plant the desired Z-domain transfer functions $G_1(z)$ and $G_2(z)$ (FIG. 6). These transfer functions may be transformed to state space representation and expressed in a new structure, such as Jordan canonical form. In particular, the DSP tracking phase lead filter state equations are:

$$x_1(k + 1) = f_{2a0} * x_1(k) + f_{2a1} * x_2(k) - K_T PES(k)$$
$$x_2(k + 1) = f_{2a0} * x_2(k) + K_T PES(k)$$

The output equation is thus:

$$y(k) = f_{1a0} * x_1(k) + f_{1a1} * x_2(k) + f_{1a2} * K_T PES(k)$$

here $x_1$ and $x_2$ are the state variables and the f coefficients follow from the derivation from the known coefficients of the Z-domain transfer functions $G_1(z)$ and $G_2(z)$.

The initial conditions may be found as follows.

Assuming coil current is a simple multiple of the filter output (that is, $i(k)=\alpha y(k)$), and since:

$$i = -(J * V_{xo}^2)/(2 * \Delta x * K_t * R)$$

(where J is the actuator inertia, $V_{xo}$ is the initial velocity, $\Delta x$ is the initial distance to the destination track, $K_t$ is the torque constant (not to be confused with the gain factor $K_T$), and R is the distance between the actuator pivot and heads), therefore an initial condition for state variable $x_1$ in terms of the actuator structure is:

$$x_1(0) = (-\frac{1}{2}f_{1a0}) * [(J * V_{xo}^2)/(2 * \alpha * \Delta x * K_t * R) + f_{1a2} * K_t * PES]$$

Therefore, in this particular example, the initial condition equations are:

$$x_1(0) = -(19.514 * vel^2/dist + f_{1a2} * K_T PES)/(2 * f_{1a0})$$

$$x_2(0) = -x_1(0)$$

where "vel" is the head velocity [Bv bits] from the observer at the current sampling instant, and "dist" is distance [Bd bits] to track center; here, a positive current corresponds to a positive displacement "dist".

This ends discussion of phase lead compensator state equation initial condition determination.

Detailed operation of the window detection block 1222 (FIG. 2) is illustrated in FIG. 23A.

The preferred window detection algorithm is preferably implemented in DSP code to detect the completion of track settling. The settling could be initiated by a transition from velocity mode seek to position mode tracking or simply due to an external disturbance causing a transient. The objective of the algorithm is to optimally detect the "settled condition" in order to maximize the available time for the drive to read and write data to the disk. The basic problem of settling detection is illustrated by a transient response signal. The damping associated with the illustrated signal is very small relative to the tracking servo system (50 degree phase margin), in order to clearly demonstrate the problem. Minimum settling time detection may be defined as a fraction of the natural frequency of the closed loop servo system; a suitable value is half of a cycle.

Referring to FIG. 23A, a waveform 802 resembling a damped sinusoid indicates the positional error signal as a function of time during track settling. The positional error signal waveform 802 is shown approaching zero value, but reflects excursions beyond values X and −X to illustrate an oscillation of the heads about the center of the track. FIG. 23A also illustrates a hysteresis range $X_{hyst}$ centered about the +X and −X values on the vertical PES axis. In the bottom part of FIG. 23A, a binary window detection output is illustrated as a function of time.

From time $T_0$ to time $T_1$, the window detection output is positive, indicating that the PES is stably located within the +X to −X range. However, at time $T_1$, the PES signal exits the range (perhaps to seek another track, or perhaps because of a physical jarring), causing the window detection output to change state. The window detection output remains in its negative state until it is determined that the PES has returned to a stabile location within the +X to −X range about the center of the indicated track. In FIG. 23A, this time is illustrated as $T_5$.

Assuming the motion from the source location to the destination track follows an oscillatory path, the damped sinusoid passes through the value $X-(X_{hyst}/2)$, indicated at 804, at time $T_2$. At time $T_2$, a counter with a pre-set value is started. However, in the illustrated example, the counter does not expire before the waveform exits a given range, illustrated at point 806 where its magnitude is $-X-(X_{hyst}/2)$, this exit occurring at time $T_3$. The non-expiration of the counter indicates that the heads have not settled within the proper distance of the center of the track, so that the window detection output remains inactive.

As the PES waveform reenters a range at time $T_4$, indicated at point 808, the counter again counts down from a pre-set value. In this case, after time $T_4$, the counter decrements to zero, indicating stable tracking to within desired tolerances. The counter here expires at time $T_5$, which is delayed by a period $T_{settle}$ from time $T_4$. The window detection output becomes active at time $T_5$.

The Positional Error Signal (PES) inherently has random noise on it. Therefore, the algorithm includes a hysteresis feature to prevent the noise from causing undesirable switching oscillations during a transition across a window boundary. To prevent noise-induced effects, hysteresis zones 810 and 812 are provided, centered about respective PES values X and −X. Provision of the hysteresis zones 810 and 812 prevents false triggering of the counter which might otherwise be caused at times such as at time 814.

It is to be understood that FIG. 23A illustrates a generalized track settling waveform for a variety of parameters of interest. The settling detection algorithm fulfills a requirement for at least four distinct windows. Windows are defined for detecting (1) a tracking integrator window for the tracking integrator 606 and its input switch 604, and (2) a high gain window for determining when sensor 130 (FIG. 1A) should be in high gain mode. The remaining two windows define when the controller can (3) read data, or (4) write data.

Assuming nominal values are as follows:

| | |
|---|---|
| Track Density = | 1620 Tracks/in |
| Integrator Window = | ±4 Tracks |
| Read Window = | ±0.5 Track |
| High Gain Window = | ±0.056 Track |
| Write Window = | ±0.04 Track | and PES sensitivity is:

| | |
|---|---|
| Low Gain = | $5.3 * 10^5$ Bits/in |
| High Gain = | $3.15 * 10^6$ Bits/in | and

| | |
|---|---|
| Closed Loop BW = | 325 Hz |
| Disk rotation speed = | 3511 RPM |
| ID Sectors/Rev = | 44 Sectors/Rev |
| OD Sectors/Rev = | 54 Sectors/Rev |

Typical values which may be used in an operational scenario for determination of the X to −X range, and resultant settling time given certain assumptions about the physical structure of the disk drive, are provided in the charts below. Of course, it is understood that different disk drives have different parameters; furthermore, there is some adjustment left to the discretion of the individual designer. Variations from the listed values may be made in accordance with considerations known to those skilled in the art.

| Window | Nom. Value (Track) | Hysteresis (Track) | Settling Time (msec) |
|---|---|---|---|
| Integrator | 4 | 0.5 | 1.5 |
| Read | 0.5 | 0.1 | 1.9 |
| High Gain | 0.056 | 0.013 | 1.1 |
| Write | 0.04 | 0.01 | 2.3 |

Figure 9:
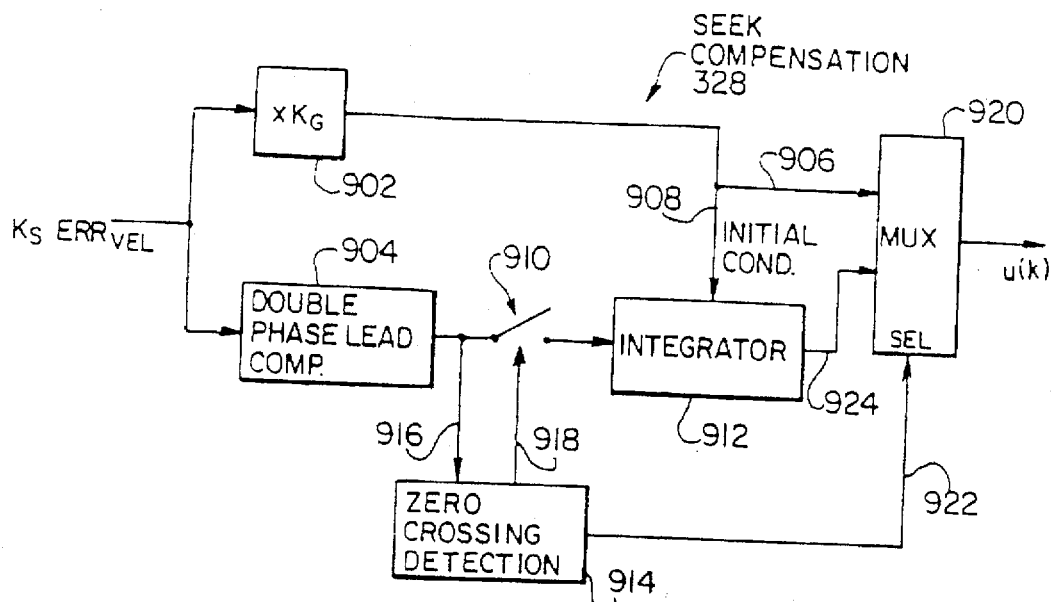
FIG. 9 illustrates in greater detail the seek compensation block 328 from FIG. 3.

FIG. 9 illustrates in detail the preferred structure of the seek compensation block 328 (FIG. 3). The structure of the block is described immediately below; its operation is described with reference to FIG. 10.

The velocity error multiplied by the coefficient $K_S$ by multiplier 324 enters two parallel paths in the compensation block 328. A first path, an essentially uncompensated path for the acceleration phase of a seek, enters a multiplier 902 which multiplies the input by a factor $K_g$. The input also feeds a double phase lead compensator 904 in a second path, which is a highly compensated path for control during the deceleration phase of a seek.

In the first path, the input is multiplied by a $K_G$ for use during the initial portion of the seek, in which a high-magnitude, constant acceleration is desired. Multiplier 902 feeds the first input of a multiplexer 920 along a path 906, as well as feeding initial conditions to an integrator 912 along a path 908.

In the second path, the output of the double phase lead compensator 904 is input to a switch 910, the output of the switch being connected to the input of an integrator 912. The input of a zero crossing detection latch 914 receives the output of the double phase lead compensator along path 916, and delivers a switch control signal along path 918. The position of switch 910 is determined by the output of zero crossing detection latch 914. The zero crossing detection latch 914 controls the select input of multiplexer 920, first selecting the output of multiplier 902 on path 906 and thereafter the output of integrator 912 on path 924. The output of multiplexer 920 comprises the interim control effort signal u(k).

Figure 10A:
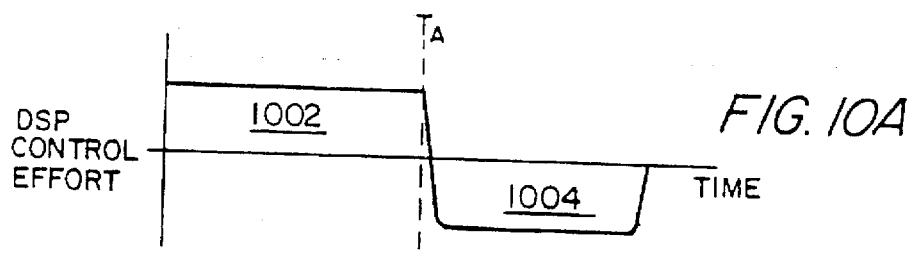
FIG. 10A–10C are a timing diagram useful in illustrating the operation of the reference velocity deceleration compensator 346 of FIG. 3.
Figure 10B:
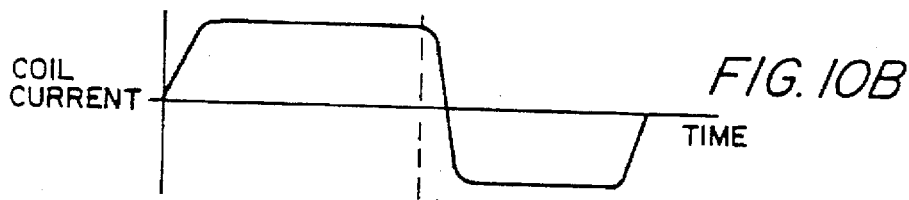
Figure 10C:
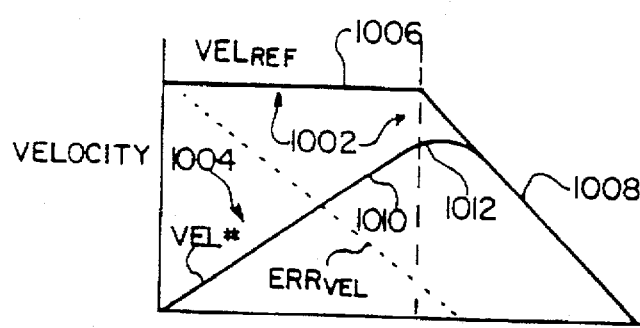

Referring now to FIG. 10, three waveforms are presented for illustrating operation of the seek servo controller compensator in FIG. 3.

Graph 10A illustrates the DSP control effort output U(k) as a function of time. An acceleration pulse 1002 changes to a deceleration pulse 1004 at an optimally chosen time $T_A$. Graph 10B illustrates the coil current as a function of time. The coil current shown in graph 10B generally follows the control effort signal in 10A, although such factors as back EMF and inductance round the edges of the acceleration and deceleration pulses.

Graph 10C illustrates velocity as a function of time for $VEL_{REF}$ (the reference velocity waveform 1002) and VEL# (the feedback velocity waveform 1004). Reference velocity waveform 1002 is that output from the reference velocity generator 316 (FIG. 3). Feedback velocity 1004 is the VEL# output from observer 342. The difference between these two signals, $ERR_{VEL}$, output by summation device 322, is also illustrated in graph 10C.

Graph 10C illustrates the approach of the feedback velocity waveform 1004 to the reference velocity waveform 1002. Preferably, the approach is asymptotic, but may be otherwise if inadvertently or purposefully underdamped or overdamped.

At the time $T_A$, the reference velocity changes from its constant value on segment 1006 to a linearly decreasing segment 1008. At time $T_A$, the feedback velocity 1004, which had been substantially linearly increasing along a segment 1010, begins its substantially asymptotic approach to reference velocity segment 1008, as indicated by curve 1012. As the heads approach the center of the destination track, the reference velocity and the feedback velocity become indistinguishable, indicating the $ERR_{VEL}$ output of summation device 322 (FIG. 3) is reduced to near zero; this minimizes the compensation which must be performed by the seek compensation block 328 (FIGS. 3 and 9).

In operation, switch 910 (FIG. 9) of the seek compensator is open during the initial portion of the seek and multiplexer 920 passes the adjusted velocity error on path 906 as the interim control effort output. However, when the double phase lead compensator 904 approaches zero, zero crossing detector 914 causes closure of switch 910 and changing of multiplexer 920 to select the output of integrator 912. (In practice, the time derivative of the error signal moves back and forth about zero; it is the first crossing which causes the latch to change state.) Simultaneously, the output of multiplier 902 is loaded into the integrator 912 along path 908 as the integrator's initial condition; this simultaneous switching of multiplexer 920 and loading of initial conditions into the integrator 912 assure substantial continuity in the output of multiplexer 920. After zero crossing detection latch 918 causes closure of switch 910, the control effort is effectively the integrated output of the double phase lead compansator 904.

Referring now to FIG. 11, a block diagram including mathematical models of the power amplifier and actuator illustrates the portion of the plant receiving the control effort signal U(k) from the DSP 110 (FIG. 1A). The plant includes DAC 114, power amplifier 116, actuator coil 118, and actuator model 1150.

DAC 114 comprises a series-connected digital to analog converter 1102, gain block 1104, and notch filter 1106. Digital to analog converter 1102, having a finite word length, is optimized to provide a suitable dynamic range to the control effort signal. Gain circuit 1104 scales the analog control effort value to a suitable range before being input to a power amplifier 116. Notch filter 1106 filters unwanted resonances. A particular embodiment of the DAC is illustrated in FIG. 1B.

Power amplifier 116 may be conceived as comprising a summation block 1108 which receives at its non-inverting input a reference voltage output by the notch filter 1106. The inverting input of the summation device 1108 receives a voltage output from a current sensing device 1120, the voltage indicative of the current passing through the actuator coil. Summation device 1108 thus produces a voltage indicating current error signal.

A conventional compensation network 1110 receives the error signal preparing it for the power stage 1112 which converts the voltage to a high current. The high current is voltage-limited by limiter 1114 before being input to the non-inverting input of a summation device 1116. Summation device 1116 receives at its inverting input a quantity indicative of the back EHF of the coil. The current output from current summation device 1116 drives the actuator coil. The current in the actuator coil is sensed by current sensing device 1120 for feedback to summation device 1108.

The coil current on path 1122 is also input to the actuator which is modeled as illustrated. The current is multiplied by a torque constant $K_t$ and a distance R equal to the distance between the actuator pivot and the heads. The output of multiplier 1124 is input to the non-inverting input of a torque summation device 1126. The output of the torque summation device is input to a multiplier 1128 which divides its input by the actuator inertia J. The output of divider 1128 is integrated by integrator 1130. Integrator 1130 feeds a multiplier 1132 which multiplies its input by a back EMF constant $K_{bemf}$. This multiplied quantity is input to the inverting input of summation device 1116, indicating the BEMF.

The output of integrator 1130 is fed back to the inverting input of torque summation device 1126 after being multiplied by a viscous damping constant $K_x'$ at block 1138. The output of integrator 1130 also feeds a second integrator 1134, whose output indicates the absolute position of the heads on path 1136. The absolute head position is fed back to another non-inverting input of the torque summation device after being multiplied by a spring constant $K_x$ in block 1140.

Figure 12:
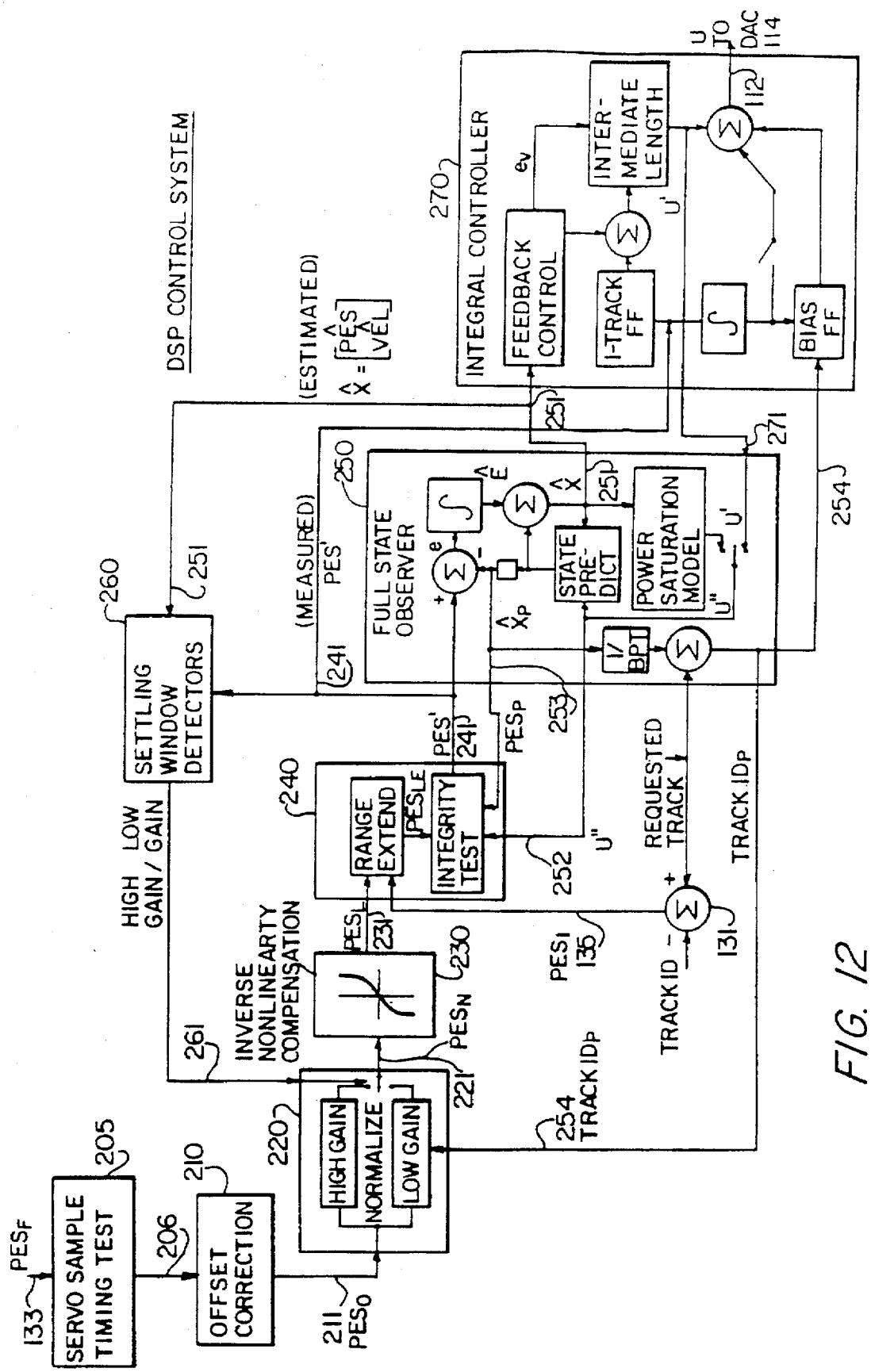
FIG. 12 is a high-level flow diagram showing major functional blocks in the DSP control system according to a second embodiment of the present invention.
Figure 15:
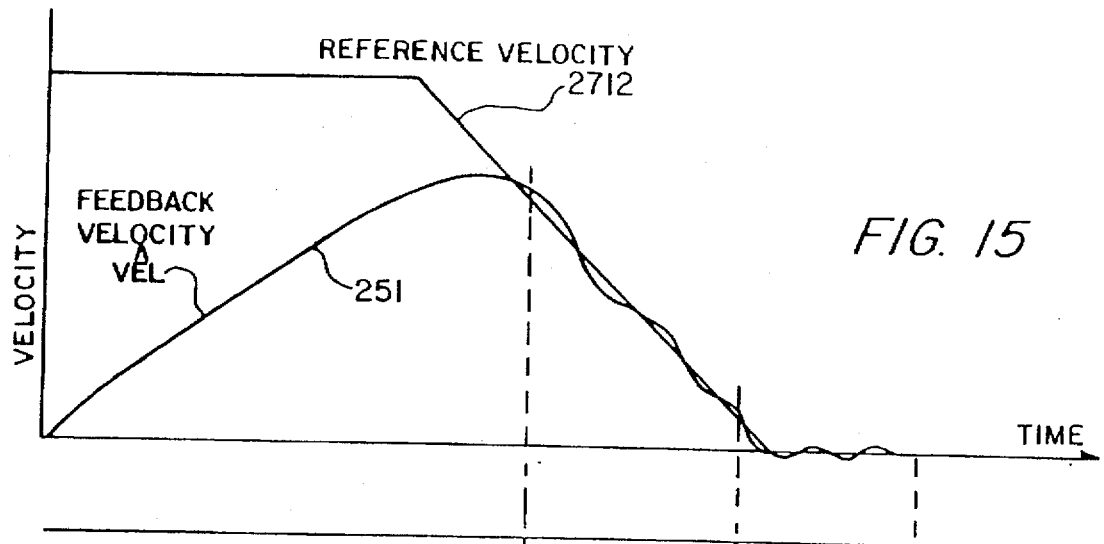
FIG. 15 illustrates various operational characteristics which are present during successive periods entered during a typical seek operation.
Figure 16:
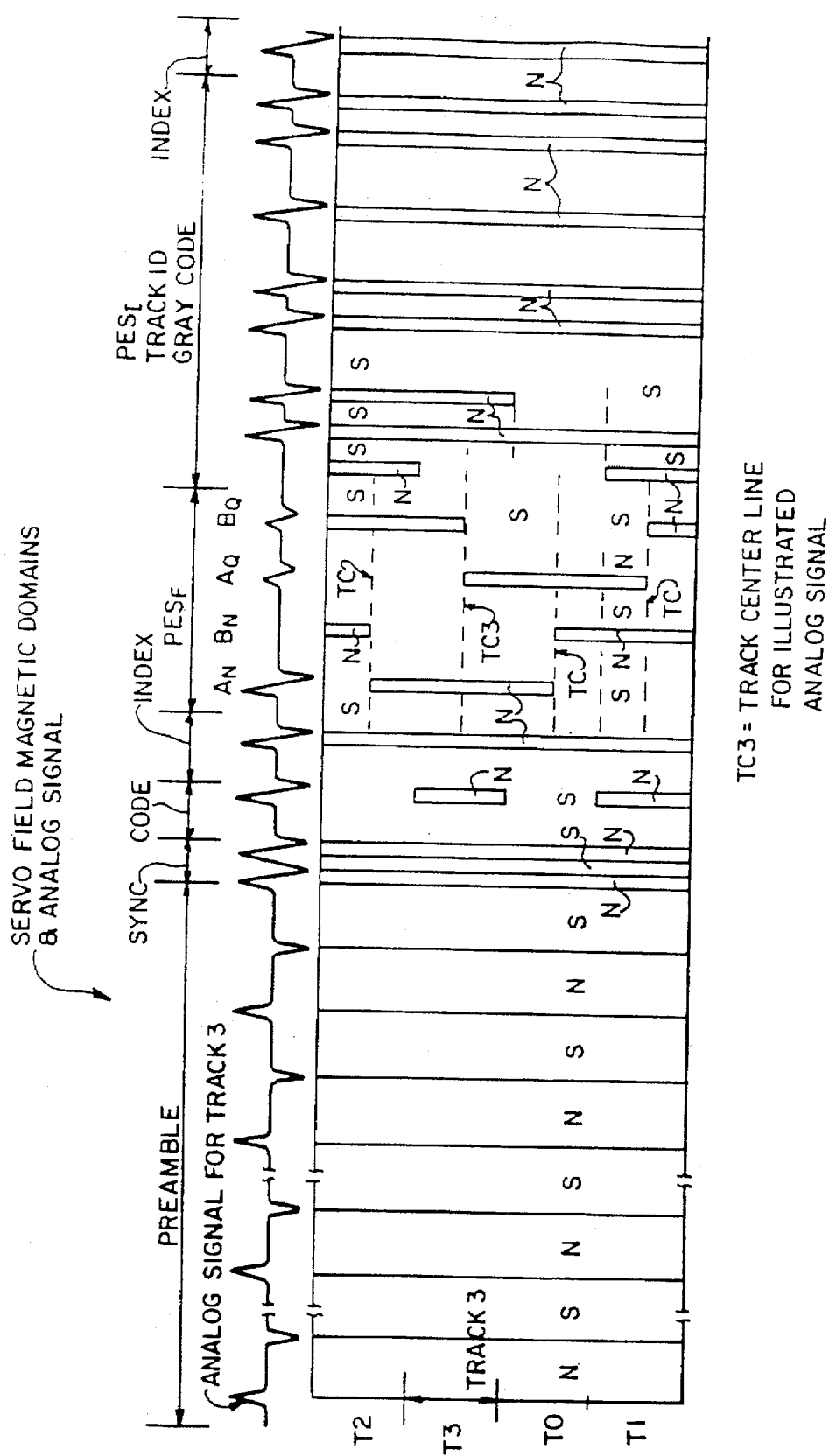
FIG. 16 illustrates a typical servo field with an associated analog signal derived from an exemplary track.

SECOND EMBODIMENT. A second embodiment of the invention is described with special reference to FIGS. 12 and 13. The description of this embodiment is provided in the following order:

Functional Descriptions:
Servo Field Structure (FIG. 16)
DSP Control System (FIG. 12)
Servo Timing Test
Offset Correction (FIGS. 17A, 17B)
Gain Normalization (FIGS. 18A, 18B)
Inverse Nonlinearity Compensation (FIG. 19)
Range Extension; Integrity Test (FIGS. 20A–20C)
Power Amplifier Model (FIGS. 21A, 21B)
Observer (FIG. 22)
Settling Window Detectors (FIGS. 23A, 23B, 23C)
Integral Controller (FIGS. 24, 25)
Single Track FF Controller (FIGS. 26A, 26B)
Bias Feedforward Controller (FIG. 27)
Intermediate Length Feedforward Controller (FIGS. 28A, 28B, 28C)
Re-calibration (FIG. 29)
Dynamic Scaling of Parameters (FIG. 30)
Description of Sequential Steps:
High-level Flow Chart (FIG. 13)
High-level Timing Diagram (FIG. 14)
Phases Experienced During Seeks (FIG. 15)
Commend Routines
Control Routines
Subroutines
Window Routines
Post Processing Routines
Calibration Post Processing Routines The Servo Field. FIG. 16 is a magnetic domain diagram of a preferred servo field which is radially disposed between sectors on the disk. Briefly, this servo field provides positional information to a head passing over it, in the form of integer gray coded TrackID's and dibit pairs which allow determination of fractional position information. Sensor element 130 in FIGS. 1A and 1B schematically illustrate the detection and use of some portions of this servo field, with FIG. 5A showing more specifically the generation of integer and positional error signals $PES_I$ and $PES_F$, respectively. FIG. 12 shows how the preferred servo system uses the $PES_I$ and $PES_F$ signals to control the servo loop.

FIG. 16 illustrates the magnetic domain pattern of the servo field for four adjacent tracks, with the analog signal near the top of the figure identifying the corresponding signal detected by the data head as it passes over the center of track 3, indicated TC3. In a preferred embodiment of a disk drive having 120 MB of data on two disks, 44 servo fields are provided on the inner zone of each disk surface, and 54 on the outer zone.

In FIG. 16, the head passes over the magnetic domain surface from left to right in the figure, in accordance with the following description.

The preamble is a low frequency alternating north/south domain pattern which enables logic circuitry to detect the beginning of the servo frame. The frequency of the preamble pattern is selected to be an illegal data pattern, to prevent servo field detection logic from falsely triggering on a data pattern.

Sync pulses after the preamble provide an accurate synchronizing marker for subsequent operations.

A code bit, located after the sync pulse field, defines which set of A, B domains to select. The determination is relevant to processing information in the $PES_F$ field, described below. Specifically, the presence of a code bit enables the selection of the $A_Q$, $B_Q$ dibits, whereas the absence of a code bit enables the selection of the $A_N$, $B_N$ dibits.

The index field is a marker present in only one servo field per disk revolution. The head thus encounters the index field once per revolution, allowing, for example, accurate motor speed control.

The fractional portion of the positional error signal, $PES_F$, is generated from peak detection of the pair of dibits $A_N$, $B_N$ or $A_Q$, $B_Q$ identified by the code bit. Therefore, $PES_F=A_N-B_N$ if code bit is not present; or, $PES_F=A_Q-B_Q$ if code bit is present.

The determination of $PES_F$ from the $A_N$, $B_N$ or $A_Q$, $B_Q$ dibits is made in accordance with FIG. 5B, as described elsewhere in this specification.

In the preferred embodiment, two offset calibration tracks are provided, one in each zone. In every tenth servo field in these offset calibration tracks, dibits are placed on the same side of track center to allow determination of offset. This arrangement is shown in FIG. 17B, and is not further described here.

Again referring to FIG. 16, a unique track identification number, TrackID, is identified in the form of a gray code pattern which immediately follows the $PES_F$ segment. This pattern provides the servo system with head positional information at each sample, as described with reference to the range extender in FIG. 20A. The integer portion of the positional error signal, $PES_I$, is calculated by subtracting the requested track from the current track, the current track being the track identification number measured in the gray code field.

This arrangement distinguishes the invention from known systems in which track identity information may be present in the user data field (as opposed to the servo field). In the known systems, the track information had to be processed through the master (102 in FIGS. 1A, 1B) rather than being immediately accessed and quickly processed in the DSP (110 in FIGS. 1A, 1B). Thus, according to the present invention, the delays of known position control systems are eliminated, allowing full and immediate DSP knowledge of position and positional error in the DSP itself.

DSP CONTROL SYSTEM-HIGH LEVEL FLOW DIAGRAM. FIG. 12 illustrates schematically a second implementation of the DSP control system according to the present invention. As previously described, the functions of the second embodiment of the DSP block 110 (FIGS. 1A, 1B) are implemented totally in firmware in a Texas Instruments TMS320C15PEL, so that the various "blocks" shown in FIG. 12 are embodied in blocks of code. Each block of code is not necessarily a contiguous block in memory. Thus, the various "blocks" shown in FIG. 12 are not physical elements in the preferred embodiments, although it lies within the contemplation of the invention that they could be implemented as such.

Moreover, FIG. 12 illustrates only the general relationship of the major functional blocks. The functional sub-blocks shown within the major blocks are very schematic in nature, and many sub-blocks have been omitted for the sake of graphic clarity. The major blocks, the functional sub-blocks, the additional functional blocks not specifically illustrated in FIG. 12, and the operation of all of these entities, are described below, with reference to FIGS. 12 through 30.

Broadly, the objects of the DSP control system are to measure the head positional error sample including $PES_F$ (fractional PES) and $PES_I$ (integer PES, or number of tracks of error), and to generate an appropriate control effort u(k) to center the heads onto the track center which causes the PES measurement to converge to zero.

To achieve these objects, the functional blocks shown in FIG. 12 process the measurement to remove or minimize errors which originate from offsets and gain variation in the head position sensor, as well as nonlinearities in the sensor's response. Further, the effects of noise on individual measurements are filtered. The DSP control system also uses a state space implementation of an observer to emulate the dynamics of the plant (FIG. 1A elements 114–132) to provide access to the velocity state and a filtered positional state. Moreover, the DSP control system eliminates steady state error introduced by biases acting on the heads and utilizes calibrated measurement data to optimize the servo system dynamic and static performance.

Referring more specifically to FIG. 12, several inputs are shown entering the DSP control system. A first input is the integer positional error signal $PES_I$ on path 135, derived from the TrackID gray code field in FIG. 16. $PES_I$ is derived by subtracting the track ID from a requested track sent by the master. The subtraction is schematically illustrated in FIG. 12 by an adder 131, at whose non-inverting input is the requested track received through command register 162 (FIG. 1B). Adder 131 receives the track ID at its inverting input. In a particular preferred embodiment, the track ID is read from servo fields which are radially disposed on the disk, spaced between sectors thereon.

A second input to the DSP, the fractional positional error signal $PES_F$, is input on a path 133. $PES_F$ is output on path 133 by analog-to-digital converter 132 (FIGS. 1A, 1B), and is ultimately derived by processing dibit signals A and B (FIG. 16).

The fractional positional error signal $PES_F$ is input to a servo sample timing test block 205. Timing test block rejects any apparent servo samples which occur outside their expected time frame, but passes the samples which occur as expected in the proper time frame.

Figure 17A:
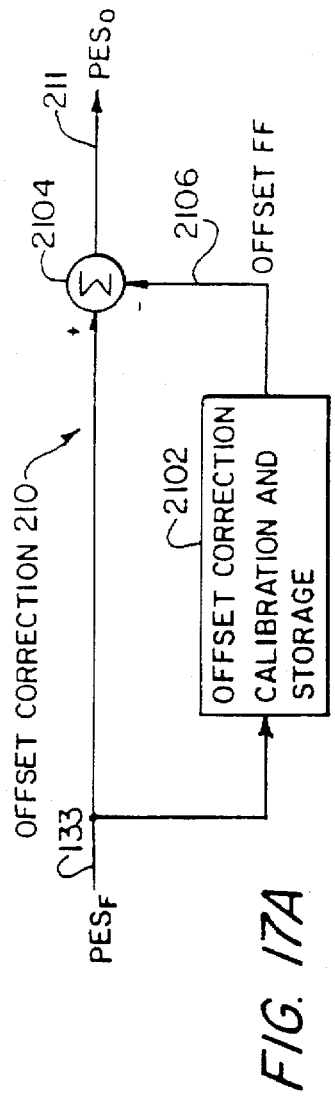
FIG. 17A illustrates the offset correction block, including the offset correction calibration block.
Figure 17B:
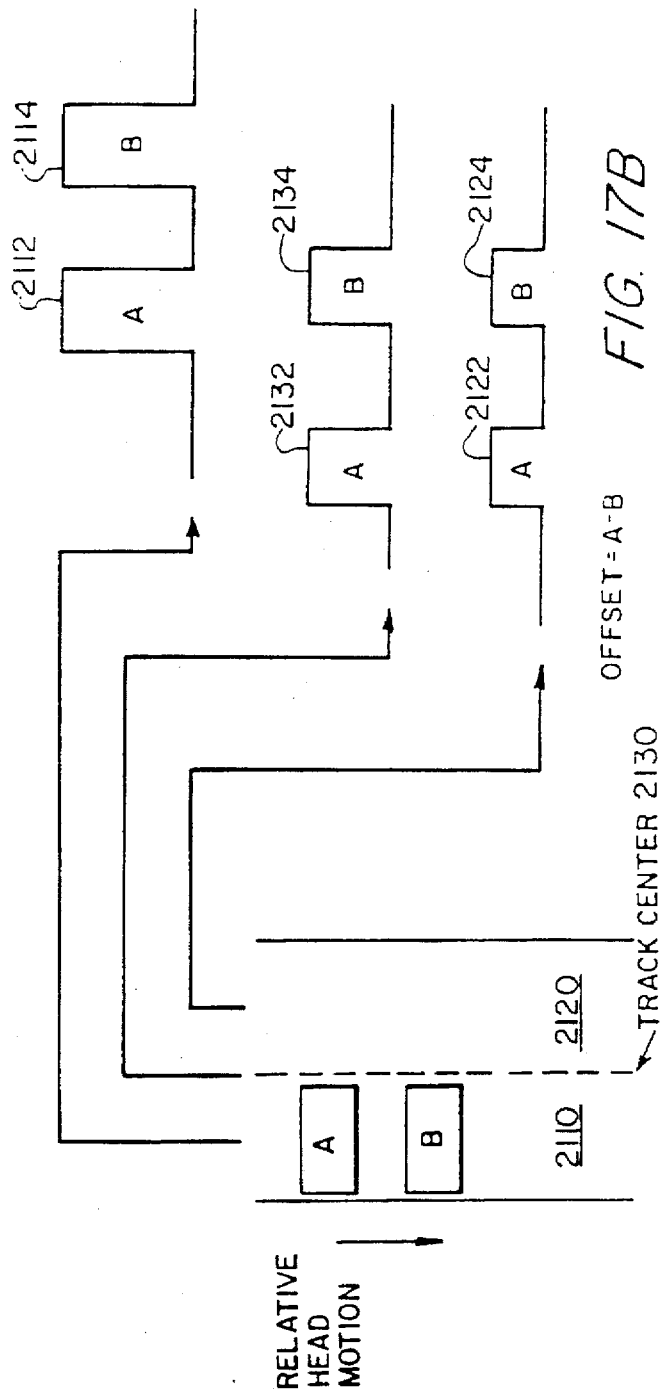
FIG. 17B illustrates the arrangement of dibits on the same side of track center, for use in determining offset.
Figure 18A:
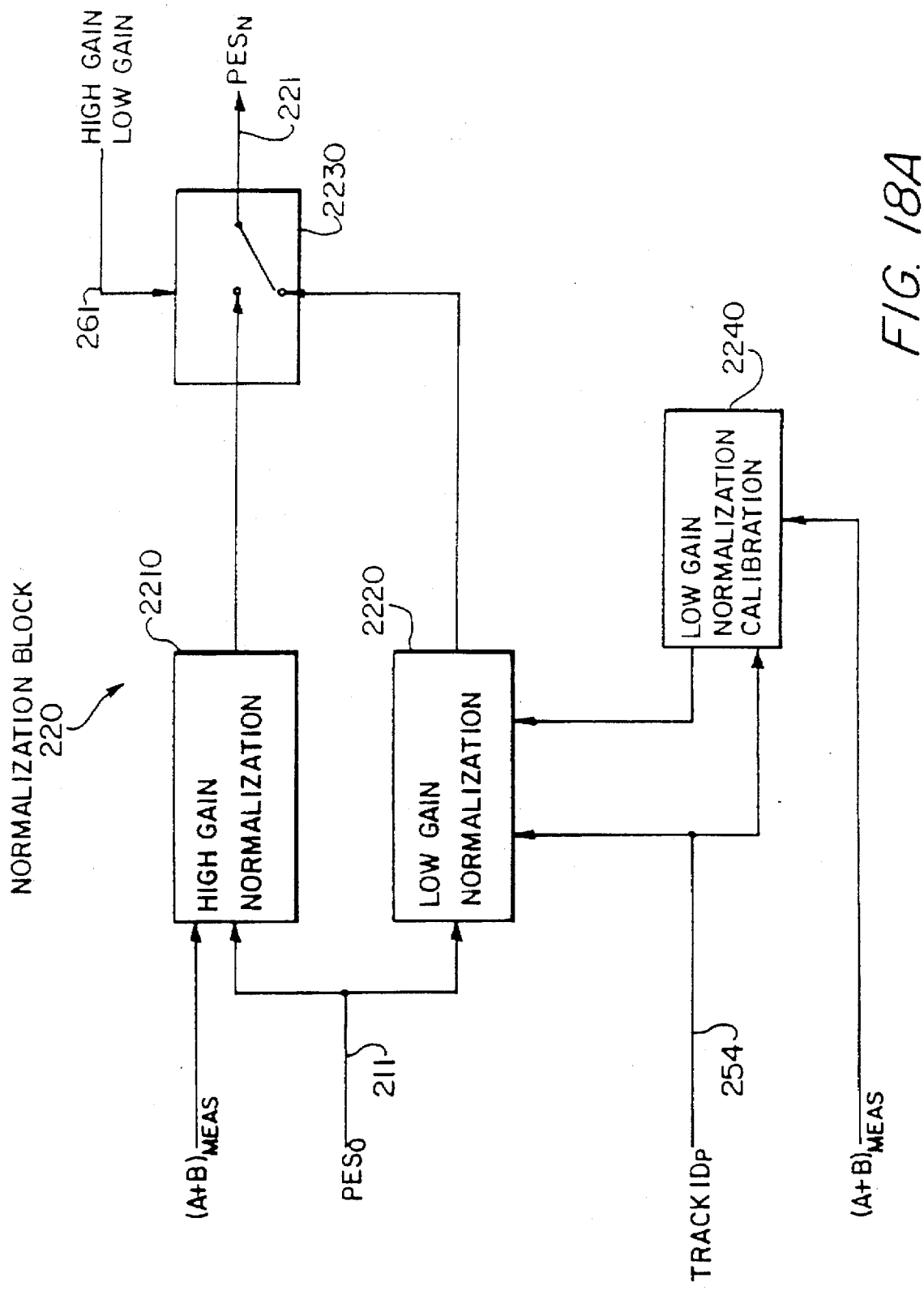
FIG. 18A shows the high gain normalization block, the low gain normalization block with associated calibration block, and an associated switching function.

Assuming the servo field was found in the correct time period, the fractional positional error signal $PES_F$ is passed on to an offset correction block 210, more details of which are illustrated in FIG. 17A. The offset correction block 210 provides an offset-corrected positional error signal $PES_O$ on path 211 to a normalization block 220. Further details of the normalization block 220 are illustrated in FIG. 18A. The normalization block provides a normalized positional error signal $PES_N$ on a path 221.

The normalization block 220 receives as further inputs, a predicted track ID $TrackID_P$ on path 254 and a high gain-low gain control signal on path 261. The origin and generation of these two input signals are described below, with reference to FIGS. 21A, 22, 23A, and 23B.

An inverse nonlinearity compensation block 230 receives the normalized positional error signal $PES_N$ from path 221. The inverse nonlinearity compensation block 230 provides a linearized positional error signal $PES_L$ on path 231. Details of inverse nonlinearity compensation block 230 are provided below, with reference to FIG. 19.

The linearized fractional positional error signal $PES_L$ is provided to a sample integrity tester and linear range extender 240. The integer positional error signal $PES_I$ is also provided to the sample integrity tester and linear range extender 240, on path 135. A third input to the sample integrity tester and linear range extender 240 is a predicted positional error signal $PES_P$ which is provided on path 253. A fourth input to the sample integrity tester and linear range extender is a second interim control effort signal u"(k) which is provided on path 252. The sample integrity tester and linear range extender provide an interim positional error signal PES'(k) on path 241. Further details of the structure and operation of the sample integrity tester and linear range extender 240 are provided below, with reference to FIGS. 20A and 20B.

A full state observer 250 receives the interim positional error signal PES'(k) on path 241. It also receives a first interim effort signal u'(k) on a path 271. The full state observer provides $\hat{x}(k)$, a 1-column by 2-row vector quantity comprising $\hat{PES}(k)$ and $\hat{VEL}(k)$, on path 251. Further, the full state observer provides the second interim control effort signal u"(k) to the sample integrity tester in block 240, via path 252. The full state observer also provides the predicted positional error signal $PES_P$ to the sample integrity tester on path 253. Finally, the full state observer provides a predicted track ID $TrackID_P$ (a sum of the requested track and $PES_P$), on path 254 for use in the normalization block 220 and an integral controller 270 (described below). Further details of the full state observer are provided below, with reference to FIGS. 21A, 21B, and 22.

The $\hat{x}(k)$ vector provided on path 251 and the interim positional error signal PES' on path 241 are received by a settling window block 260. Settling window block 260 generates a high gain-low gain signal on path 261, for use in the normalization block 220. Settling window detector also produces various window signals for governing operation of an integral controller (described below), and read and write enablement.

The $\hat{x}(k)$ vector on path 251, as well as the interim positional error signal PES' on path 241 and predicted track ID on path 254 are received by an integral controller 270. The primary purpose of the integral controller is to provide the DSP's output control effort u(k) on path 112. However, the integral controller 270 also provides the first interim control effort u'(k) on path 271 to the full state observer. Further details of the integral controller 270 are provided below, with reference to FIG. 24.

The details of the functional blocks of FIG. 12 are now described in greater detail.

Servo Sample Timing Test 205. Full state observer 250 and integral controller 270 function properly, only if the sample period corresponds to a full sample time. If a supposed "sample" occurs before it is expected (as determined by the speed of rotation of the disk and the distance between servo fields between disk sectors), the "sample" is ignored, and a next sample is awaited for processing. If the expected time of arrival passes without a servo field being detected, then the loop operates in "freewheel" mode, with the estimate state variables generated within the full state observer 250 governing the servo controller during the current sample period.

Offset Correction Block 210. Referring now to FIG. 17A, the offset correction block 210 is illustrated in detail. Very briefly, the offset correction block measures the $PES_F$ sensor's electrical offset component. This measurement is accomplished by utilizing offset calibration dibits located in a non user data portion of the disk.

Essentially, the electrical offset of a sensor is understood by referring to FIG. 5A. In FIG. 5A, two paths for analog data are illustrated in sensor 130. A first path includes sample-and-hold block 504 and a subtractor 508. A second path includes a sample-and-hold block 506 and an adder 510. Because no two circuits can be identical, even if identical-magnitude pulses enter the two sample-and-hold blocks 504, 506, the analog magnitude of the signals entering subtractor 508 and adder 510 may not be absolutely identical. This phenomenon is called electrical offset. During operation, the differences in the electrical characteristics of the upper path and lower path cause A and B to be different at the inputs to subtractor 508 and adder 510, so that the difference and sum signals output therefrom also reflect the electrical offset. To correct for this electrical offset, the offset calibration block 2102 (FIG. 17A) is provided.

The FIG. 17A offset correction block 210 essentially comprises a feedforward offset correction calibration block 2102, and an adder 2104. The fractional positional error signal $PES_F$ on path 133 is input to the offset correction calibration block 2102 which produces a feedforward offset correction value on path 2106. Adder 2104 receives at its non-inverting input the fractional positional error signal $PES_F$. Adder 2104 receives the feedforward offset value on path 2106 at its inverting input. The output of the offset correction block 210 is the offset-corrected positional error signal $PES_O$.

The offset correction calibration block 2102 functions in the following manner. Brief reference is made to FIGS. 16 and 5B. Whereas the fractional positional error signal $PES_F$ is derived from dibits disposed on opposite sides of track center (FIG. 5B, and the $PES_F$ region in FIG. 16), an offset value is determined from dibits which are located on the same side of track center (FIG. 17B). Dibits on the same side of track center are not illustrated in FIG. 16. Such same-side dibits may be provided on every tenth servo field (ten being exemplary and non-limiting), so that 90% of the servo fields have dibits on opposite sides of track center to allow accurate determination of $PES_F$ in accordance with FIGS. 5B and 16. The observer (described below) freewheels during the offset sample to minimize degradation of tracking performance.

FIG. 17B illustrates two such successive offset measurement dibits A and B in isolation. If the head is located over the half of the track having the dibits, indicated as 2110, two large-magnitude pulses 2112 and 2114 are produced. In contrast, when the head is located over the half of the track which does not have the dibits, indicated as 2120, very small magnitude pulses 2122 and 2124 are generated. However, when the head is centered on the track, indicated as 2130, two medium-magnitude pulses 2132 and 2134 are generated.

Thus, when the head is properly centered over the track, it is expected that pulses will be generated having a magnitude substantially the same as pulses 2132, 2134. The "offset value" for a given sample is defined as the value of the magnitude of one pulse minus the value of the magnitude of the other pulse; that is, A–B. The offset samples are averaged over a sufficient number of offset dibits, so as to minimize or eliminate the effects of any noise. The resultant average of offsets is saved, thus completing the calibration. During operation, the saved average is output by block 2102 on path 2106 to be subtracted from the positional error signal $PES_F$ by adder 2104 (FIG. 17A). The averaged "offset values" correct the electrical offset phenomenon described above.

Normalization Block 220. The offset-compensated positional error signal $PES_O$ is input to the normalization block 220, illustrated in greater detail in FIG. 18A. Briefly, the purpose of the normalization block is to correct for gain variations of the $PES_F$, reflecting variations in the magnitude of A and B pulses (see FIG. 5B).

The fractional $PES_F$ measurement has significant inherent gain variations. For example, $PES_F$ varies as a function of head, disk zone, and radial position on the disk. The gain variations result from the specific properties of the head and disk medium, for example. The servo system requires significantly large gain stability margins to guarantee servo stability in the high volume of drives manufactured. Accordingly to the present invention, a solution is to normalize the gain variation of the position sensor. This is accomplished by measuring the total signal strength $(A+B)_{meas}$ in addition to the $PES_F$=A–B and appropriately scaling the $PES_F$. Symbolically, $$PES_N = PES_O \cdot (A+B)_{REF}/(A+B)_{MEAS}$$

where $PES_N$ is the normalized positional error signal, $PES_O$ is the un-normalized positional error signal, $(A+B)_{REF}$ is a reference value described below, and $(A+B)_{MEAS}$ corresponds to the current sample.

This technique works well provided that the measurement is a well-behaved linear signal, a valid assumption when the data head is positioned close to track center. However, the PES linearity significantly degrades when the head position deviates from track center. The inventive control system includes a feedforward $PES_F$ normalization algorithm which utilizes the accurate gain variation data measured when the head is on track center to derive the optimum normalization function for low gain measurements.

Referring more specifically to FIG. 18A, the normalization block 220 includes a high gain normalization block 2210 and a low gain normalization block 2220. Both blocks 2210 and 2220 receive the offset-compensated positional error signal $PES_O$ on path 211. Depending on whether the controller is in a high-gain mode or a low gain mode, the high gain normalization block 2210, or the low gain normalization block 2220, respectively, provides the normalized positional error signal $PES_N$ on path 221. The selection between the outputs normalization block 2210 or 2220 is shown schematically by a selector 2230 whose control input is the high gain/low gain signal on path 261 from settling window block 260 (FIG. 12).

For example, when the controller is in low gain mode, indicating the heads are not stably positioned over a track center, the output from the low gain normalization block 2220 is chosen by selector 2230 as the normalized positional error signal $PES_N$. Conversely, when the controller is in high gain mode, indicating the heads are stably positioned over a track center, the output from the high gain normalization block 2210 is chosen by selector 2230 as the normalized positional error signal $PES_N$. In the preferred embodiment, the decision as to whether or not a head is closely approaching track center is determined by whether or not it has stably settled to within ±8% of the track width, as determined within settling window detection block 260. In this manner, the undesirable variations of the sensor's gain are normalized, both when the controller is in low gain mode and when it is in high gain mode.

The high gain normalization block 2210 also receives $(A+B)_{MEAS}$, a measured value of A+B, where A and B are the magnitudes of dibits disposed on opposite sides of track center as illustrated in FIG. 5B. High gain normalization block 2210 multiplies the offset-compensated positional error signal $PES_O$ by a normalization value. The normalization value is a reference sum, $(A+B)_{REF}$, divided by the measured value of $(A+B)_{MEAS}$. $(A+B)_{REF}$ is effectively what $(A+B)_{MEAS}$ "should" be, and is determined by design choice. Thus, if $(A+B)_{MEAS}$ is what it "should" be (equal to $(A+B)_{REF}$), then high gain normalization block 2210 is effectively a multiply-by-1 block, passing the offset-compensated positional error signal $PES_O$ through to selector 2230.

Low gain normalization block 2220 is more complex, so as to compensate for nonlinearities of the PES when the heads are not closely following track center. Block 2220 multiplies $PES_O$ by a normalization value which may be expressed as:

$$\alpha_1(\text{Zone,Head})\text{TrackID}_P + \alpha_2(\text{Zone,Head})$$

where $\alpha_1(\text{Zone, Head})$ and $\alpha_2(\text{Zone, Head})$ are parameters which are a function of the zone on the disk, and the head under consideration, and are determined as described below. For purposes of this discussion, a "zone" may be considered to be all points on the disk surface between a first radius and a second radius. In particular, Zone 1 may be considered the ring-shaped disk surface area between the inside diameter and an intermediate diameter, and Zone 2 may be considered to be the ring-shaped area on the disk between the intermediate diameter and the outside diameter. The low gain normalization block 2220 receives the predicted track ID value, $\text{TrackID}_P$, from the full state observer 250 (FIG. 12).

Figure 18B:
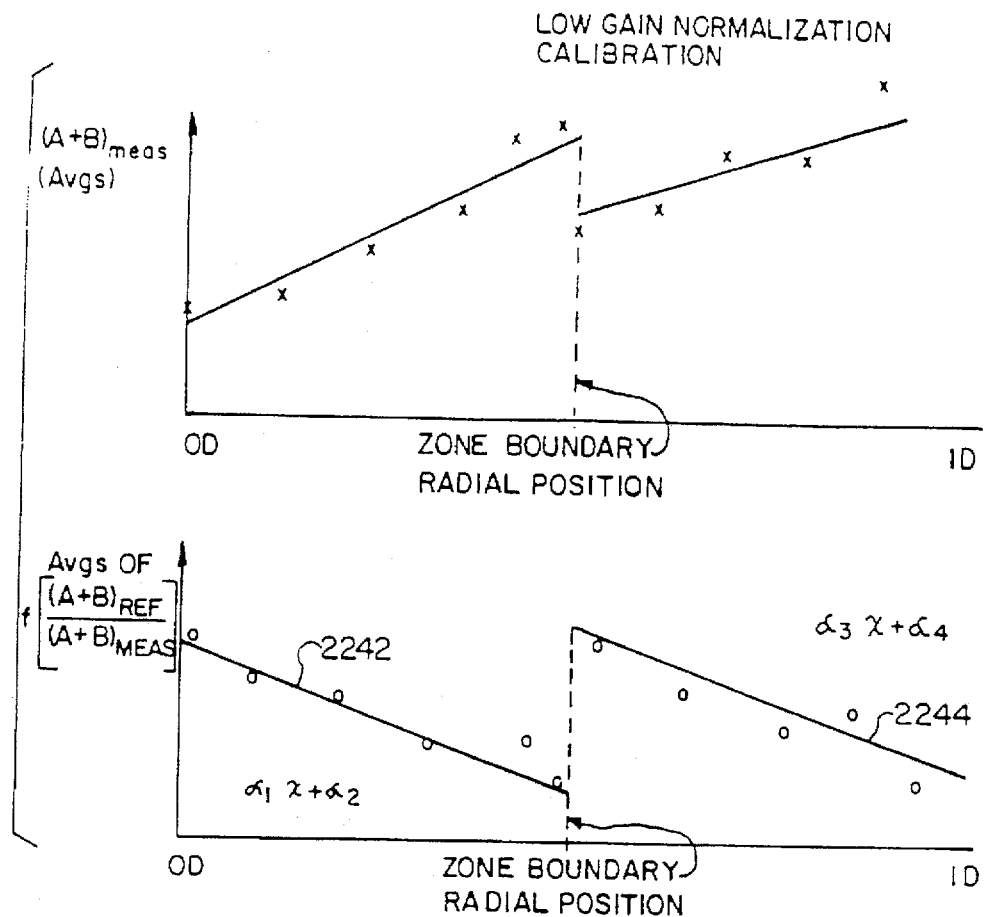
FIG. 18B illustrates the measurements and computations involved in calibrating the low gain normalization block.

The two parameters $\alpha_1(\text{Zone, Head})$ and $\alpha_2(\text{Zone, Head})$ are determined in low gain normalization calibration block 2240 in a manner illustrated in FIG. 18B. The inventive control system uses accurate gain variation data measured when the head is reliably positioned over center track, in high gain mode. First, at multiple radial head positions for a specific zone and head, many values of $(A+B)_{MEAS}$ are measured, and the measured values averaged. Each point marked x in the top panel of FIG. 18B represents an average value for a given radial position and head. Pot each average data point thus calculated, a ratio is calculated in which $(A+B)_{REF}$ is divided by $(A+B)_{MEAS}$. This quotient results in the set of points illustrated in the lower panel of FIG. 18B, shown by circles.

Using standard curve approximation techniques, a set of approximating curves 2242, 2244 are determined. Preferably, the curve is a straight line approximation using least square error criteria, curves 2242, 2244 being first-order (linear) approximation curves. The slope and the Y-intercept of the straight line approximations are determined and stored as the $\alpha_1$ and $\alpha_2$ parameters described above. The foregoing steps are repeated for each head and each zone on the disk, resulting in different values of $\alpha_1$ and $\alpha_2$ for each combination of zone, head, and radius.

According to the invention, the normalization of this gain variation may be made repeatedly for a given disk drive. Thus, the gain factors in the low gain normalization block 2220 are dependent on values derived during a calibration period immediately before, and possibly also during, operation. The initial calibration and re-calibration are made in accordance with principles described below.

Inverse Nonlinearity Compensation block 230. In addition to the gain normalization problems, the fractional positional error signal $PES_F$ includes inherent nonlinearities which are due to sources other than those described immediately above. For example, in known disk drives in general, the electrical width of the read/write heads is less than the physical width of the tracks. When the head moves very slightly off-center, the sensor gain tends to vary substantially linearly as a function of the displacement from center track. However, when the head approaches the edge of the track, the sensor "saturates", meaning $PES_F$ no longer proportionately reflects actual fractional positional error. Substantial nonlinearities develop. If left uncorrected, such nonlinearity degrades dynamic performance, and may even introduce stability problems.

Additional undesirable nonlinearities are introduced by, for example, head fringe field effects.

Figure 19:
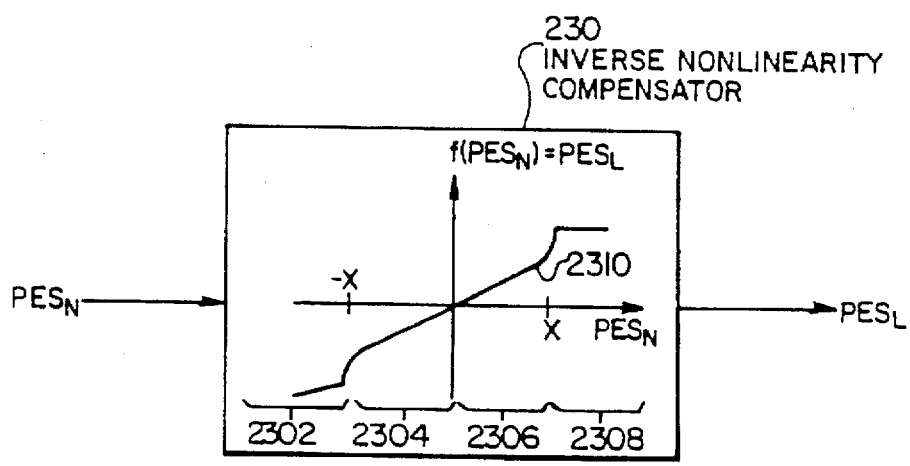
FIG. 19 illustrates the transfer function of the inverse nonlinearity compensation block.

Such nonlinearities are substantially determined by the design of the disk drive. Therefore, in contrast to the normalization of sensor gain performed by normalization block 220, these nonlinearities may be modeled before manufacture and compensated for in the design of the disk drive. FIG. 19 schematically illustrates the transfer function of a preferred inverse nonlinearity block 230 (also shown in FIG. 12) which compensates for this type of nonlinearities.

Briefly, the input to the inverse nonlinearity block 230 is the normalized positional error signal $PES_N$. The output of the inverse nonlinearity block 230 is a linearized positional error signal $PES_L$. The normalized positional error signal $PES_N$ on the horizontal axis is divided into four regions, 2302, 2304, 2306, 2308. The response of the $PES_L$ output as a function of the $PES_N$ input is shown by response curve 2310. Curve 2310 is substantially symmetric about the origin, so that the curve need only be described with reference to regions 2306 and 2308, with the recognition that corresponding description applies to regions 2304, 2302, respectively.

As described briefly above, when the normalized positional error signal $PES_N$ indicates the head is close to the track center, $PES_L$ exhibits a substantially linear response to $PES_N$, and would not need to be compensated. However, as the head moves further from track center, nonlinearities become more apparent. As the head approaches the boundary x in region 2306, the nonlinearity of the sensor response becomes significant, and requires the nonlinear compensation shown in FIG. 19. The boundary between region 2306 and region 2308, labelled x on the $PES_N$ axis, denotes the point at which the sensor "saturates", the sensor giving essentially meaningless information in region 2308.

In the region between center track and point x (typically 20–50% of a track width, 40% in the preferred embodiment), the compensation function follows a curve which may be implemented as a second order (quadratic) equation. In particular, the equation may be:

$$PES_L = f(PES_N) = A_1 \cdot (PES_N)^2 + A_2 \cdot PES_N + A_3$$

in regions 2304, 2306, and $$PES_L = PES_N$$

in regions 2302 and 2308. The quadratic curve in regions 2304, 2306 is made to be continuous with the portions of the curve in regions 2302, 2308, through choice of these parameters. The parameters $A_1, A_2, A_3$ may be readily determined empirically by those skilled in the art, based on performance data made at the time of disk drive design.

Range Extender and Sample Integrity Tester 240. The range extender portion 2421 of FIG. 20A (elements 2422–2426) provide a measurement of head position relative to a destination track, at any radial position on the disk surface.

Generally, sampled position measurements are subject to error due to noise. The sample integrity tester portions of FIG. 20A (coarse static window calculator and tester 2420, fine dynamic window calculator and tester 2430, and selector 2410) filter out measurements that contain large levels of noise. The integrity testers enable minimal area of the disk to be dedicated to the servo positional sensor information by preventing clearly erroneous measurements from contaminating loop calculations.

Referring now to FIG. 20A, the sample integrity tester and linear range extender 240 are illustrated in greater detail than in FIG. 12. Block 240 includes a selector 2410 which produces an interim positional error signal PES' on path 241. Selection logic 2410 determines PES'(k) from among two possible positional error signals. The first positional error signal input to selector 2410 is the positional error signal $PES_1$ output by a coarse static window calculator and tester block 2420, $PES_1$ being provided on a path 2421. The second positional error signal input to selection logic block 2410 is a positional error signal $PES_2$, generated by fine dynamic window calculator and tester 2430, $PES_2$ being provided on a path 2431.

The output $PES_1$ of coarse static window calculator and tester 2420 is chosen to be either the observer's predicted $PES_P$ on path 253, or a linearly extended positional error signal $PES_{LE}$ on path 2427. $PES_{LE}$ is output by an adder 2426, whose respective inputs are connected to a BPT (bits per track) sensitivity multiplier 2422, and to the output of a schematically illustrated switch 2424. The integer positional error signal $PES_I$ is input to the BPT sensitivity multiplier on path 135. The linearized fractional positional error signal $PES_L$ is input to switch 2424 on path 231.

Blocks 2422, 2424, and 2426 function as a linear range extender 2421 in the following manner. When the distance between the head and a destination track is greater than a predefined number of tracks (for example, 100), it is assumed that the head is traveling with such a high velocity that the fractional portion of the positional error signal, $PES_L$, does not accurately represent the head position. Therefore, when the head is greater than a predetermined number of tracks from the destination track, switch 2424 is set to 0 by a coarse resolution control input, so that the switches output does not contribute to the summation performed by adder 2426. However, when the head approaches to within the certain number of tracks of the destination track, switch 2424 closes, allowing fractional positional error signal $PES_L$ to contribute to the summation performed by adder 2426.

BPT sensitivity multiplier 2422 multiplies the integer portion of the positional error signal $PES_I$ by a suitable number, for example, 263 bits per track. Because $PES_I$ is derived from TrackID gray codes in the servo track (see FIG. 16), $PES_I$ has units of "tracks". $PES_L$ already has units of "bits". Therefore, after $PES_I$ is multiplied by 263 bits/track, the units of the two inputs to adder 2426 are the same ("bits"), suitable for processing within the remainder of the servo loop. In this manner, the output of adder 2426, $PES_{LE}$, is a linearly extended positional error signal which expresses a positional error of the heads over the entire disk radius.

$PES_{LE}$ is a definition of head position relative to the requested destination track, anywhere from the inside diameter (ID) to the outside diameter (OD) of the usable disk surface. FIG. 20C illustrates the manner in which $PES_{LE}$ is formed. The horizontal axis reflects radial position on the disk surface, with half-track widths and full track widths marked off. The vertical axis represents the various positional error quantities. It is understood that FIG. 20C illustrates only two track widths, a small fraction of the radial extent of the disk, there being thousands of concentric tracks on a typical disk.

In FIG. 20C, $PES_F$ repeats with a period of one track width. Due to nonlinearities in the measurement of the head position, the repeated segments F1, F2, . . . of the $PES_F$ waveform are not straight segments at 45 degrees from the horizontal axis, as they would be in the absence of nonlinearities. Instead, they illustrate the nonlinear measurement response discussed above, with reference to the inverse nonlinearity compensation block 230 of FIG. 19. The area between the $PES_F$ curves F1, F2 . . . and 45-degree segments L1, L2 . . . respectively, reflects the compensation provided by the inverse nonlinearity compensation block 230 of FIG. 19. Thus, the output of the inverse nonlinear compensation block, $PES_L$, is essentially represented by segments L1, L2 . . . .

The value of $PES_I$, the integer portion of the positional error signal, is illustrated as the step function I1, I2 . . . in FIG. 20C.

$PES_F$ and its linearly compensated value $PES_L$ remain small, less than half a track width in magnitude, throughout the entire radial dimension of the disk. In contrast, TrackID increases linearly with the radial distance from a value of 0 at the outside diameter, to a value of $2^{11}-1$ (for example) at the inside diameter.

When $PES_I$ and $PES_L$ are added by adder 2426 (FIG. 20A), the desired measured value of $PES_{LE}$ results, indicated by a 45-degree line which extends from the inside diameter to the outside diameter of the disk. That is, ideally, $PES_{LE}$ accurately reflects the position of the head anywhere on the usable surface of the disk, relative to the destination track.

This comprehensive sensed head position is enabled by the gray code TrackID which is provided in the servo fields extending radially on the disk, between adjacent sectors. FIG. 16 illustrates the TrackID gray code identifying $PES_I$. This sensed position over the entire disk radius is in contrast to known systems, in which a track number is embedded only in certain data fields. In known systems, the track number embedded in the data field is read once and subtracted from the destination track number. The difference is loaded into a counter. The counter is decremented each time the fractional positional error signal passes through 0, indicating the head had come one track closer to the destination track. However, the presence of noise causes errors, so that the value in the counter does not necessarily reflect the true number of tracks between the present head position and the destination track.

According to the present invention, in contrast, unique gay coded TrackID is written at each track, so that no counter is necessary. Thus, the servo's use of measured value of the linear extended positional error signal $PES_{LE}$ is less subject to noise, especially in view of predictive values generated within full state observer 250 (described below).

Referring again to FIG. 20A, if $PES_{LE}$ falls outside a given window (determined as described below), a possible false measured value has possibly been read. In this event, the observer's prediction $PES_P$ is selected, rather than the linearly extended measured value $PES_{LE}$. That is, $PES_1$ on path 2421 is set equal to $PES_P$ from path 253. This substitution causes the observer to operate in a "freewheel" mode during the sample period, so that the servo effectively operates as an open loop system. Under these circumstances, there is no correction of the observer's predicted $PES_P$, because this situation corresponds to unmodelled occurrences such as physical shock, which the observer cannot be expected to predict.

In contrast, if the measured value $PEE_{LE}$ falls inside the coarse window (indicating no significant abnormalities in the position measurement), $PES_{LE}$ is chosen as the $PES_1$ output on path 2421. Under these circumstances, correction of the observer's predicted error signal $PES_P$ for the next sample period is performed in the usual manner. To pass $PES_{LE}$ to $PES_1$, the test in the coarse static window requires:

$$PES_P - C(PES_P) < PES_{LE} < PES_P + C(PES_P)$$

where $PES_P$ is the observer's predicted track ID and $C(PES_P)$ is the magnitude of the allowable error. In a particular preferred embodiment, C(PESP) is a variable quantity. In particular, $C(PES_P)=C_1$, if $PES_P>250$ tracks; and $C(PES_P)=C_2$, if $PES_P<250$ tracks, where $C_1$ and $C_2$ may be constants satisfying the relationship $C_1>C_2$.

If the measurement falls outside the window thus determined, the observer's prediction is substituted for the measurement and a spurious sample flag is set. The servo system is thus made less sensitive to the measurement errors due to noise when the head is far from the destination track, on the principle that ample time remains in the seek trajectory to recover from the measurement errors.

As stated briefly above, when the head's distance from the destination track is greater than a predefined number of tracks, this distance corresponds to a high head velocity which in turn prevents the fractional portion of the positional error ($PES_F$) from accurately representing the head position. The inaccuracy of $PES_F$ results primarily from the spatial relationship of the TrackID and the $PES_F$ dibits in the servo field (FIG. 16). Thus, it is understood that, in the foregoing formulas, $PES_{LE}$ may or may not include the fractional portion of the measured positional error signal, depending on the distance between the head and the destination track.

Operation of the fine dynamic window calculator and tester 2430 and associated blocks 2432 and 2434 is now described. Briefly, the purpose of the fine dynamic window calculator is to provide testing windows for measured PES samples when the heads are close to the destination track. The fine dynamic window calculator thus provides windows when the head velocity is smaller, in contrast to the coarse static window calculator which also operates when the heads are further from destination track, travelling faster. Furthermore, the fine dynamic window calculator calculates a plurality of progressively smaller (that is, dynamically changing) windows as the heads approach destination track center, based on a feedback of the decreasing control effort.

The u"(k) signal on path 252, which was generated by the full state observer 250, is input to an absolute value block 2432. The output of the absolute value block 2432 is input to a low pass filter block 2434. The output of low pass filter block 2434 is input to the fine dynamic window calculator and tester 2430. Other inputs to fine dynamic input window calculator and tester 2430 are the observer's predicted positional error signal $PES_P$ on path 253, and the coarse static window calculator and tester's positional error signal $PES_1$ on path 2421. The fine dynamic window calculator and tester 2430 provides its positional error signal $PES_2$ on path 2431, which is input to selector 2410. The control input to selector 2410 is a resolution signal, choosing $PES_2$ only when the system is in fine or mid resolution mode.

The dynamic window which block 2430 calculates, and which is applied to the $PES_1$ and $PES_P$ signals input to it, is a dynamic window. That is, the magnitude of the window varies as a function of time, determined by the filtered absolute value of the second interim control effort u"(k). The output $PES_2$ is either (1) $PES_1$ or (2) $PES_P\pm CL$, where CL is a clamping value determined below.

Figure 20B:
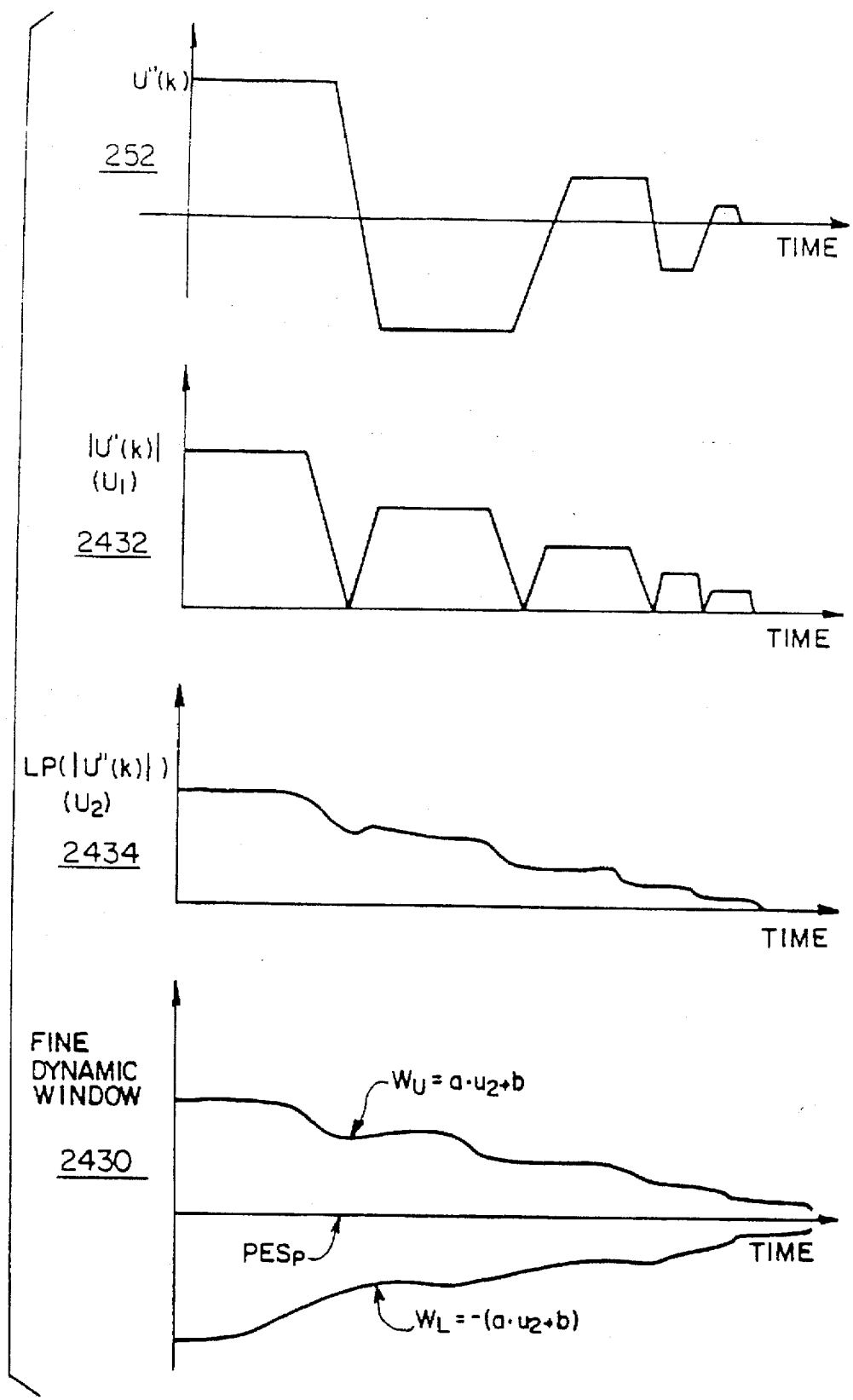
FIG. 20B illustrates in greater detail the waveforms involved in calculating and generating the fine dynamic window in FIG. 2D.
Figure 20C:
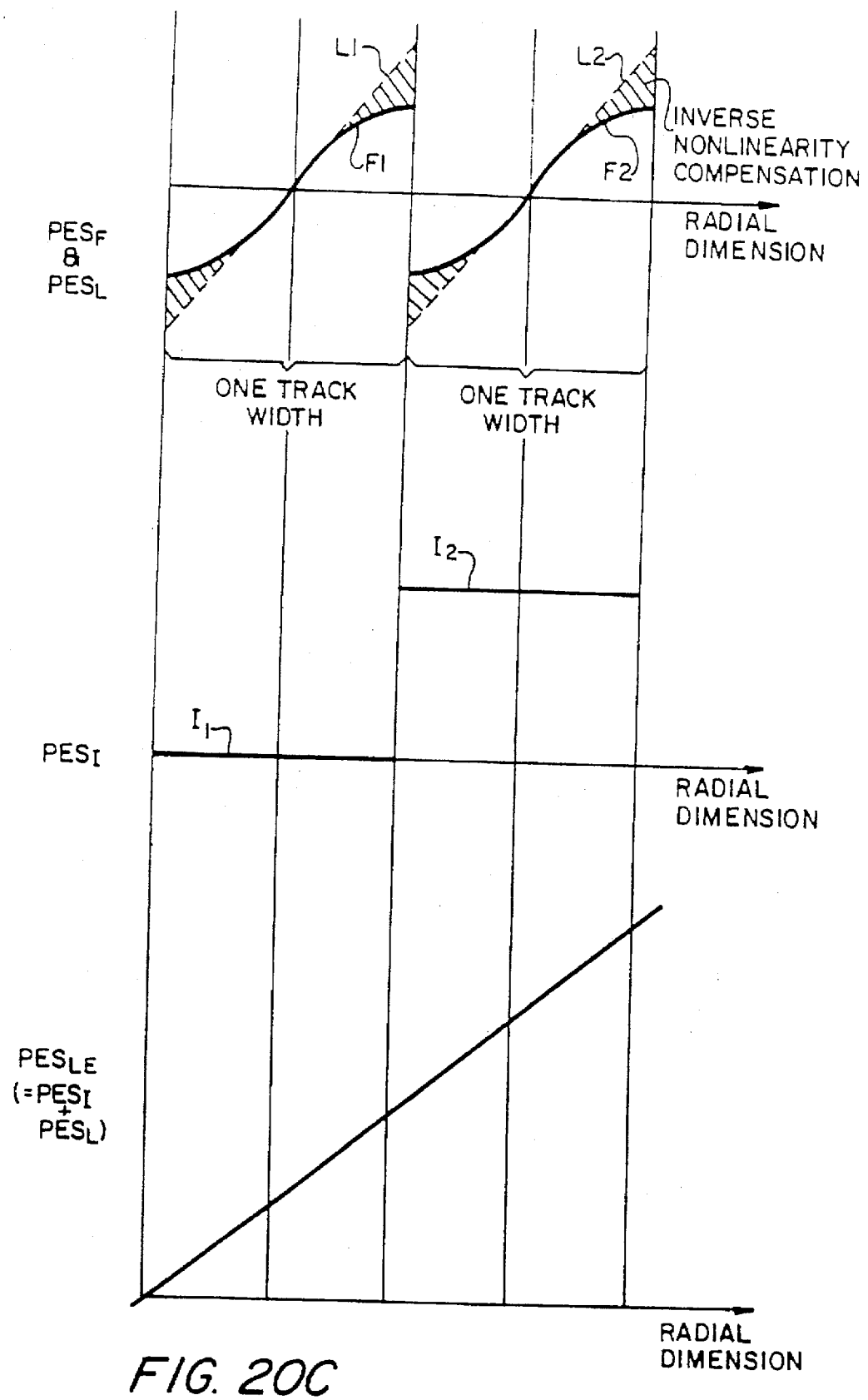
FIG. 20C illustrates the generation of the linear extended positional error signal $PES_{LE}$ from its integer and linearly compensated fractional components.

The timing diagrams in FIG. 20B show an exemplary set of waveforms for u"(k), for the output of absolute value block 2432, for the output of low pass filter block 2434, and for the fine dynamic window about $PES_P$. As illustrated in FIG. 20B, the second interim control effort signal u"(k) decreases in magnitude as a function of time, generally indicating a settling closer to the track center. Such a settling waveform is encountered as the system recovers from external shock or vibration, for example. Derivation of the outputs of blocks 2432 and 2434 are readily apparent to those skilled in the art.

Finally, the inventive system provides for calculation of a window in accordance with a formula which dynamically varies according to parameters a and b which are calculated as part of the environmental specification of the disk drive. In particular, the magnitude of error tolerated by the window function is expressed according to the formula:

$$PES_P - (au_2+b) < PES_1 < PES_P + (au_2+b)$$

where $PES_P$ is the observer's predicted PES, $u_2$ is the signal output by the low pass filter block 2434, and a, b are coefficients defining the dynamic magnitude of the window determined by the environmental specification of the disk drive. The clamping value CL referred to above is $au_2+b$.

By dynamically defining the window as a function of control effort (which is in turn an indication of physical disturbance of the head), otherwise unmodelled physical disturbances do not interfere with the windows' rejection of noise-corrupted samples. Therefore, the windows cause rejection of position measurements only when sensor noise (having a higher frequency than physical disturbances) corrupts the measurements. The operation of the dynamic window calculator and tester, in conjunction with selection logic 2410, minimizes the chances that lower-frequency physical shock will be confused with sensor noise.

The selection logic block 2410 determines whether $PES_1$ or $PES_2$ is subsequently used by the full state observer 250 and integral controller 270.

Figure 21A:
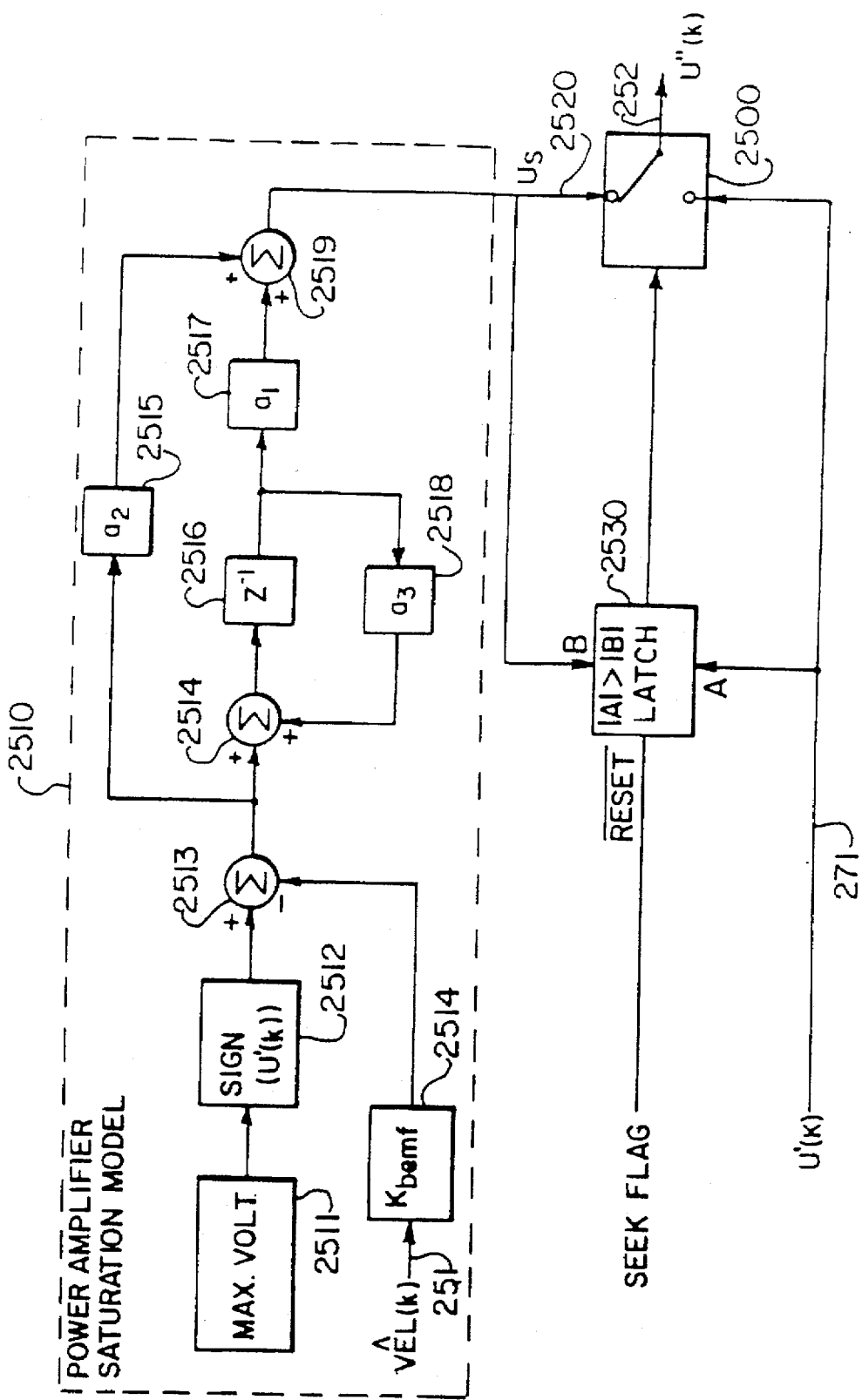
FIG. 21A illustrates the power amplifier voltage saturation model used during initial portions of seeks to model nonlinear characteristics of the plant, the model being shown in conjunction with associated switching functions to enhance operation of the full state observer.
Figure 22:
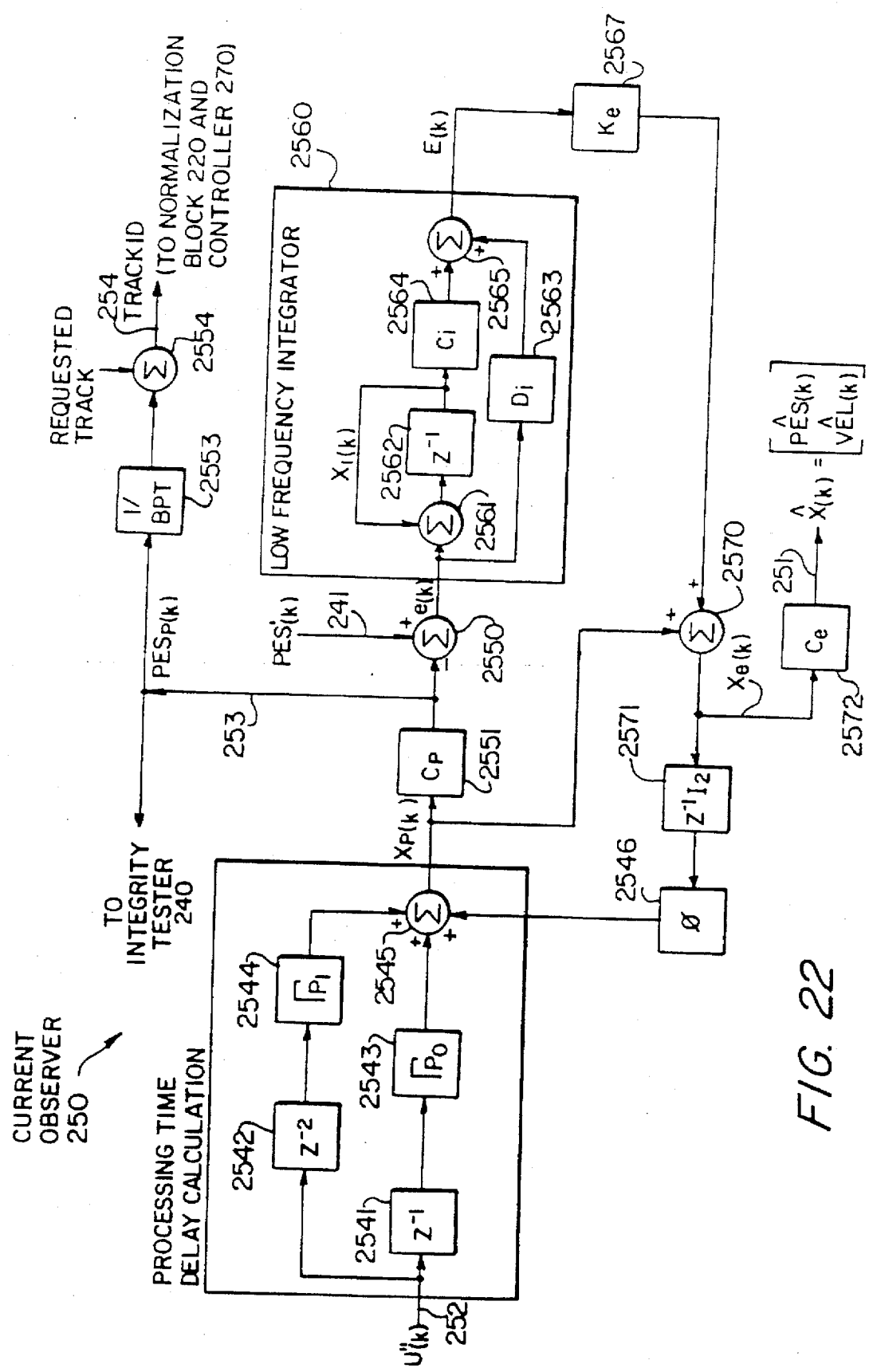
FIG. 22 illustrates schematically a preferred implementation of a full state observer, including a processing time delay calculation portion and a low frequency integrator.

Full Stats Observer 250. Referring to FIGS. 21A and 22, the full state observer 250 is illustrated. Briefly, the main purpose of full state observer 250 is to provide a 2-row by 1-column vector quantity $\hat{x}(k)$ to integral controller 270. As described briefly above, with reference to FIG. 12, $\hat{x}(k)$ is a vector quantity including $\hat{PES}(k)$ and $\hat{VEL}(k)$. Broadly, the vector quantity $\hat{x}(k)$ is derived from the PES'(k) signal on path 241 from the integrity tester and linear range extender 240 just described. The vector quantity $\hat{x}(k)$ is also determined in accordance with second interim control effort signal u"(k) which is generated on FIG. 21A, which is in turn generated from the first interim control effort signal u'(k) fed back from integral controller 270 on path 271.

Referring first to FIG. 21A, a selector 2500 is provided, the output of which is the second interim control effort signal u"(k) on path 252. The inventive controller provides that the second interim control effort signal u"(k) is usually the same as the first interim control signal u'(k). However, during the initial period of seeks in which the power amplifier 116

(FIGS. 1A, 1B) is saturated and therefore harder to model, another control signal $u_S(k)$, a "power amp saturated" control effort signal on path 2520, is used.

Figure 21B:
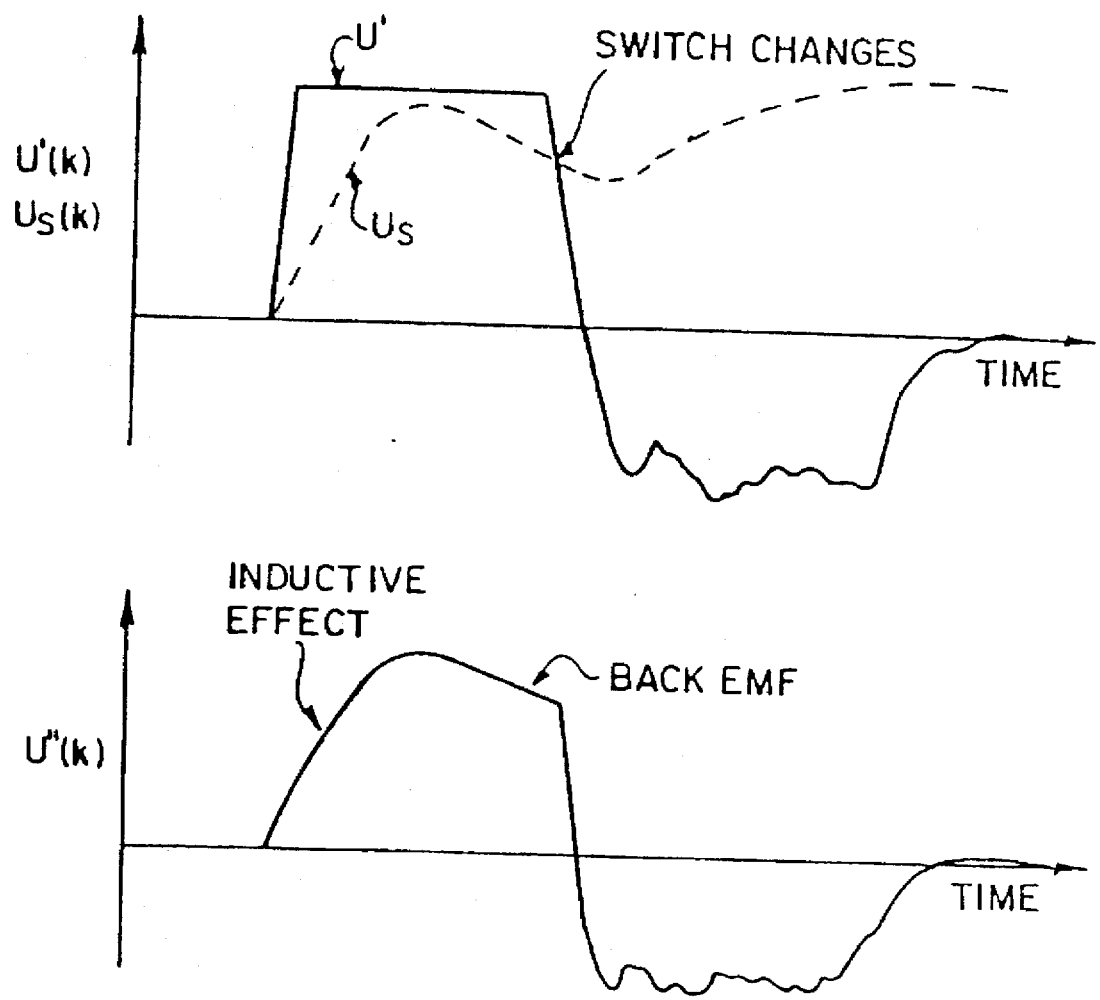
FIG. 21B illustrates waveforms useful in explaining the use of the power amplifier voltage saturation model of FIG. 21A.

The top panel of FIG. 21B illustrates the first interim control effort signal u'(k) and the $u_S(k)$ output from the power amp saturation model. These two signals are input to selector block 2500. The bottom panel illustrates the second interim control effort signal u"(k) which is the output of the selector block 2500. Selector 2500 selects $u_S(k)$ during the first portion of the seek, when u'(k)>$u_S(k)$. Thereafter, it selects u'(k) when the u'(k) waveform crosses the $u_S(k)$ waveform as it decreases, that is, when u'(k)<$u_S(k)$.

Selector 2500 illustrates schematically the selection of either the $u_S(k)$ output of a saturation model 2510 on path 2520, or the first interim control effort signal u'(k) on path 271. The control input to selector 2500 is driven by a latch block 2530 which determines whether the absolute value of the interim control effort signal u'(k) is greater than the absolute value of the saturation model 2510's output $u_S(k)$. At the beginning of a seek, the latch 2530 is reset by a "seek" signal, so that the $u_S(k)$ output of the saturation model 2510 is selected. However, several conditions can cause the latch to be set, selecting u'(k) to pass through selector 2500. Specifically, on short seeks, the control effort u'(k) decreases very quickly, so that it soon becomes smaller in magnitude than $u_S(k)$. Alternatively, on longer seeks, the power amplifier is out of saturation long enough so that the system operates linearly as it approaches destination track.

As appreciated by those skilled in the art, the slower rise time of the $u_S(k)$ signal models the inductive effect of the coil in the disk drive actuator. Similarly, the downwardly sloping portion of the $u_S(k)$ pulse top closely models the back EMF phenomenon observed in such coils. When the effects of the coil inductance and back EMF are modelled, the predictive abilities of the state predictor (shown in FIG. 22) and the operation of the integrity tester (shown in FIG. 20A) are enhanced, even during the initial portions of a seek.

The model envisioned by the present invention need not be limited to modelling saturation characteristics of power amplifiers which drive voice coils. More generally, the invention envisions a model producing a modelled waveform which would otherwise be difficult for a servo system to predict and track.

The preferred saturation model 2510 is implemented as follows. A maximum voltage value, indicated at 2511 is multiplied by the sign of u'(k) at multiplier block 2512. The signed maxim voltage is input to the non-inverting input of an adder 2513. The $\hat{VEL}(k)$ value from the current observer on path 251 is multiplied by a back-EMF multiplier 2514, the multiplied $K_{bemf}\hat{VEL}(k)$ value being input to the inverting input of adder 2513. Adder 2513 provides its sum to a second adder 2514, as well as to a feedforward multiplier block 2515. Adder 2514 drives a delay block 2516, which delays the sample by one sample period, in accordance with conventional Z-transform theory. The output of delay block 2516 drives a second multiplier block 2517, as well as a feedback multiplier block 2518. Feedback multiplier block 2518 feeds the second input to adder 2514. The outputs of multiplier blocks 2515 and 2517 are input to a third adder 2519, which produces $u_S(k)$, to the output of the saturation model 2510.

Blocks 2514–2519 effectively comprise a low pass filter which accurately models the inductance and resistance of the actuator coil. The nonlinear operation of a real-world plant is thus effectively modeled, even during the initial portions of a seek when a plant would normally be difficult to model.

The full state observer illustrated in FIG. 22 implements current observer functions, using difference equations in a full state model. Observers in general are known to those skilled in the art, and the general concept need not be further described here. A particular preferred implementation of an observer, a full state current observer with positional error and velocity state variables, is described.

Very briefly, a predicted value of the state is generated, and a correction term is produced to correct The correction term provides correction for any steady state error which would erroneously cause an out-of-window detection when the head is in fact stably aligned over center track.

Referring now more specifically to FIG. 22, the second interim control effort signal u"(k) on path 252 fans out to two delay blocks 2541, 2542. Delay block 2541 is a single-period delay block, whereas delay block 2542 is a two-sample delay block functioning in accordance with conventional Z-transform theory. Delay blocks 2541, 2542 produce delayed second interim output signals which are input to $\Gamma_{P0}$ vector multiplier block 2543 and $\Gamma_{P1}$ vector multiplier block 2544, respectively. The outputs of multiplier blocks 2543, 2544 are 2×1 vectors input to an adder 2545. Adder 2545 receives a third 2×1 vector input from a 2×1 matrix multiplier block 2546, described below. The output of adder 2545 is a 2×1 state variable $x_p(k)$. The variable $x_p(k)$ may be considered a predicted value of state variable $\hat{x}(k)$. More conceptually, the purpose of elements 2541–2544 is to calculate the delays inherent in measurement, allowing them to be compensated for in calculating predicted values of the state variables.

Observers are typically used to model the unmeasured phenomena in the plant under control; however, they are also valuable in providing a low noise estimate of a state that is measured (such as PES) when the sensor is particularly noisy. The present disk drive's window algorithms determine when the head position is reliably on track center so that the PES is maintained in the respective window. The observer's positional estimate is used for the window function, in order to prevent sensor noise from erroneously causing an out of window detection. Due to the extremely small write window (for example, ±4% track), it is imperative that the observer's PES not have a steady state error component.

The present invention includes two techniques to eliminate this potential steady state error problem. First, an integral function is implemented in the observer to provide infinite gain at DC, thus completely eliminating the DC offset. Second, the D.C. component of the control effort from the integral controller function (which is the source of the steady state error in observers) is routed to bypass the observer. This significantly reduces the observer's integrator transient settling time.

Referring again to FIG. 22, the interim positional error signal PES'(k), a scalar entity from the sample integrity tester and linear range extender 240, passes on path 241 to the non-inverting input of an adder 2550. The inverting input of adder 2550 is connected to the output of a $C_p$ multiplier 2551. Multiplier 2551 multiplies predicted 2×1 state variable $x_p(k)$ by a 1×2 coefficient $C_p$ to yield a scalar subtraction term for adder 2550.

The output of $C_p$ multiplier is the predicted positional error signal $PES_P(k)$ on path 253 which is used by the integrity tester in block 240 (FIG. 20A). $PES_P(k)$ is also input to a 1/BPT ("bits per track") units adjusting multiplier 2553. Multiplier 2553 provides a scaled $PES_P(k)$ (having units of "track") to an adder 2554. Adder 2554 adds the scaled $PES_P(k)$ with the requested track to form the predicted track ID, TrackID$_P$, on path 254 which is used by low gain normalization block 220 and integral controller 270.

The difference resulting when subtracting the scaled predicted state variable $x_p(k)$ from the interim positional error signal PES'(k) may be thought of as an observer error e(k).

Observer error signal e(k), a scalar quantity, is input to a low frequency integrator 2560. The present invention advantageously provides low frequency integrator 2560 not present in known observers. Integrator 2560 removes steady state error from the system by providing a correction term which provides theoretically infinite gain to a DC input. More specifically, it removes DC offset between the measured positional error signal PES' input to the observer on path 241, and the estimated positional error state variable P$\hat{E}$S output on path 251. The low frequency integrator 2560 includes a scalar adder 2561, a one-sample delay block 2562, and a 2×1 vector multiplier block 2563. Adder 2561 receives the observer error signal e(k) and the output of delay block 2562 to produce $x_i(k+1)$. The output of delay block 2562, $x_i(k)$, is input to a 2×1 vector multiplier 2564. $D_i$ vector multiplier block 2563 receives e(k). The respective 2×1 outputs of vector multipliers 2563, 2564 are input to vector adder 2565, which forms the 2×1 output E(k) of low frequency integrator 2560. The 2×1 E(k) output of low frequency integrator 2560 is input to a 2×2 Ke$_{ec}$ multiplier 2567 which provides an amplitude adjustment to E(k). The output of multiplier block 2567 is the 2×1 correction term which adder 2570 adds to the predicted state value $x_p(k)$. Adder 2570 receives the predicted value $x_p(k)$ and the correction term from multiplier block 2567, to produce a 2×1 corrected prediction. The corrected prediction is input to both a delay/identity multiplier block 2571, and to a multiplier block 2572. The output of delay/identity multiplier block 2571 is input to multiplier block 2546, mentioned above. The multiplier block 2572 multiplies the corrected prediction by a value $C_e$. The output of multiplier block 2572 constitutes the vector quantity $\hat{x}(k)$, which is output to the integral controller.

The equations governing the observer structure shown in FIG. 22 are now discussed. The difference equation describing the dynamics of the plant (power amplifier, actuator, sensor) can be calculated from the electrical and mechanical parameters of the plant.

$$X_p(k)=\Phi X_e(k-1)+\Gamma_0 u''(k-1)+\Gamma_1 u''(k-2)$$

where $$X_p(k) = \begin{vmatrix} PES_p(k) \\ VEL_p(k) \end{vmatrix} \quad X_e(k) = \begin{vmatrix} PES_e(k) \\ VEL_e(k) \end{vmatrix}$$

The observer error equation is:

$$e(k)=PES'(k)-C_p X_p(k)$$

The integral state equation is:

$$x_i(k+1)=x_i(k)+e(k)$$

The observer error equation with integral term is:

$$e_i(k)=e(k)+\alpha x_i(k)$$

where $\alpha=T_s 2\pi f_i$ in high gain mode, and $\alpha=0$ in low gain mode where $T_s$ is the sample period between servo fields, and $f_i$ is the break frequency of the integrator.

The resulting error term E(k) in matrix form is:

$$E(k)=C_i x_i(k)+D_i e(k)$$

where $$E(k) = \begin{vmatrix} e(K) \\ e_i(k) \end{vmatrix} \quad C_i = \begin{vmatrix} 0 \\ \alpha \end{vmatrix} \quad D_i = \begin{vmatrix} 1 \\ 1 \end{vmatrix}$$

The observer correction term is:

$$X_e(k)=X_p(k)+K_e E(k)$$

where $$K_e = \begin{vmatrix} k_{e1} & 0 \\ 0 & k_{e2} \end{vmatrix}$$

where $k_{e1}$ and $k_{e2}$ are predetermined scalars defining observer frequency response.

The observer output equation is:

$$\hat{x}(k)=C_e X_e(k)$$

The predicted track ID (TrackID$_P$) is calculated from PES$_P$, the predicted value of the positional error signal, as shown in FIG. 12:

$$TrackID_P=RequestedTrack+PES_P \cdot 1/BPT$$

Determination of values for the various parameters in FIGS. 21A and 22 lies within the ability of those skilled in the art, in accordance with conventional state space controller theory as presented, for example, in Katauhiko Ogata's textbook *Discrete Time Control Systems* (Prentice-Hall, 1987). The present invention improves on the known theory by providing dynamic scaling of the parameters, as described below.

Settling Window Detectors 210. FIG. 23B illustrates schematically functional blocks used in a preferred window detector block 260 (FIG. 12). In particular, the illustrated window detector is especially suitable for demonstrating operation of the high gain window (FIG. 12 path 261), the integrator window (governing FIG. 24 switch 2748), and the read window. The write window, being more complex, is described below, with reference to FIG. 23C.

FIG. 23B is more easily understood with reference to the waveform in FIG. 23A. In FIG. 23B, the processed positional error signal P$\hat{E}$S, is input to an absolute value block 820 so that the magnitude of the positional error signal is considered. The magnitude of P$\hat{E}$S is input to two threshold detectors 822, 832. First threshold detector 822 determines whether the magnitude of P$\hat{E}$S is less than the low window, $x-(x_{HYST}/2)$ (see FIG. 23A). When the magnitude of P$\hat{E}$S exceeds the low window, it sets down counter 824, loading a settling value proportional to $T_{settle}$ on path 828. During each sample period, timed by a clock signal on path 826, the down counter 824 is decremented by one. Of course, if the magnitude of P$\hat{E}$S continues to be greater than the low window, the value of the down counter is repeated set to the loaded value of $T_{settle}$ so that the down counter does not approach its underflow value. However, when the magnitude of P$\hat{E}$S falls below the low threshold (indicating the heads are approaching the destination track), the clock signal on path 826 decrements the down counter until it underflows, outputting an underflow value on path 830. The underflow signal on path 830 is received by a "set" input of a settling detector 836, whose output on path 840 determines whether settling has been completed. Subject to the signal at its "reset" input (described below), when detector 836 receives the underflow signal from down counter 824, its window signal on 840 is activated.

The magnitude of PÊS is also compared to the high window $x+(x_{HYST}/2)$ (see FIG. 23A) by threshold detector 832 (FIG. 23B). The output of threshold detector 832 provides a reset signal to the settling detector 836. As long as the magnitude of PÊS is greater than the high threshold, the output path 840 of settling detector 836 is maintained in its inactive state, indicating the heads are not positioned within the given window about center track.

The above-described blocks describe in general terms the settling of heads about a destination track. Further details of sequential methods of window detection are provided in the SETTLING WINDOW DETECTION ROUTINES description.

In the second embodiment, the foregoing description relates especially to the high gain window, the integrator window, and the read window. However, because of the write window's importance in determining when it is safe for the head to write information onto the surface of the disk, it is more complex. Special reference is made to FIG. 23C, which embodies six tests for the write window, the tests being labelled 851–856. The contents of each of the test blocks is easily understood by reference to the description of the LOW GAIN WINDOW routine, provided elsewhere in this specification. No further description need be provided here. However, the "window" block 853, and the window block within block 854, are understood to be implemented substantially as described with respect to FIGS. 23A and 23B.

The respective outputs of each of the test blocks 851–856 are input to a schematically illustrated six-input AND gate 850. The window at the output of AND gate 850 is active only when all its inputs are active. AND gate 850 illustrates how, if any of the tests 851–856 fail, the write window output becomes inactive.

The write window generation method according to the present invention is sensitive to predicted movement of the heads away from center track, and not simply the present position of the heads. Of course, it lies within the contemplation of the invention that fewer than all the test 851–856 maybe employed to determine the write window, or that one or more of the tests 851–856 may be applied to windows other than the write window.

Figure 24:
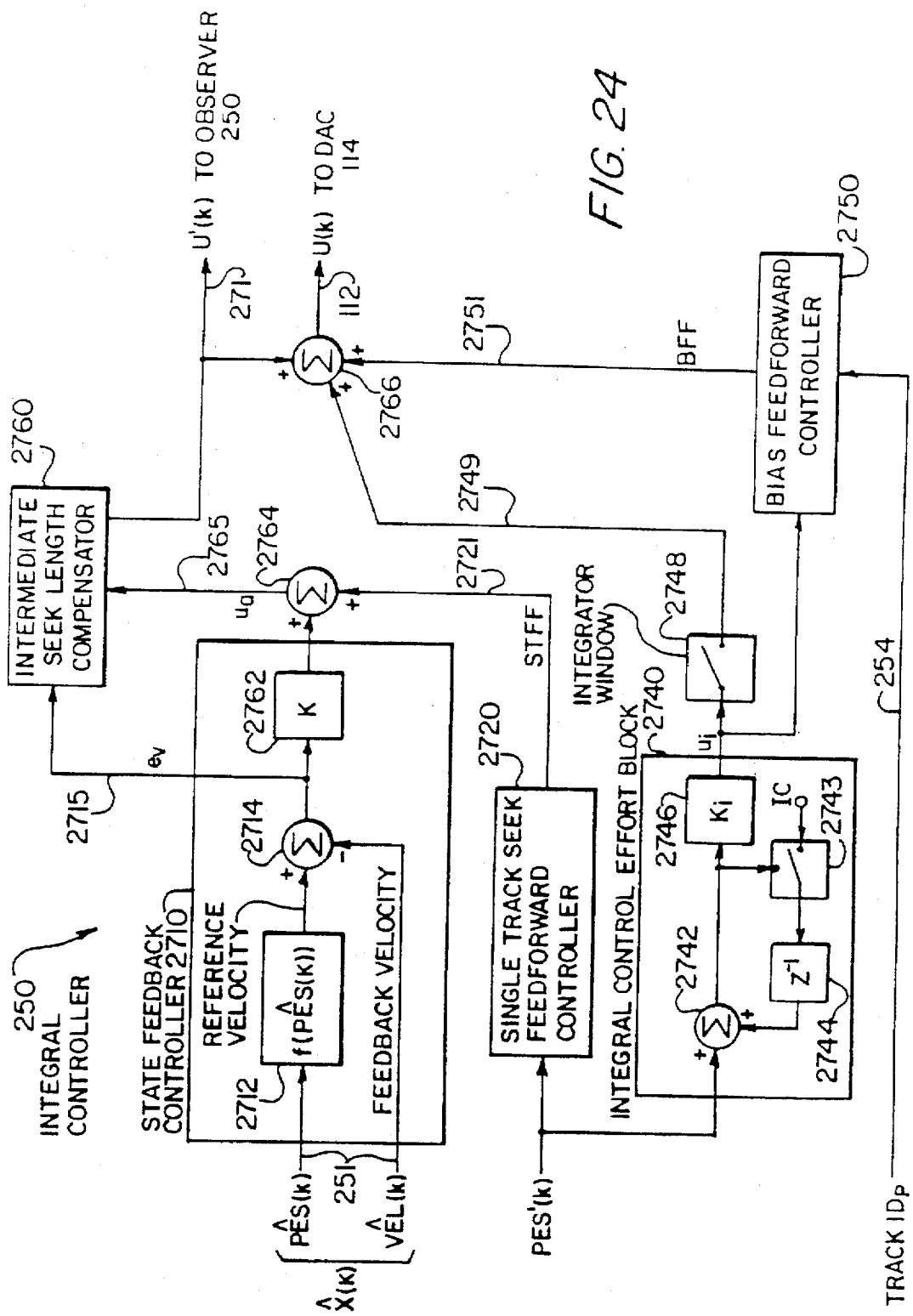
FIG. 24 illustrates a preferred integral controller, including a state feedback controller, intermediate seek length compensator, single track feedforward controller, integral control effort block with associated bias feedforward controller.

Integral Controller 270. FIG. 24 illustrates the integral controller 270 in greater detail than FIG. 12. Briefly, the integral controller 270 is implemented in a state feedback configuration, with integral control, receiving and processing positional error and velocity state variables. The preferred embodiment of the integral controller additionally has several enhancements which optimize controller performance, as described below.

The purpose of the controller is to receive the state variables (PÊS(k) and VÊL(k)) from observer 250, the processed positional error signal PES'(k) from the sample integrity tester 240, and the predicted track signal TrackIDP from the full state observer, and provide the final control effort u(k) to digital-to-analog converter 114 (FIGS. 1A, 1B) on path 112, as well as provide an interim control effort signal u'(k) to the full state observer 250.

Figure 25:
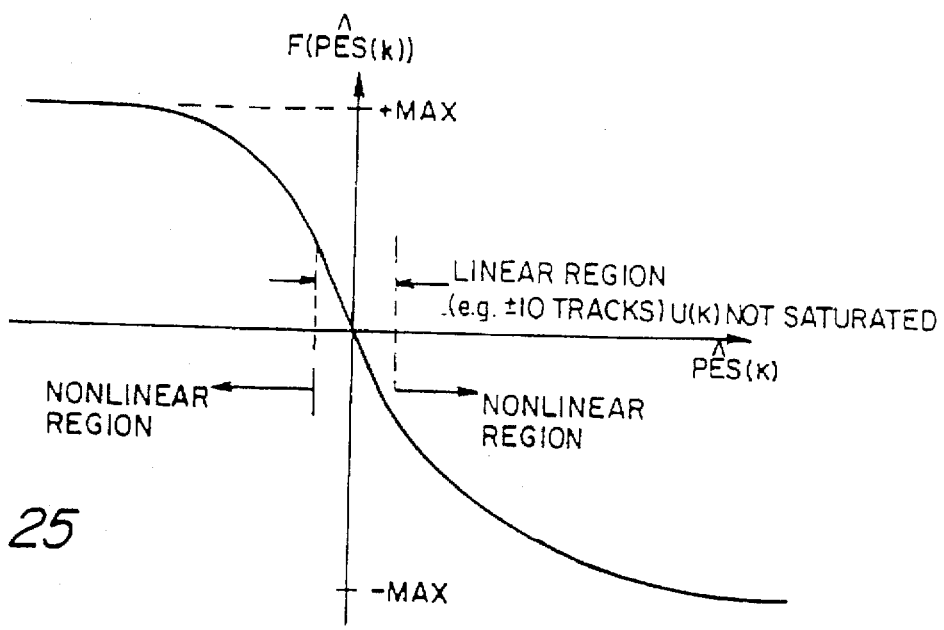
FIG. 25 illustrates in greater detail the transfer function used within the state feedback controller in FIG. 24.

The state estimate signal $\hat{x}(k)$ is input to a state feedback controller generally indicated as 2710, which may be of conventional design. The estimate PÊS(k) is input to a transfer function block 2712, which compensates for the nonlinearity due to finite maximum control effort. This compensation, the transfer function of which is shown in FIG. 25, is performed in a manner known to those skilled in the art. Transfer function block 2712 provides a reference velocity to the non-inverting input of an adder 2714. The inverting input of adder 2714 receives the state estimate VÊL(k) from the full state observer. This quantity is considered a feedback velocity which is subtracted from the reference velocity, the adder 2714 producing a difference which is considered a velocity error $e_v(k)$ which is used during both tracking and seeking operations.

The velocity error $e_v(k)$ is input to both a multiplier block 2762, and to an intermediate seek length compensator 2760. The output of multiplier block 2762 is input to a second adder 2764, whose output $u_a(k)$ is also used by the intermediate seek length compensator 2760. The details of intermediate seek length compensator 2760 are provided below, with reference to FIGS. 28A, 28C, and 28B.

Intermediate seek length compensator 2760 provides the first interim control effort signal u'(k) to observer 250 on path 271, as well as providing a first input to a third adder 2766. Third adder 2766 adjusts the interim control effort signal u'(k) with further signals on paths 2749 and 2751 in a manner to be described below, to produce the final control effort signal u(k) which is output to the digital-to-analog converter 114 (FIGS. 1A, 1B).

Meanwhile, the processed positional error measurement signal, PES'(k) on path 241 is input to both a single track seek feedforward controller 2720, as well as to an integral control effort block 2740. Single track seek feedforward 2720 produces a feedforward compensation signal on path 2721 to the second input of adder 2764. Thus, the single track seek feedforward controller affects both the interim control effort signal u'(k), as well as the final control effort signal u(k). The details of the single track seek feedforward controller are described in greater detail below, with reference to FIGS. 26A and 26B.

Integral control effort block 2740 includes an adder 2742 which receives the processed positional error signal PES'(k) from the sample integrity tester 240. The output of adder 2742 is input to both a switched feedback delay block 2744, as well as to a $K_i$ coefficient multiplier block 2746. The output of the switched feedback delay block 2744 is input to the second, non-inverting input of adder 2742. The output of multiplier block 2746, $u_i(k)$, is the integral control effort. The integral control effort $u_i(k)$ compensates for DC bias forces acting on the plant, such as physical pressure exerted on the actuator by the flex cable.

The integral control effort $u_i(k)$ is used only when the heads are closely approaching center track. Otherwise, the integral control effort signal is prevented from affecting the final control effort signal u(k), illustrated schematically by a "switch" 2748 between the output $u_i(k)$ of integral control effort block 2740 and adder 2766. Controlled by the integrator window, switch 2748 is "closed" only when the heads are stably settled within a predetermined distance of the tracks (±40%, for example), but is "open," for example, during the majority of a seek before settling occurs. Accordingly, the resolution signal closes the switch only when the system is in fine resolution mode or linear mid resolution mode.

Inside the integral control effort block 2740, the feedback delay block 2744 effectively has an initial condition (IC) set function performed by "momentary switch" 2743 immediately before switch 2748 is closed. Setting the initial condition of the integral control effort block thus assures that any supposed "DC bias" measured during the early of a seek does not contribute to the control effort signal as the heads closely follow the destination track. The initial condition reset function is schematically illustrated as a switch 2743 at the input to feedback delay block 2744, the switch being set to 0 momentarily, immediately before switch 2748 is closed.

Bias feedforward controller 2750 receives $u_i(k)$ from the integral control effort block 2740, as well as receiving TrackID$_P$ on path 254 from the full state observer 250. Briefly, during a calibration operation, bias feedforward controller 2750 monitors $u_i(k)$ to determine necessary bias compensation, and during operation provides that compensation for any bias force acting on the heads. During operation, the bias feedforward compensation provided on path 2751 is thus an ideal compensation, so that the value of $u_i(k)$ during operation on path 2749 is reduced to near 0. The bias feedforward controller is calibrated or dynamically recalibrated, in a manner described below, with reference to FIG. 27.

Both (1) the switched outputs of the integral control effort $u_i(k)$ on path 2749, and (2) the bias feedforward compensation signal on path 2751, affect only the final control effort signal u(k) on path 112. They do not affect the interim control effort signal u'(k) on path 271 which is used by full state observer 250. The integral control effort $u_i(k)$ is summed with the state feedback control effort the point from which the observer taps off the control effort u'(k). This arrangement minimizes the observer's steady state error when the observer's low frequency integrator (LFI) 2560 is disabled (in low gain mode), while also minimizing the associated settling time for the LFI to establish the steady state value after turn on (in high gain mode).

Figure 26A:
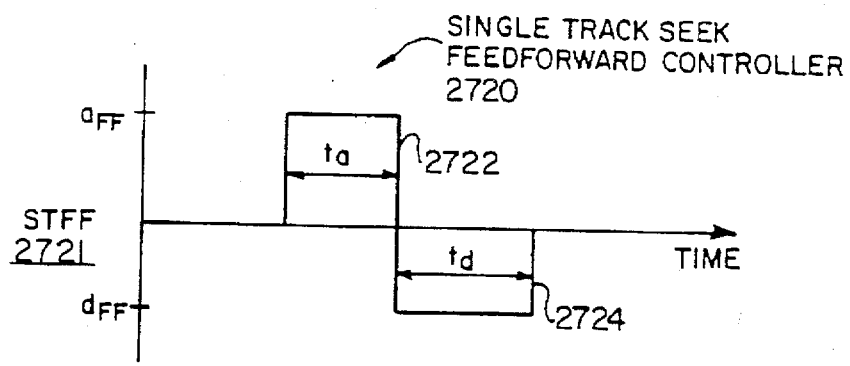
FIG. 26A illustrates waveforms generated by the single track feedforward controller.

Referring now to FIG. 26A, control effort pulses generated during operation of the single track seek feedforward controller 2720 are illustrated. As is readily appreciated by those skilled in the art, commands for single track seeks (seeks to an immediately adjacent track) are very often encountered during operation. Such single-track seek commands are encountered successively in situations when a large block of data stored on adjacent tracks is read or written, as when accessing text files. Because of the high frequency of occurrence of single track seeks, the present invention provides a special single track seek feedforward controller block to minimize the seek time, thereby substantially enhancing overall disk drive performance.

As shown in FIG. 26A, the profile of a single track seek control effort signal includes an acceleration pulse 2722 followed by a deceleration pulse 2724. The single track feedforward profile on path 2721 (FIG. 24) is defined explicitly in terms of a parameter set including: (1) the magnitude of the acceleration pulse, (2) the duration of the acceleration pulse, (3) the magnitude of the deceleration pulse, and (4) the duration of the deceleration pulse. The calibration algorithm finds the optimal parameter set to use for the feedforward control effort profile (FIG. 26A). A matrix of parameter values are tested to determine the optimal set.

The single track feedforward function is a function of the various individual heads in the disk drive, as well as the radial position of the tracks involved in the single track seek. For each of the various heads and radial positions, the shape of the single track feedforward profile 2721 is chosen so as to minimize a cost function. The cost function may be expressed as:

$$Cost = \sum_{k=1}^{N} [\alpha |PES'(k)|] + \beta N$$

where

N represents "settling time", the number of samples required to stably settle the heads within a given window about the destination track center;

|PES'(k)| represents the area beneath the PES' graph which in turn represents overshoot; and $\alpha$ and $\beta$ are designer-chosen weighting parameters which determine relative weighting of the overshoot and settling time considerations.

After an optimal parameter set is found and stored, the performance of the single track seeks are continually monitored and compared to the original optimal cost from the previous calibration. If the system changes (due to variations in temperature or component wear, for example) the DSP detects that the cost exceeds the optimal by a predefined threshold, and issues a request to perform a new calibration.

Figure 26B:
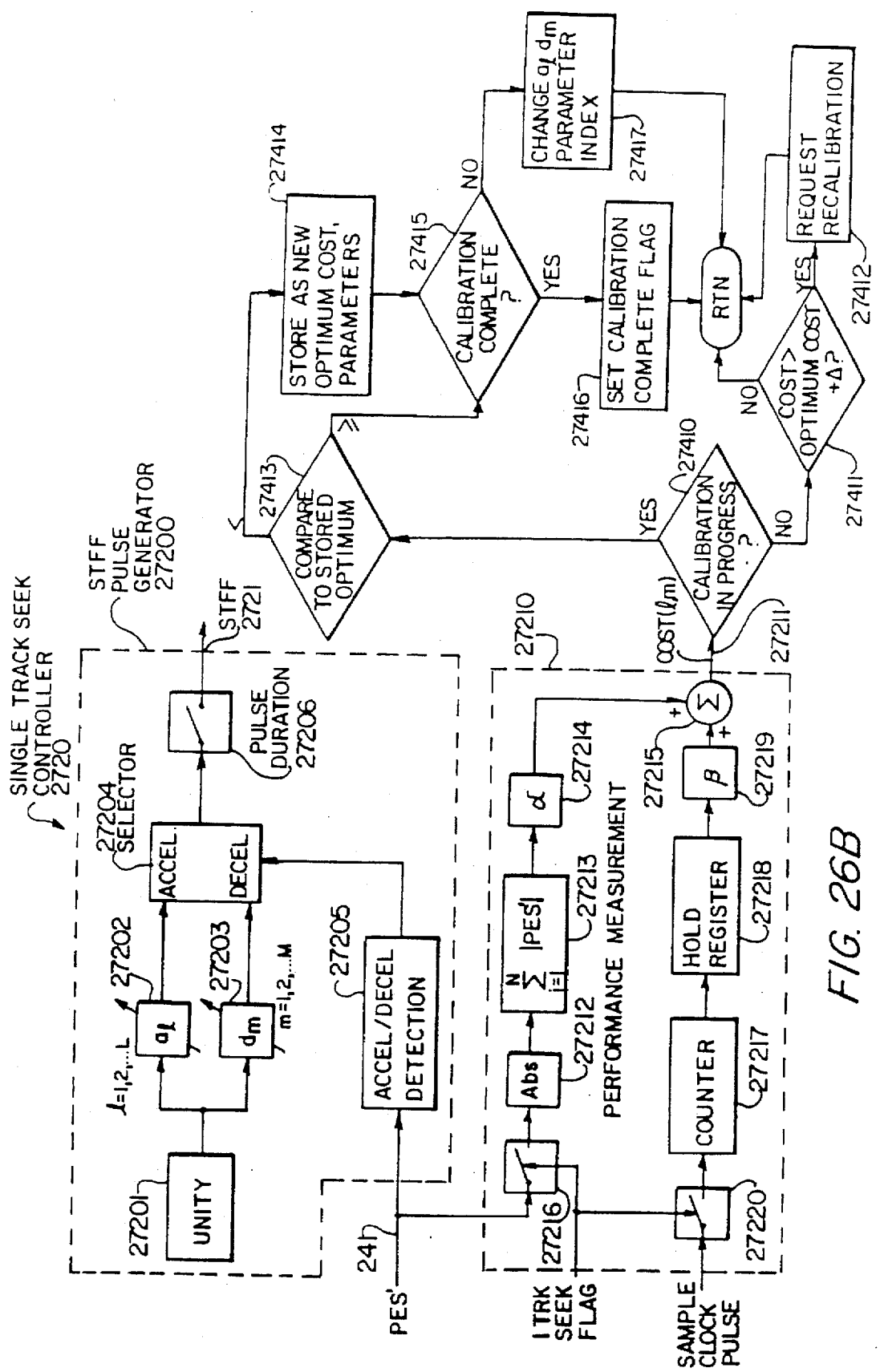
FIG. 26B schematically illustrates functional blocks present within the single track seek feedforward controller.

The single track seek feedforward controller 2720 may be schematically illustrated as shown in FIG. 26B. The single track seek feedforward pulse generator 27200 includes a unity source 27201 feeding both an $a_L$ multiplier 27202 and a $d_M$ multiplier 27203. Outputs of multipliers 27202 and 27203 are input to respective select inputs of a selector 27204. The select input of selector 27204 is connected to an acceleration/deceleration pulse detection block 27205 which determines when an acceleration pulse ends and a deceleration pulse begins, in response to the measured positional error signal PES'. Finally, a switch 27206 connects or disconnects the output of selector 27204 to the output of the single track feedforward controller, on path 2721. Briefly, the magnitude $a_L$ determines the magnitude of the acceleration pulse, while $d_M$ determines the magnitude of the deceleration pulse, the timing division between which is determined by block 27205. The beginning of the acceleration pulse, and the end of the deceleration pulse are determined by the timing of the control input to switch 27205. The control input to switch 27205 is determined by logic governing the duration of the acceleration and deceleration pulses.

The values of the parameters $a_L$ and $d_M$ are determined as follows. First, a performance measurement block 27210 determines a cost function on path 27211 for a variety of different possible acceleration and deceleration pulse heights and durations. In particular, performance measurement block 27210 includes an absolute value block 27212 in series with a summation block 27213 and an a multiplier 27214, which feeds an adder 27215. The PES' signal feeds the absolute value block 27212 through a switch 27216 enabled by the single track seek flag. In a parallel path, sample clock pulses are counted by a counter 27217 when enabled by a switch 27220 governed by the single track seek flag. The output of counter 27217 is placed in a hold register 27218 which in turn has an output multiplied by a $\beta$ multiplier block 27219. The outputs of the $\alpha$ multiplier block 27214 and $\beta$ multiplier block 27219, respectively indicating overshoot and settling time in the cost function, are added by adder 27215 to arrive at cost value on path 27211. The cost value is a function of different indices used for permutations of different magnitudes and durations of the acceleration and deceleration pulses.

A decision block 27410 determines whether a single track seek feedforward controller calibration is in progress. If a calibration is not in progress (indicating the controller is actually operating), the DSP determines whether the present cost is greater than an optimum cost (as previously determined plus an allowable variation $\Delta$) as indicated by block 27411. If the present cost exceeds the optimum cost plus the variation $\Delta$, the DSP concludes that the present calibration values have sufficiently deteriorated from optimum to request that the master issue a recalibration command at block 27412.

However, if the DSP determines that a calibration is in progress, it determines whether the present cost function is less than the optimum cost heretofore accumulated, as indicated by block 27413. If the present cost is less than the optimum cost, the optimum cost is set to the present cost, and the new parameters $\alpha_L$ and $\beta_L$ replace the previous optimum parameters, as indicated by block 27414. Control passes to block 27415.

However, if the present cost is not less than the optimum cost hitherto calculated, the replacement block 27414 is skipped, and control passes directly to block 27415. Block 27415 determines whether the present calibration is complete. If the present calibration is complete, the DSP exits the calibration routine and sets the calibration complete flag, indicated in block 27416, before returning to the calling routine. However, if the calibration is incomplete, control passes to block 27417. In block 27417, the indices of the $a_L$ and $d_M$ parameters are changed, to allow testing of a new permutation of values. They are stored in respective blocks 27202 and 27203 in the pulse generation block 27200.

Figure 27:
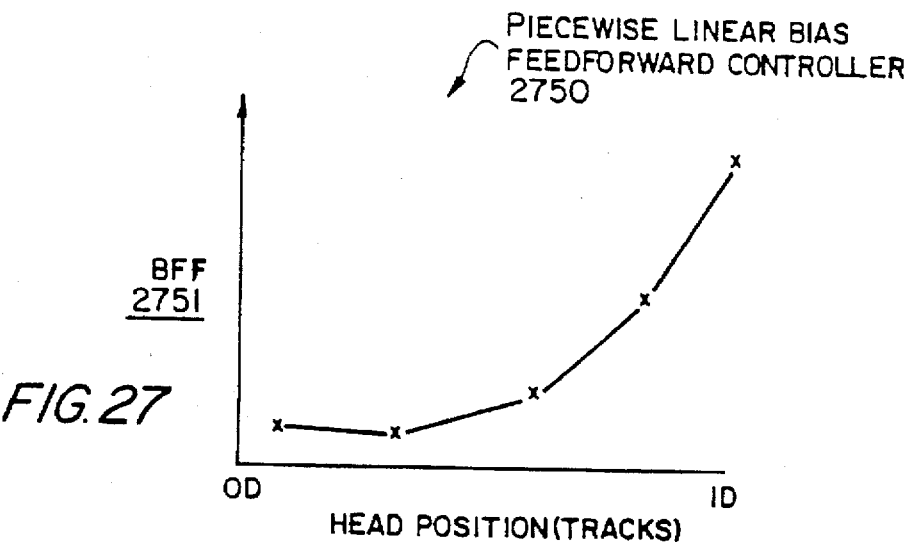
FIG. 27 illustrates a bias compensation function waveform derived during calibration for the bias feedforward controller.

Referring now to FIG. 27, the operation of the bias feedforward controller 2750 is illustrated. A primary advantage of providing the bias feedforward controller 2750 in conjunction with the integral controller 2740 is a significant reduction in transient dynamics when the integral controller is switched on or off.

As shown in FIG. 27, each data point x represents an average of various values $u_i(k)$ output during a calibration period by integral control effort block 2740 (FIG. 24), for a given track position on the horizontal axis. The averaged values are plotted as a function of track, between the outside diameter (OD) and the inside diameter (ID). The plotted averaged integral control effort signals are joined by a suitable curve, indicated by the lines connecting the plotted points. In a preferred embodiment, the fitted curve may be a piecewise linear approximation joining the plotted points. Thus, within various radial segments of the disk, the bias feedforward compensation signal BFF on path 2751 is modeled by a linear interpolation, the totality of the bias feedforward control function thus being a piecewise linear approximation of the average bias compensation effort required.

Because the horizontal axis in FIG. 27 is the TrackID$_P$, the bias feedforward controller stores sets of linear equation variables $\beta_1$ and $\beta_2$ as a function of TrackID$_P$. The bias feedforward function is defined in a piecewise combination of line segments defined in the following manner:

$$BFF=\beta_1(TrackID_P)TrackID_P+\beta_2(TrackID_P)$$

The $\beta1$ and $\beta2$ values are stored in a table during the calibration process, and are called up for use according to the above formula when a particular TrackID$_P$ is encountered during operation.

Ideally, because the bias feedforward signal on path 2751 should compensate for the bias effects originally detected by integral control effort block 2740 during calibration, the "residual" integral control effort $u_i(k)$ (FIG. 24) should be essentially 0 during operation. However, the DSP monitors the residual integral control effort $u_i(k)$ to determine if a recalibration is necessary. Recalibration is often a result of factors such as the plant changing due to temperature, time, component wear, and so forth. Should the residual control effort $u_i(k)$ exceed a certain threshold during operation, the $\beta_1$ and $\beta_2$ values can be re-calibrated dynamically. The re-calibration is accomplished as during the initial calibration: by repeatedly positioning the heads, performing measurements of the bias using integral control effort block 2740, averaging the values determined thereby, and storing new values in the $\beta_1$, $\beta_2$ table.

Figure 28A:
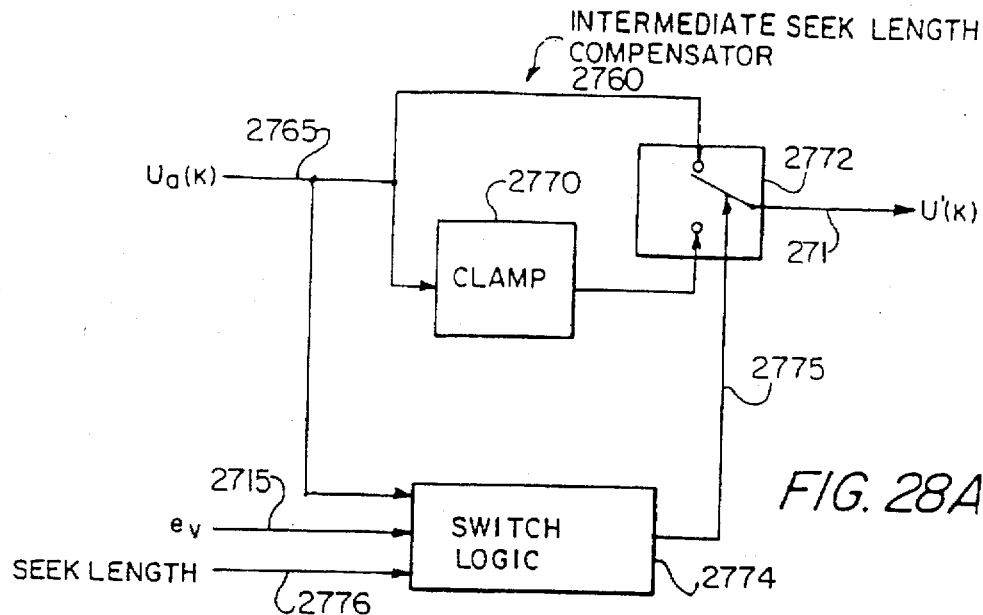
FIG. 28A illustrates in greater detail the intermediate seek length compensator.

The intermediate seek length compensator 2760 is illustrated in FIG. 28A. Intermediate seek lengths are those which are long enough to require large magnitudes of coil current, but whose time durations are not sufficiently long to allow the power amplifier to recover from saturation before arriving at the destination track. Thus, a seek is deemed "intermediate" if the seek is long enough to cause the plant power amplifier 116 (FIGS. 1A, 1B) to become voltage-saturated, but not long enough for the power amplifier to recover from saturation so the plant can follow its prescribed profile.

A problem of concern in intermediate length seeks is due to the finite supply voltage and the coil inductance. The problem which is encountered in seeks of intermediate length causes system performance shown by waveforms illustrated in FIG. 28B.

Figure 28C:
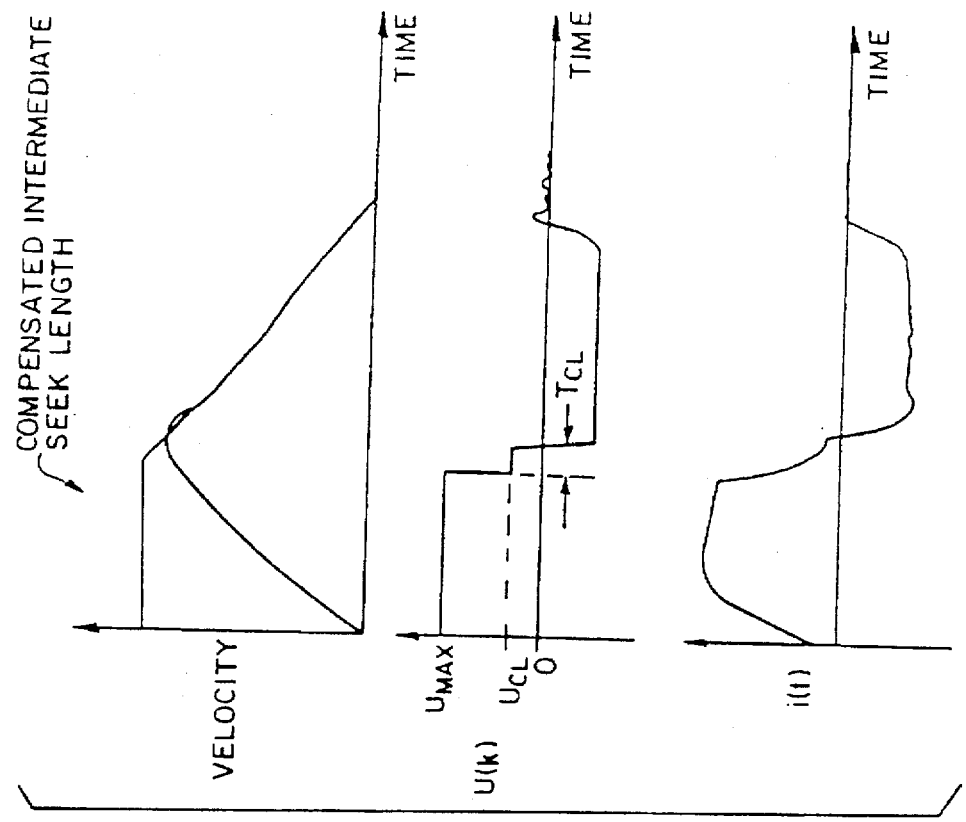
FIG. 28C illustrates the waveforms which overcome the problems of known controllers in intermediate length seeks, by introducing a clamping period at the end of an acceleration pulse which reduces overshoot.
Figure 28B:
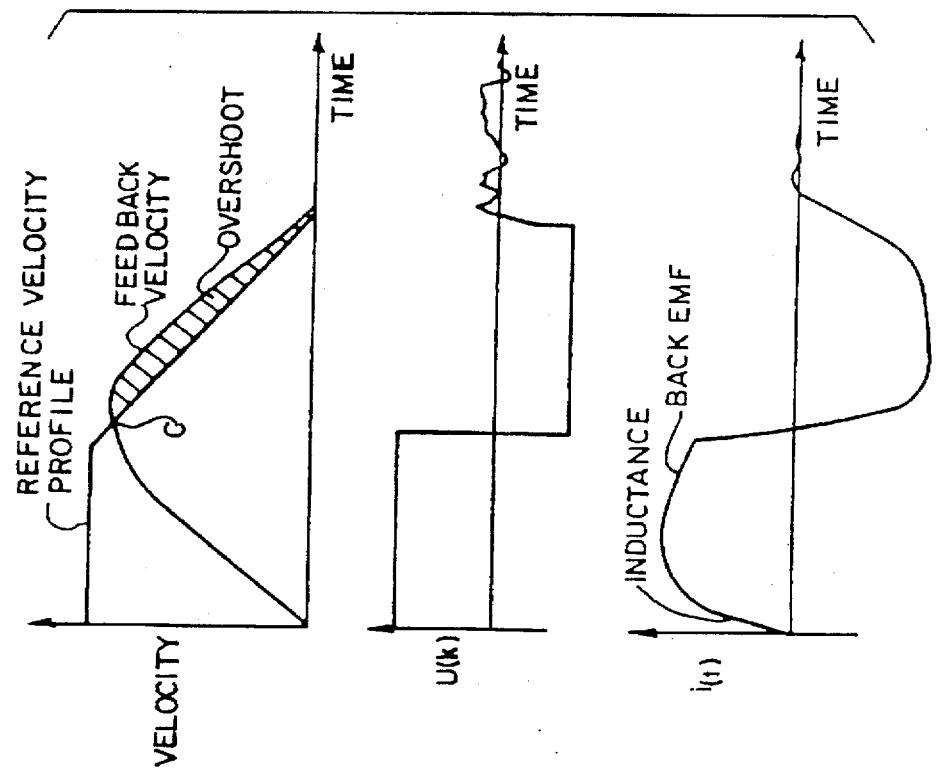
FIG. 28B illustrates waveforms which demonstrate the saturation problem experienced in known controllers during seeks of intermediate length.

Referring more specifically to the graphs shown in FIG. 28B, the top panel illustrates the reference velocity profile with the feedback velocity. The middle panel of FIG. 28B illustrates the control effort u(k) as a function of time, showing a substantially square acceleration pulse followed by its substantially square deceleration pulse. Finally, the bottom panel of FIG. 28B illustrates the actuator coil's current i(t) as a function of time. The slow rise time due to inductance in the coil, and the slowly decaying top of the pulse due to back EMF, are evident in the waveform.

During an intermediate length seek, the feedback velocity passes over the reference velocity profile at a crossover point C. The feedback velocity exceeds the reference velocity profile for a substantial time after the crossover point C, indicated by an "overshoot" area. This causes a reduction in performance due to undesirable physical overshoot of the destination track by the heads. This overshoot effectively extends the settling time of the heads, slowing overall disk drive performance.

The problem shown in FIG. 28B is not encountered in very short seeks, because the power amplifier never becomes saturated, allowing acceptably close modeling of plant performance. Short seeks do not require large magnitudes of coil current, so that the finite voltage limit dues not prevent the power amplifier from delivering the required coil current.

The problem shown in FIG. 28B is also not encountered in very long seeks, because the saturation of the power amplifier has been overcome through passage of time, allowing the overall plant performance to be modeled with acceptable accuracy. More specifically, whereas long seeks do require large coil current magnitudes which result in voltage saturation during acceleration and at the transition from acceleration to deceleration, the time duration of the deceleration phase of the seek is sufficiently long to allow the power amplifier to recover from saturation and operate in the linear mode to deliver the required coil current well in advance of the arrival at the destination track.

Briefly, the intermediate seek length compensator is pre-programmed to recognize intermediate seek lengths as being between 25 and 125 tracks away from the current head position. The compensator continuously monitors the velocity error during the acceleration phase of the seek. When (1) the magnitude of the velocity error (reference velocity minus feedback velocity) decreases to an optimally predefined threshold, and (2) the control effort is still in the acceleration phase, then the acceleration control effort is clamped to a fraction of the maximum value (for example, 25%) for the remainder of the acceleration pulse. This clamping causes the coil current to decrease prior to the deceleration pulse. When the deceleration phase begins and the control effort requests that the coil current transition from the acceleration polarity to the deceleration polarity, the voltage (v=Ldi/dt) required is less than would have been required had the clamp not been exercised, because di/dt is now smaller. A significant reduction or elimination in the duration of the voltage saturation results, which enables the servo system to optimally guide the head to the destination track in minimal time.

Referring more specifically to FIG. 28C, the intermediate seek length compensator 2760 according to the present invention alters the control effort function u(k) from FIG. 28B so that it is clamped during the final portion of the acceleration pulse. As illustrated in the middle panel of FIG. 28C, the acceleration pulse is reduced in value from its maximum value $U_{MAX}$ to a clamped value $u_{CL}$ during a clamping period $T_{CL}$ at the end of the acceleration pulse. By forming the first interim control effort signal u'(k) in this manner, the overshoot of the feedback velocity with respect to the reference velocity profile is minimized. The reduction in overshoot is illustrated by a comparison of the respective top panels of FIGS. 28C and 28B. By so modifying the control effort signal, the coil current is modified so that it has a waveform shown in the bottom panel of FIG. 28C.

The manner in which the clamping of the control effort signal is achieved is shown schematically in FIG. 2SA. The output of adder 2764 (FIG. 24), $u_a(k)$, is input to a clamping block 2770. A selector 2772 selects the $u_a(k)$ input signal in its "normal" position, before and after the clamping period $T_{CL}$ (FIG. 28C). During the clamping period, selector 2772 selects the output of the clamping block 2770. Control of the selector 2772 is determined within schematically illustrated switch logic block 2774.

Switch logic 2774 is thus responsive to the $u_a(k)$ signal on path 2765, as well as to the velocity error signal $e_v(k)$ on path 2715 from adder 2714 (FIG. 24). The switch logic 2774 activates selector 2772 only during seeks of intermediate length, the responsiveness to the seek length being schematically indicated by the presence of a seek length input 2776. The length of the seek is ultimately determined by commands received through command register 162 (FIG. 1B) in a manner readily appreciated by those skilled in the art.

Re-calibration. The portions of the preferred servo system which are calibrated, and capable of re-calibration, include the offset correction block 2102, the low gain normalization block 2240, the single-track seek feedforward compensator 2720, and the bias feedforward controller 2750. According to the present invention, any block which may be calibrated, may also be re-calibrated during operation. Re-calibration during operation ensures that overall system performance may be continually optimized, even in the presence of such factors as component aging, temperature variation, changes in physical orientation of the disk drive, and so forth.

Figure 29:
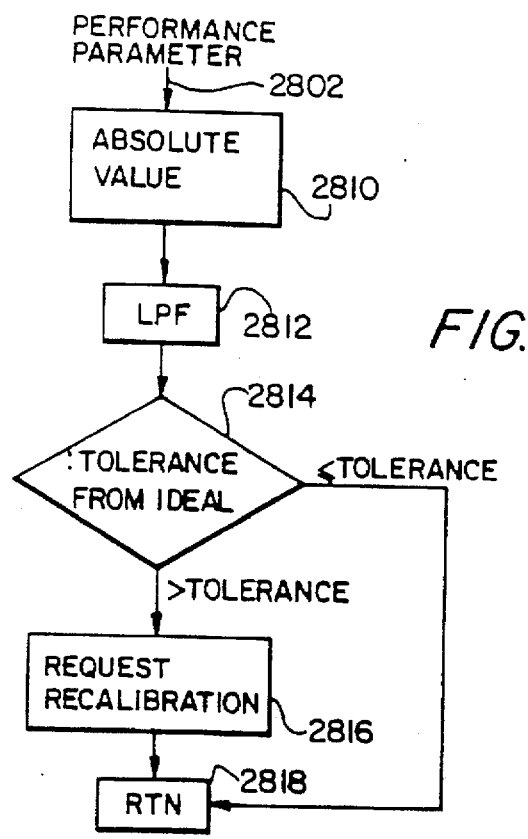
FIG. 29 is a high-level flow chart indicating the preferred manner in which the DSP determines when a recalibration of a correction or compensation block is needed.

FIG. 29 schematically illustrates the manner in which a given compensation or correction block may be re-calibrated during operation. The compensation or correction block may be any of those four mentioned specifically, or, conceivably, any other block which a designer may find it advisable to dynamically re-calibrate.

During operation of the servo system, a suitable performance parameter, indicated as an input on path 2802, is examined. What the suitable performance parameter is, varies with the particular calibration block under consideration. For example, if the offset correction block is under consideration, the performance parameter is a measured offset value. If the calibration block under consideration is the low gain normalization block, the performance parameter is a measured variation away from the predicted nonlinear gain. if the calibration block under consideration is the single-track seek feedforward compensator, the performance parameter is the cost function as measured in FIG. 26C. If the calibration block under consideration is the bias feed forward controller, the performance parameter is the residual control effort $u_i(k)$ output by the integral control effort block 2740.

The DSP takes the absolute value of the performance parameter in block 2810, and subjects a series of such absolute values to a low pass filter function, schematically illustrated as 2812. The low pass filter ensures that a single abnormal measurement does not cause re-calibration. The purpose of blocks 2810 and 2812 is to ensure that the magnitude of a meaningfully quantity of measured performance parameters are considered.

At block 2814, the DSP compares the variation from ideal of the filtered absolute values of the performance parameter to a predefined performance tolerance. The tolerance to which the filtered absolute values are compared, varies with the particular calibration block under consideration. For example, if the offset correction block is under consideration, the tolerance is an offset variation. If the calibration block under consideration is the low gain normalization block, the tolerance is tolerance of gain away from the predicted nonlinear gain. If the calibration block under consideration is the single-track seek feedforward compensator, the tolerance is a cost function variation value Δ as described with respect to FIG. 26C. If the calibration block under consideration is the bias feed forward controller, the tolerance is a maximum allowable variation of residual control effort $u_i(k)$ output by the integral control effort block 2740.

If the filtered absolute value of the performance parameter is less than or equal to the allowed tolerance away from an ideal value, then the DSP continues in its processing without requesting re-calibration, indicated by block 2818. However, if the filtered absolute value of the performance parameters is greater than the allowed tolerance away from the ideal value, then the DSP requests the master issue a re-calibration command. The request for re-calibration, indicated as block 2816, is passed through the status buffer 160 (FIG. 1B) in the form of a status word indication. In response, the master may find issue a re-calibration command to cause the particular block under consideration to be re-calibrated.

In this manner, the present system can adaptively compensate for such factors as component aging, temperature variation, changes in the physical orientation of the disk drive, and so forth, to continually optimize the disk drive's performance.

Dynamic scaling of parameters. According to a preferred embodiment, the values of various parameters in the firmware are dynamically scaled. That is, the values of certain parameters, previously described as being "constant", may collectively change under certain circumstances. According to dynamic scaling, the value of the parameters is determined by the expected range of data magnitude which are encountered at any given time. For example, in the full state observer 250 in FIG. 22, the parameters $\Gamma_{po}$, $\Gamma_{p1}$, $\Phi_p$, $C_p$, and $C_e$ in blocks 2543, 2544, 2546, 2551, and 2572, respectively, collectively take on differently scaled sets of values, depending on the value of the PES and velocity signals. Similarly, in the integral controller 270 in FIG. 24, the scalar multiplier f(PÊS(k)), K, $K_i$ in respective blocks 2712, 2762, and 2746, are similarly dynamically scaled.

The advantage of dynamic scaling is better understood by a recognition that, in the preferred embodiment, a digital signal processor is implemented using 16-bit integer arithmetic. Words of 16-bit length provide adequate resolution only over a given range of measured values, inasmuch as they can represent numbers ranging from 0 through $65,536_{10}$. However, the velocity and position measurements which are of concern throughout the DSP control system as a whole (FIG. 12) take on values which exceed the dynamic range capable of representation with only 16 bits. A processor with larger word size could be used; however, this would result in increased cost. Alternatively, floating point arithmetic could be employed; however, use of floating point arithmetic is substantially more expensive. Therefore, the present invention combines the speed and simplicity of integer arithmetic with the advantages of accuracy which follow from an extended dynamic range of parameter values.

According to the present invention, a plurality (preferably three) resolution modes are provided: fine resolution mode, mid resolution mode, and coarse resolution mode. The above list of parameters thus may thus take on three different sets of values: fine resolution values, mid resolution values, and coarse resolution values, each different set of values corresponds to one of the resolution modes. The mid resolution mode may be divided into linear and non-linear modes for some purposes, as illustrated in FIG. 15.

At any given time, only one of the three parameter sets are used in the mentioned functional blocks shown in FIGS. 22 and 24. The choice of which of the three parameter sets is made by reference to the magnitude of the positional error signal and the velocity state signal.

For simplicity, the positional error signal is first considered in isolation. If the positional error signal indicates the head is less than (for example) 0.08 track from the destination track, the controller is in the fine resolution mode, and the fine resolution parameter set is used in the mentioned blocks in FIGS. 22 and 24. If the positional error signal indicates the heads are a distance to a destination track of (for example) between 0.08 and 100 tracks, the mid resolution parameter set is used in FIGS. 22 and 24. Finally, when the positional error signal indicates a distance to destination track of greater than (for example) 100 tracks, the coarse resolution parameter set is employed in FIGS. 22 and 24.

In the preferred embodiment, the determination of which resolution mode parameter set is used is also determined in accordance with the velocity of the heads. Analogous to the two PES thresholds of 0.08 track and 100 tracks, two velocity thresholds are chosen, defining boundaries between three velocity regions. The two thresholds determine whether the velocity indicates the resolution mode should be fine (if less than the lower threshold), medium (if between the two thresholds), or coarse (if greater than the larger threshold). The velocity thresholds may be chosen by those skilled in the art, based on the particular disk drive under consideration.

According to a preferred embodiment, velocity thresholds are primarily designed to prevent DSP fixed-length integer word overflow. The velocity thresholds to enter fine resolution mode are stringent, to prevent $PES_F$ from saturating after entering high gain mode (see FIG. 15). Thus the decision to switch between coarse and mid resolution parameter sets is made when the velocity crosses 37211 tracks per second, regardless of whether the heads are accelerating or decelerating. However, the velocity decision threshold to enter fine resolution mode from mid resolution mode, is more stringent than that allowing fine resolution mode to be exited to mid resolution mode. In particular, mid resolution mode is exited to enter fine resolution mode on decelerating through 126 tracks per second. Conversely, fine resolution mode is exited to enter mid resolution mode on accelerating through 590 tracks per second. Of course, alternative schemes of entering and exiting resolution modes lie within the contemplation of the invention.

The "worst case" of the positional error signal resolution mode and the velocity resolution mode choice is chosen, with a bias toward coarser resolution mode. That is, if the positional error signal indicates that the position supports a fine resolution mode, but the velocity is between the first and second velocity thresholds (indicating a mid resolution parameter set should be used), the "worst case" is the choice of the mid resolution parameter set. In this manner, the observer and the integral controller functions never "overflow" with data values larger than expected. The range of values handled by the DSP controller is thus increased. Without dynamic scaling of the mentioned parameters, the performance of the DSP would be limited by the size of the data words, and the accuracy of its measurements and calculations would be compromised due to saturation and/or quantization errors at extreme data values.

Figure 30:
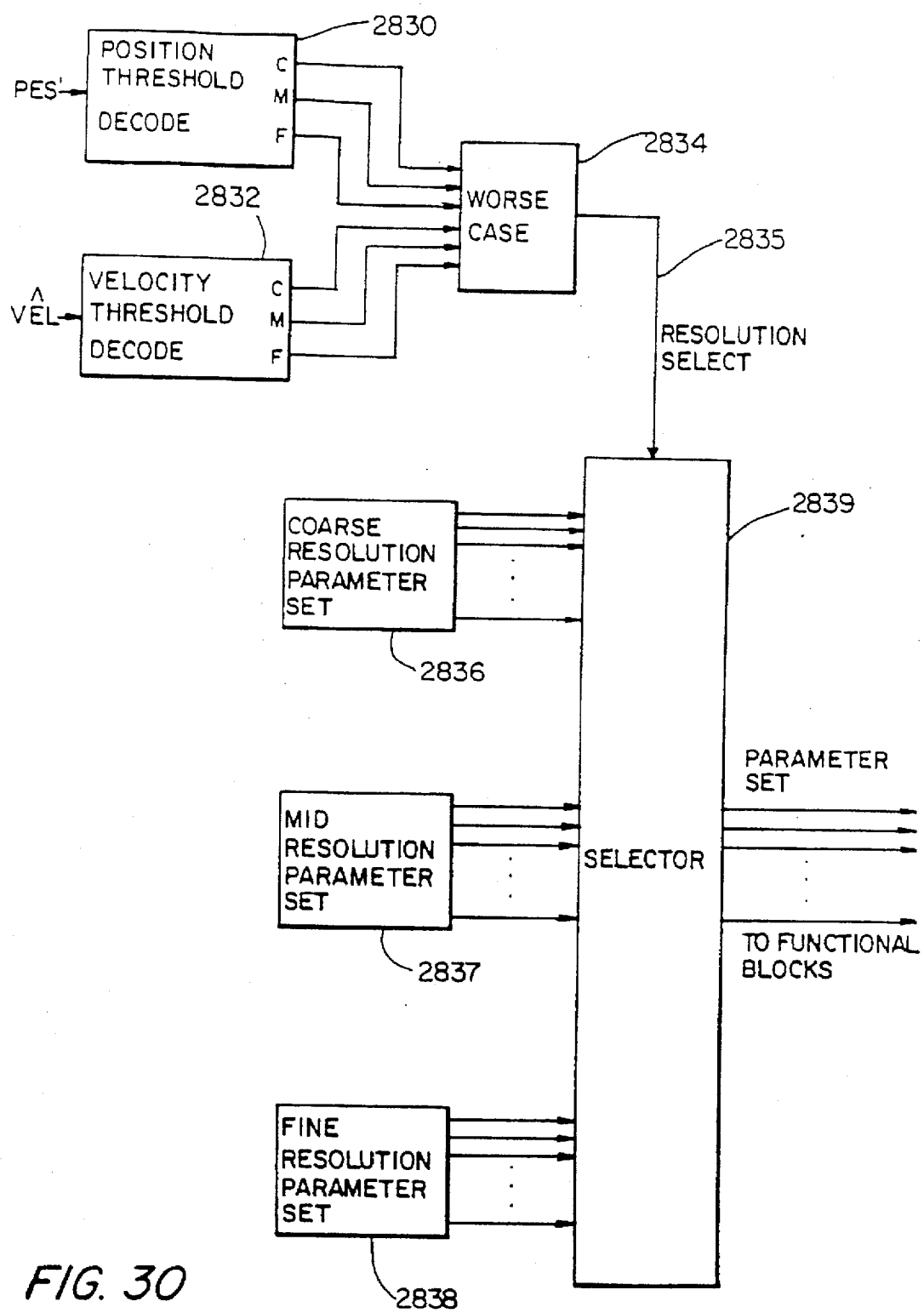
FIG. 30 illustrates schematically the ability of the DSP to dynamically scale parameters used in functional blocks in the full state observer and integral controller, selectively using coarse, mid, and fine resolution parameter sets based on positional error measurements and velocity states.

FIG. 30 schematically illustrates the dynamic scaling of parameters described above. More specifically, the processed positional error signal PES' and the velocity state variable VÊL entering position threshold decoder block 2830 and velocity threshold decoder block 2832, respectively. These decoder blocks examine their respective input signals and provide an active signal on exactly one of three of their output paths to indicate whether the input signal falls within (1) the fine resolution mode position or velocity range,
(2) the mid resolution mode position or velocity range, or
(3) the coarse resolution mode position or velocity range.

The decoders determine which of their three respective paths to activate by comparing the input value to the two thresholds which define the boundaries between the three possible resolution modes.

The worst case mode selection block 2834 reviews the two active paths from decoders, and selects the "worst" mode. Coarse resolution is considered worse than mid resolution, which in turn is considered worse than fine resolution mode. Block 2834 outputs its decision as to which of the two resolution modes is worse, on path 2835.

Different sets of values for parameters $\Gamma_{po}$, $\Gamma_{p1}$, $\Phi_p$, $C_p$, and $C_e$ in blocks 2543, 2544, 2546, 2551, and 2572 (FIG. 22), and for parameters such as scalar multiplier f(PÊS(k)), K, and $K_i$ in respective blocks 2712, 2762, and 2746 (FIG. 24) are stored in coarse resolution parameter set memory 2836, mid resolution parameter set memory 2837, and fine resolution parameter set memory 2838, respectively. The "worst case" resolution select signal on path 2835 determines which parameter set is used in the function blocks in FIGS. 22, 24, schematically indicated by a parameter set selector 2839. In practice, it is preferred that the "worst case" selection signal merely point to a particular location in a table containing the different parameter sets, so as to specify to the DSP which of the three parameter sets to use when performing the functions in the functional blocks in FIGS. 22 and 24.

In operation, typically, the parameters in coarse resolution parameter set memory 2836 are used during the initial portion of a seek. The parameters in mid resolution parameter set memory 2837 are used during the middle portion of a seek. Finally, the parameters in fine resolution parameter set memory 2838 are used during the final portion of a seek. However, perturbations such as physical shock or vibration may cause the worst case signal on path 2835 to temporarily revert to a worse resolution mode, as explained above.

Figure 13:
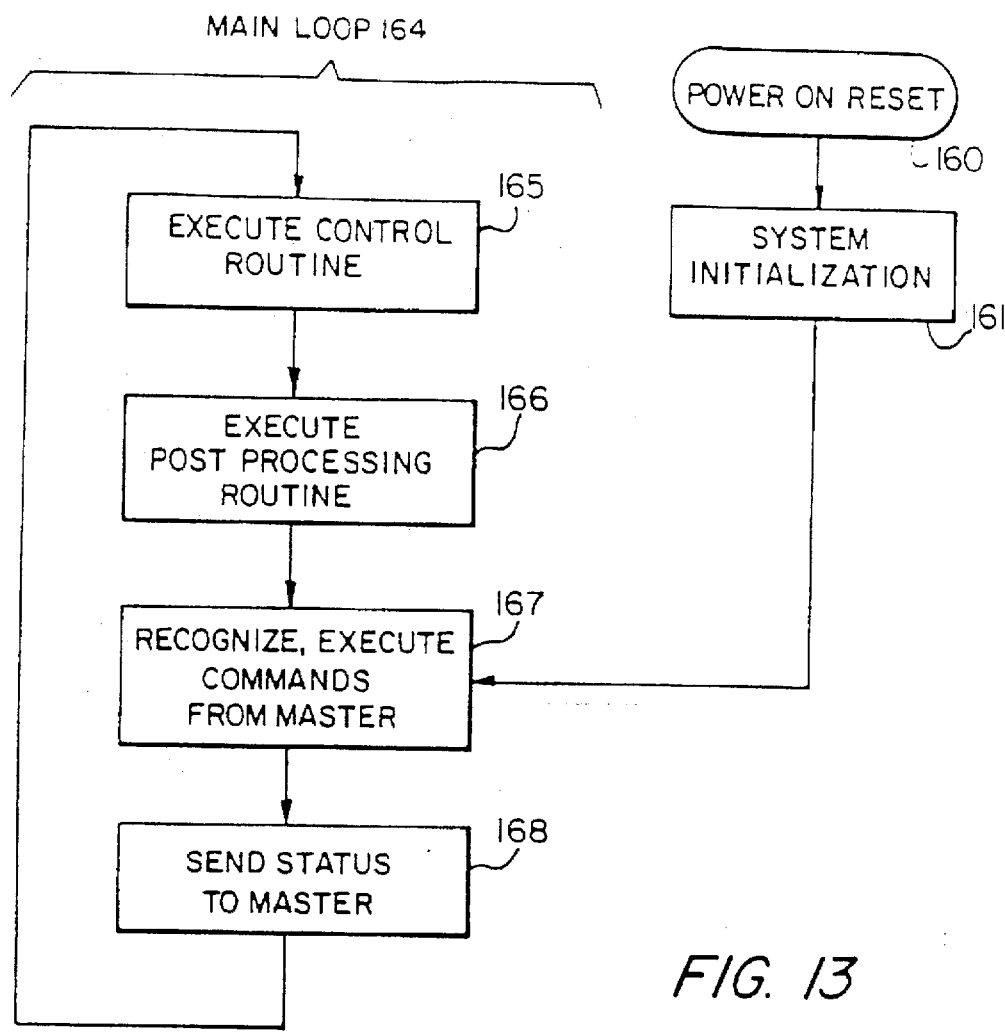
FIG. 13 is a high-level flow chart indicating sequential execution of control routines, post processing routines, command routines, and status transmissions normally encountered in a firmware main processing loop according to the second embodiment.

HIGH-LEVEL FLOW CHART. FIG. 13 is a high-level flow chart indicating operation of the digital signal processor 110, with special reference to the DSP control system shown in FIG. 12.

When power is turned on, or upon a reset command, control passes from power on/reset block 160 to the system initialization block 161. During system initialization, the DSP system hardware and RAM, as well as external peripherals, are initialized. Also, a checksum memory test of the DSP program memory is performed. Any other initialization routines required for any given embodiment are performed at this time, in accordance with principles known to those skilled in the art. Further, however, the parameters shown in the inventive system in FIGS. 12–30 are downloaded. Thereafter, control passes to a block 167 which is part of a main loop 164 comprising blocks 165, 166, 167, 168.

In block 167, the DSP checks command register 162 (FIG. 1B) for a commend from the master. First, the DSP checks to see whether the command (if any) is a new command. If the command is not a new command, then control passes immediately to block 168. However, if a new command is present, it is processed. In a particular preferred embodiment, the command register is a 16 bit register. The upper four bats are the command code which is later used to address a command jump table. The command jump table is a table of addresses pointing to initial locations of respective sequences of DSP instructions implementing that particular command. The lower 12 bits of the command word are parameters for use in the particular command. Finally, the command is executed, in the manner of a subroutine, before control passes to block 168. Master commands which are believed important to operation of a particular preferred embodiment are described in greater detail below.

In block 168, the DSP verifies the availability of status register 160 for receipt of any status reports from the DSP. If the status buffer 160 is not available, of if there is no status word to report, control passes immediately to the top of the loop, to block 165.

However, if the status buffer is available, the DSP determines whether the tracking status is "pending". The tracking status is a report of the degree to which the DSP believes the disk drivers heads are tracking the appropriate track. The tracking status is "pending" when the DSP has a tracking status report to provide to the master. In this case, the status is sent to the con,roller, and control passes to block 165.

If the tracking status is not pending, then the DSP determines whether a command status is pending. A command status is the DSP's report as to the DSP's execution of a command previously received from the master. If a command status is pending, it is sent to the master. If it is not pending, control passes to block 165.

Block 165 generally denotes execution of a DSP control routine. FIG. 12 illustrates the control routine schematically. It is understood that various parameters and switch settings in FIG. 12 vary, depending on information in the servo field, commands received from the master, and internal variables derived from a history of inputs to the system. However, generally, the various firmware blocks shown in FIG. 12 are executed in direct response to the head's encountering a servo field. According to a preferred embodiment, the blocks shown in FIG. 12 are implemented in DSP firmware.

After the control routine is executed in block 165, control passes to block 166. In block 166, post processing routines are executed. The post processing routines often view the results of the control routine which was just executed, and determine an appropriate control routine to execute during a subsequent iteration of loop 164. For example, based on state variable values and predicted positional error values calculated by the end of the previous control routine, a post processing routine may determine whether the same, or a new, control routine should be executed during the next iteration of loop 164.

Post processing routines also check to see whether calibration of any parameters is necessary. If calibration is necessary, the post processing routines initiate the calibration. Further, post processing routines change the "switches" shown schematically in FIG. 12, such as high gain/low gain switch 2230 (FIG. 18A) and integral control effort switch 2748 (FIG. 24). Moreover, the post processing routines define status words to be sent to the master via status buffer 160 (FIG. 1B), when appropriate.

The specification of which control routine or which post processing routine is to be executed in a subsequent block 165 or 166, respectively, is made trough selection of a "control vector" or a "post processing vector", respectively. The term "vector", as used herein, denotes a pointer indicating a routine. However, "vector" may also be used loosely to refer to the entire routine which is specified.

It is understood that the flow chart in FIG. 13 is schematic in nature, and that variations on the illustrated program flow may be made, while remaining within the scope of the invention. For example, when the post processing routine determines an emergency situation (such as the head varying from center track during a write operation), it can cause actions to be taken immediately to prevent further writing, actions which would otherwise be contained in blocks 165 or 167, for example. Thus, FIG. 13 shows the flow encountered in the majority of servo sample periods, but need not absolutely restrict all implementations of the present invention.

FIG. 13 demonstrates the second embodiment's use of modular blocks of DSP code. During execution of a control routine (165), a particular post processing routine may be designated for execution immediately thereafter. Similarly, during execution of a post processing routine (166), a control routine maybe designated for execution in block 165 during a subsequent iteration of the loop. However, the master may issue a command, detected in block 167, which changes the control routine which is designated for execution in the next iteration. The modular nature of the blocks of code allow rapid re-direction of control in response to a variety of circumstances.

Figure 14:
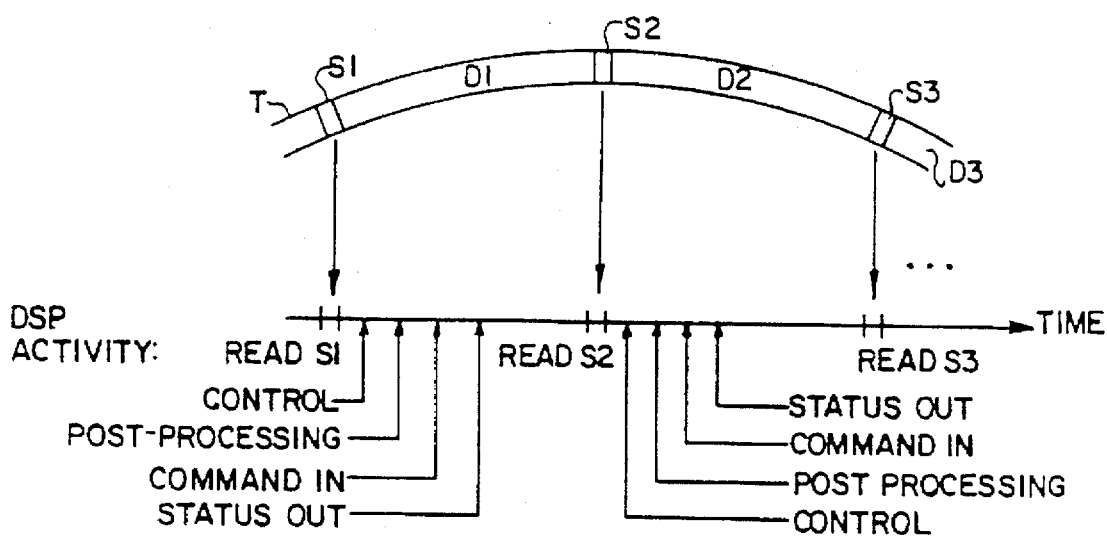
FIG. 14 illustrates the timing of various digital signal processor DSP operations during a typical sequence of servo field sample periods.

High-level Timing. FIG. 14 illustrates schematically a typical track T having a series of data fields D1, D2, D3 alternating with servo fields S1, S2, S3. Servo fields S1, S2, S3 are preferably of the type illustrated in greater detail in FIG. 16.

FIG. 14 also has a timing diagram juxtaposed with the illustrative track T, showing correspondence of DSP activities to the head's encounters with servo tracks. In particular, it is apparent that the main loop 164 of FIG. 13 is executed once per servo field as in the majority of sample periods. When a servo field is read, the presently specified control routine is executed, corresponding to block 165 (FIG. 13). Thereafter, a post processing routine which was specified within the control routine or before the control routine, is then executed, corresponding to block 166. Thereafter, the command register is checked for commands from the master, corresponding to block 167. Finally, a status word is output to the output buffer when appropriate, corresponding to block 168.

According to the preferred embodiment, the software routines are optimized for speed of execution, so that the status is output well before a subsequent servo field is encountered by the heads. This is indicated by the space between "status out" and the subsequent "read S2". Execution of the FIG. 13 loop including the control routine, post processing, command input, and status output, is repeated for each encounter of a servo field. It is understood that the timing illustrated in FIG. 14 need not be followed in all sample periods, but is illustrative of the functioning of the DSP in most scenarios. For example, if the reading of a servo field synchronization pulse is not detected early, then no such loop is executed. A suitable reacquisition technique, known to those skilled in the art, may be executed in the event of a sufficiently large number of "missed" servo fields.

Phases of a Typical Seek. FIG. 15 is a diagram indicating various parameters, modes, and manners of functioning during various portions of a long seek. More specifically, the graph at the top of FIG. 15 illustrates reference velocity output from block 2712 (FIG. 24) as a function of time. FIG. 15 also illustrates the feedback velocity VÊL on path 251 (also in FIG. 24). As readily appreciated by those skilled in the art in light of the accompanying description, the feedback velocity approaches the downwardly sloping reference velocity, preferably as soon as possible and with minimal overshoot. (In FIG. 15, the overshoot is exaggerated for purposes of illustration.) The difference between the reference velocity and the feedback velocity, essentially an error function $e_v$ on path 2715 (FIG. 24), approaches zero as the head approaches the center of the destination track.

FIG. 15 also illustrates the settling window detectors' high gain/low gain signal on path 261 (FIG. 12). FIG. 15 illustrates ranges of positional error signals during successive time periods corresponding to the velocity curves in the graph at the top of FIG. 15. Further, the resolution mode is demonstrated to proceed from coarse resolution, to mid resolution, and finally to fine resolution as the head approaches the center of the destination track, allowing different parameter sets to be used in the DSP firmware. FIG. 15 also illustrates when the PES windows (integrator, read, write, low/high gain) are determined by settling window detectors in block 260 (FIG. 12). FIG. 15 illustrates when the coarse static window block 2420 and the fine dynamic window block 2430 (FIG. 20A) contribute to a determination of the processed measured positional error signal PES' (k). FIG. 15 illustrates when the $PES_F$ measurement is ignored during PES determinations. Finally, FIG. 15 illustrates the control routines which are active during the sequential periods of the seek.

FIG. 15 is presented to draw together preferred timing of functions of various portions of the DSP software, with the understanding that variations may be made without departing from the scope of the invention.

DETAILED DESCRIPTION OF SEQUENTIAL OPERATIONS. The following sections provide descriptions of sequential operations of various preferred command routines, control routines (including subroutines and window routines), and post processing routines (including calibration post processing routines). These descriptions supplement the flow diagrams shown, for example, in FIG. 12 and the figures detailing its structure.

Flags. In the following descriptions, various flags are referred to. For reference, the following brief descriptions are provided.

The "Write Flag" is set to indicate that the head is stably positioned within the write window (see FIGS. 23A, 23B, 23C).

The "Write Protect Flag" is a hardware control line which, when set, prevents the disk drive hardware from writing data on the surface of the disk. Generally, the write protect flag is set when the head is not stably within the write window, as determined by the Write Flag, above.

The "Read Flag" is set to indicate that the head is reliably positioned within the read window (see FIGS. 23A, 23B).

The "offtrack" flag is set to indicate that the head has exited either one of an appropriate window, either the write window or the read window.

The "Spurious Sample Flag" is set to indicate an apparently bad sample has been encountered. This flag is set to indicate exactly one such occurrence, that is, during a single sample period. Generally, this flag is checked during a subsequent sample period. When the subsequent sample is determined to be a bad sample, the DSP knows that two consecutive apparently bad samples have been read, allowing it to respond accordingly.

COMMAND ROUTINES. Various commands from the master are now discussed, for purposes of illustrating a preferred operation of the DSP according to the present invention. The following discussions assume the DSP has received a command from the master, in accordance with block 167 (FIG. 13). Near the end of most command routines, the command status word is set to a certain value to indicate, for example, completion of non-completion of the command. It is understood that, when the status is set to a certain value for output to the status buffer 160 (FIG. 1B), the command status "pending" indication is set, analogous to the status pending described above. Such minor "bookkeeping" tasks, well capable of implementation by those skilled in the art, are omitted from the following descriptions for the sake of brevity.

Generally, the following routines may be called from any other routine, as needed. The descriptions herein often specify that "control returns to the main loop", on the assumption that, in the preferred embodiment, such routine is most likely called from the main loop. However, it is understood that, if called from a routine and not from the main loop, control would return to the calling routine, and not to the main loop. Further, when it is said that control returns to either the main loop or the calling routine, the routine is considered terminated, and no further processing occurs in that invocation of the routine.

BAD COMMAND. When the DSP receives a command which is invalid, illegal, or unrecognizable for some reason, the BAD COMMAND is executed. A command to seek to a track which does not exist, for example, is invalid. Similarly, a command which has a command code not corresponding to any valid command, causes this routine to be executed. The routine itself comprises setting the command status to "bad command" and returning to the main loop.

HEAD SELECT. When this command is received, the DSP determines whether the DSP is busy performing another task or whether the head number selected in the command parameter is invalid. If either of these conditions is met, the BAD COMMAND routine is executed before returning to the main loop.

However, if neither of these conditions is present, the DSP selects a new head from among plural heads in the disk drive. The DSP resets the tracking status (which indicates the degree to which a head is tracking its destination track). The low gain mode is entered, on the assumption that selection of a different head causes a deterioration in tracking performance with respect to the new head as compared to the head which was formerly selected. Further, the settling counters for determining the settling windows in settling window detectors 260 (FIG. 12) are initialized. Finally, the control vector for the subsequent control routine iteration in block 165, and the post processing vector for the subsequent post processing routine iteration in 166, are chosen. In particular, a LOW GAIN TRACKING vector (described below) is selected as a subsequent control routine, and the SETTLE post processing vector is chosen for the subsequent post processing routine. After selection of the control and post processing vectors, the DSP returns to the main loop (FIG. 13).

FAST HEAD SELECT. The FAST HEAD SELECT command routine simply stores the next head to select, as commanded by the master. The FAST HEAD SELECT routine pre-stores the head which is to perform the seek, thus avoiding execution of the HEAD SELECT routine before the actual seek command. Command status is set to "fast head select complete". Of course, if the head selected by the master is invalid, the BAD COMMAND routine is executed. The advantage of the FAST HEAD SELECT routine is to expedite a subsequent seek command.

SEEK. The SEEK command first determines whether the DSP is busy performing another task, or whether the track number is an invalid selection. In either event, control passes to the BAD COMMAND routine, after which control is returned to the main loop. However, if the DSP is not busy performing another task and the track number is valid, the DSP sets the post processing vector to subsequently execute the SETTLE routine. Thus, the SETTLE post processing vector will subsequently be executed after any of the SEEK, SHORT SEEK, or LOW GAIN TRACKING control routines (described below).

The tracking status is then reset, indicating that the head is no longer on the desired track. The power amplifier saturation model 2510 (FIG. 21A) is initialized, prior to the seek. Appropriate flags are set, such as those selecting or deselecting the single track seek feedforward controller 2720 or the intermediate seek length compensator (FIG. 24), based on the difference between the current track and the requested track. A write protect flag is set to prevent overwriting preexisting data on the disk. The switch 2748 at the output of integrator 2740 (FIG. 24) is opened if the seek is not a one track seek, to avoid transient effects in the integrator during seeks longer than 1 track. The dynamically scalable parameters are scaled, based on the length of the seek. Finally, the control vector is set to either SEEK or SHORT SEEK, based on the length of the seek.

If the seek is a SHORT SEEK (less than, for example, 100 tracks), then the SEEK command routine terminates, control passing to the main loop. However, if this is a long seek, control passes immediately to the control routine indicated by the control vector, on the principle that on longer seeks exact timing is not as crucial as an early start. During longer seeks, there is a longer period of opportunity for correcting any inaccuracies in the control effort.

LOAD HEADS (WITH FAST HEAD SELECT). The LOAD HEADS command routine first verifies that the actuator is parked and that the selected head is valid. If either of these two conditions is not met, then the BAD COMMAND routine is executed before returning to the main loop. The body of the LOAD HEADS command routine begins with the selection of the new head which was stored during the FAST HEAD SELECT command routine previously executed. An initial bias current is set, biasing the actuator toward the outside diameter away from the parked position. The tracking status is cleared, indicating the designated head is outside all windows. The control vector is set to a routine which causes there to be no control effort output to the DAC 114, so that none of the routines schematically illustrated in FIG. 12 are executed. Finally, the post processing vector is set to indicate the LOAD HEADS post processing routine, described below. (The LOAD HEADS post processing routine contains the code which actually writes to the DAC. Thereafter, control returns to the main loop.

PARK HEADS (WITH FAST HEAD SELECT). The PARK HEADS command routine determines whether the selected head is invalid, executing the BAD COMMAND routine in that case. Assuming the selected head is valid, the requested track is set to 1300 (indicating a track inside the inner diameter (ID) of the disk). The poet processing vector is set to PARK HEADS, described below. Thereafter, the SEEK command routine is entered at a point where the tracking status is reset, the subsequent operations being executed as described above.

DOWNLOAD COEFFICIENTS. The calibration values in the compensation blocks, and the coefficients used in various multiplier blocks shown in the DSP control system of FIG. 12, are downloaded to tables in random access memory (RAM) associated with (or preferably in) the DSP. This command routine is executed, for example, after the disk drive exits a power save mode in which the DSP volatile RAM's contents were lost. Initially, the DOWNLOAD COEFFICIENTS command routine verifies that the actuator is parked and that the master-indicated data block number to download is valid. If either of these two conditions is not met, the BAD COMMAND routine is executed. Assuming the criteria are met, the DSP sets up a block starting address and block count, and sends a "ready to receive block" status to the master via status buffer 160 (FIG. 1B). Then, the DSP receives the block of parameters downloaded from the master, after which it sends a "final word received" status indication to the master. The downloading of coefficients thus being completed, control returns to the main loop (FIG. 13).

UPLOAD COEFFICIENTS. In a manner similar to the DOWNLOAD COEFFICIENTS command routine, the UPLOAD COEFFICIENTS routine verifies that the actuator is parked and that the block number to upload is valid, otherwise causing execution of the BAD COMMAND routine. The block starting address and block count are set up, and a "ready to upload block" status is sent to the master. The block is uploaded, after which the "transfer complete" status is sent to the master. The UPLOAD COEFFICIENTS command routine is advantageously executed immediately before power is cut off such as during the power save mode, thus avoiding the recalibration which would otherwise be necessary after power is restored to the disk drive.

CALIBRATION. The CALIBRATION command routine allows parameters within various functional blocks to be recalibrated. For example, offset correction calibration block 2102 (FIG. 17A), low gain normalization calibration block 2240 (FIG. 18A), single-track seek feedforward calibration block 2720 (FIG. 24) and bias feedforward calibration block 2750 (FIG. 24) may be calibrated, using routines which are called after the present CALIBRATION command routine is invoked.

First, the DSP determines whether it is busy with another task. If it is busy, the BAD COMMAND routine is executed, after which control returns to the main loop. However, if the DSP is not busy with another task, the calibration command parameter from the master is decoded, to determine the particular block which should be recalibrated.

In a particular preferred embodiment, the above four blocks are those which may be recalibrated. However, it lies within the contemplation of the invention that less than these four blocks, or blocks in addition to the four listed blocks, may be calibrated. In any event, after the DSP decodes the calibration type parameter, the appropriate calibration routine, one of those described immediately hereafter, is executed.

SINGLE TRACK SEEK FEEDFORWARD CONTROLLER (2720) CALIBRATION. This command routine immediately sets the post processing vector to SINGLE TRACK SEEK FEEDFORWARD. The command status is cleared, so as to cancel any existing indication that a prior command has been completed. The DSP selects (for example) head zero, and the destination track to track 100. Thereafter, the SEEK routine is entered at a point where the tracking status is reset, with subsequent operations executed as described above.

INPUT OFFSET CALIBRATION (2102). This calibration command routine first sets the post processing vector to OFFSET CALIBRATION, described below. The command status is cleared, and head zero (for example) is selected. The offset accumulation variable is cleared, and the destination track is set to 20. Then, the SEEK command routine is entered at a point where the tracking status is reset, and subsequent operations executed as described above.

LOW GAIN NORMALIZATION CALIBRATION (2240). The post processing vector is set to LOW GAIN NORMALIZATION CALIBRATION, described below. The command status is cleared. The DSP selects a starting head, for example head zero, as well as choosing a destination track (for example, 40) and a maximum track (for example, 760). The A+B accumulator is cleared, and a pointer set up for indicating a place in a table of straight-line equations, the place being a function of head and zone. A sample counter is set to an initial value. Finally, the control effort is reduced by one decibel for calibration purposes, the reduction accomplished by reducing any suitable parameter in the DSP control system. Thereafter, the SEEK command routine is entered at the place where the tracking status is reset, with subsequent operations being executed as described above.

BIAS FEEDFORWARD CALIBRATION (2750). The post processing vector is set to BIAS CALIBRATION, described below. The command status is cleared, to prevent improper indication that a command has been completed. The accumulator for averaging the bias force variables is cleared, and the sample down-counter, indicating the number of samples to average, is initialized. The data sample pointers, indicating data samples between the outside diameter and the inside diameter, is initialized. Finally, the starting track address is chosen. Then, the SEEK command routine is entered at the point where the tracking status is reset, with subsequent operations being executed as described above.

The command routines described immediately above are executed as part of block 167 (FIG. 13). With few exceptions (noted specifically), the control passes to sense status block 168, in which a status report is sent to the master via status buffer 160 (FIG. 1B). After a next servo field sample (illustrated in FIG. 14), a control routine designated by an active control vector is executed in block 165 (FIG. 13). Important control routines are next described.

CONTROL ROUTINES. FIG. 12 illustrates schematically the software which may be executed during the control routines. For purposes of this section, four control routines are described, corresponding to the successive control routines listed in FIG. 15. The four control routines are successively executed during a seek from a source location to a destination track, the successive execution assuming that no outside disturbance (such as a physical shock) perturbs the system. It is understood that, in the event of such perturbation, the tracking sensor measuring the distance between the present head location and the destination track may cause a jump from one routine to a previously executed routine. It should be noted that the four routines described below are all executed by the function blocks illustrated in FIG. 12 and sub-blocks thereof. The difference in function between the four routines derives from, for example, the difference in gain of the FIG. 12 system, the difference in resolution and corresponding difference in the parameters which are dynamically scaled, differences in functioning of the settling window detectors 260 and integrity testers 240, all as indicated in FIG. 15. FIG. 12 is a comprehensive system allowing both tracking and seeking to be accomplished without separate tracking and seek controllers.

The SEEK control routine. The SEEK control routine begins by setting the analog-to-digital converter to low gain. Then, the DSP inputs and processes the raw sample from the analog-to-digital converter 132. At this time, the value of $PES_F$ is known.

Next, the DSP verifies the presence of a properly timed synchronization signal. In the presence of a good synchronization signal, the measurement is scaled according to a "bits per track" multiplier to place the measurement in units of "bits", after which the COARSE STATIC WINDOW subroutine, described below, is executed. If the synchronization signal was not found, or was a bad synchronization signal, the scaling step and the COARSE STATIC WINDOW execution are skipped.

The DSP then calculates the observer output equations, $\hat{x}(k)$. Based on the predicted position and velocity states comprising $\hat{x}_p(k)$, the DSP generates the reference velocity and control effort $u(k)$. The DSP outputs the control effort $u(k)$ to the digital-to-analog converter 114 (FIG. 1B) after suitable scaling. Thereafter, the observer update equations are calculated.

The DSP then determines whether the heads are close enough to the destination track to change resolution from coarse resolution to mid resolution. If the heads are close enough to the destination track, the DSP replaces the coarse resolution parameters with mid resolution parameters and sets the control vector to SHORT SEEK, to be described below. Regardless of whether the head is close enough to the destination track, the DSP pre-computes the low gain normalization factor (2240, FIG. 12) and the bias feedforward factor for block 2750 (FIG. 24). Control returns to the main loop, so that the SETTLE post processing routine may be executed.

The SHORT SEEK control routine. The SHORT SEEK control routine begins by setting the analog-to-digital converter to a low gain, and by sampling and processing the raw sample therefrom. The measurement is scaled, and the COARSE STATIC WINDOW subroutine (described below) is executed. The observer output equations are calculated.

Then, in accordance with FIG. 25, the DSP determines whether the positional error signal is in the linear range. If the PES is in the linear range, the control vector is set to LOW GAIN TRACKING and control passes to the LOW GAIN TRACKING control routine, at the point at which the linear control effort is generated.

However, if the positional error signal is not in the linear range yet, the reference velocity end control effort $u(k)$ are generated in accordance with the intermediate seek length compensator 2760 (FIG. 24). The control effort is appropriately scaled and output to the digital-to-analog converter to control the plant. The observer update equations are then calculated.

The DSP then determines whether the head is too far from the destination track for the SHORT SEEK control routine.

If the destination should for some reason be too far away from the present location of the head, the PÊS and VÊL states are appropriately scaled based on the current resolution mode (coarse, mid, or fine), and the control vector is set to the SEEK control routine. In any event, the DSP pre-computes the low gain normalization factor and the bias feedforward quantity before returning to the main loop.

The LOW GAIN TRACKING control routine. This control routine is used for mid resolution, linear control during low gain tracking. First, the analog-to-digital converter is set to low gain and the raw sample output therefrom is input. Sample integrity tests are performed, in accordance with the measurement scaling, COARSE STATIC WINDOW and FINE DYNAMIC WINDOW shown in FIG. 20A. Then, the observer output equations are calculated.

Next, the DSP determines whether the positional error signal is in the linear range, determined by the transfer function illustrated in FIG. 25. If the positional error signal is not in the linear range, the control vector is set to SHORT SEEK, and the SHORT SEEK control routine is entered at an entry point beginning with the generation of the reference velocity and control effort.

However, if the positional error signal is in the linear range, control remains in the LOW GAIN TRACKING control routine. The control effort, which is a linear control effort, is generated. The control effort is appropriately scaled and output to the digital-to-analog converter. Then, the observer update equations are computed.

The window functions are then executed, each in a manner to be consistent with FIGS. 23A, 23B and 23C. The integrator window, the read window, the write window, and the high gain window are calculated. Finally, the low gain normalization factor is pre-computed before control passes to the main loop for execution of a suitable post processing routine (normally the SETTLE post processing routine).

The HIGH GAIN TRACKING control routine. The HIGH GAIN TRACKING routine is used for high resolution, linear control during high gain tracking, and corresponds to the scenario when the head is stably positioned over the center of the track.

First, the analog-to-digital converter is set to high gain, and the raw sample output therefrom is received by the DSP. The sample integrity tests are performed, in accordance with the coarse static window calculator 2420 and fine dynamic window calculator 2430. The observer output equations are calculated, and the linear control effort u(k) is generated, scaled, and output to the digital-to-analog converter. The observer update equations are computed, and the READ WINDOW, WRITE WINDOW, and LOW GAIN WINDOW routines are executed. Because the integrator window is relatively large, the integrator window routine need not be called. Finally, the DSP pre-computes the low gain normalization factor before control returns to the main loop for execution of a suitable post processing routine (normally the TRACK post processing routine).

SUBROUNTINES. The control routines commonly call various subroutines which implement are lower-level functions.

For example, each time the control system of FIG. 12 is invoked, the servo sample and timing test is executed. In this block 205, the sample period is measured, by determining the time transpired since the most recent confirmed servo field was read. It is possible that the input detection circuitry may falsely detect a servo field when in fact the head has not yet encountered the subsequent servo field. In this case, the servo sample timing test 205 prevents execution of the rest of the functional blocks in FIG. 12, returning to await a servo field within an expected time window after the previous confirmed servo field.

Alternatively, the time window during which the subsequent servo field is expected to be detected may pass without such detection. Such an occurrence is normally detected by the non-occurrence of a synchronization field within the expected time window. In this event, the system may generate a "dummy" synchronization signal to allow the functional blocks in FIG. 12 to be executed in the "freewheel" mode in which the servo controller operates based on predictions from the full state observer 250.

Similarly, at the output of the DSP, routines must be used to output the control effort u(k) to the digital-to-analog converter (DAC). In the event that the DAC input word is smaller than the potential magnitude of u(k), u(k) must be clamped to prevent DAC overflow. In this event, FIG. 24 would be modified so that the output of adder 2766 passes through a clamping block before being output as u(k). The first interim control effort signal u'(k) is then determined as u(k) minus both the control efforts on paths 2749 and 2751. In those situations when the output control effort is clamped, the power amplifier saturation model must be appropriately scaled as well. As will readily be appreciated by those skilled in the art, these subroutines are highly dependent on the analog-to-digital and digital-to-analog converters placed at the input and output of the digital signal processor. However, the low level of these functions demonstrates that their implementation lies readily within the ability of those skilled in the art, based upon their choice of the converters.

The preferred COARSE STATIC WINDOW routine shown as block 2420 (FIG. 20A) operates in the following manner.

First, the absolute value of the difference between the linear extended positional error signal $PES_{LE}$ and the predicted positional error signal $PES_P$ is determined. If the absolute value is less than a given clamped value, the spurious sample flag is cleared (assuming it was set in a previous sample period), a spurious sample counter is set to an initial value, and control returns to the calling routine.

If, however, the absolute value determined above is not less than the clamped value, the DSP determines whether the spurious sample flag has been set in a previous sample period. If the spurious sample flag is set (indicating the present sample is the second spurious sample in a row), control returns immediately to the calling routine. However, if the spurious sample flag is not set, the observer is run open loop during this sample, with $PES_1$ being set equal to the predicted PES value, $PES_P$. Then, the spurious sample counter is decremented and checked for expiration. If the spurious sample counter has not expired, control returns immediately to the calling routine. If the spurious sample has expired, the spurious sample flag and the spurious sample counter are set, before control returns to the calling routine.

Briefly, the purpose of the steps starting with determination of whether the spurious sample flag is set, is to ensure that the predicted value $PES_P$ is used only a certain number of times (for example, five times); thereafter, the measured value $PES_{LE}$ should be used, on the assumption that the initially suspect measured values are indeed correct and the predicted values no longer track the head's true position.

The preferred FINE DYNAMIC WINDOW routine, illustrated as block 2430 (FIG. 20A) operates as follows.

First, the DSP determines whether the absolute value of the difference between the positional error signal minus the predicted value $PES_P$, is less than a clamp value. If the absolute value of this difference is less than the clamp value, then the spurious sample flag is cleared and the spurious sample counter is set before immediately returning to the calling routine. If, however, the absolute value of the difference is not less than the clamp value, the DSP determines whether the spurious sample flag is set during a previous sample period. If the spurious sample flag is set, control returns immediately to the calling routine.

If, however, the spurious sample flag is not set, then the output of the fine dynamic window calculator $PES_2$ is set equal to the predicted state $PES_P \pm$ the clamp value, determined in accordance with FIG. 20B. The spurious sample counter is decremented and tested for expiration. If the spurious sample counter has not expired, control returns immediately to the calling routine. If, however, the spurious sample counter has expired, the spurious sample flag and the spurious sample counter are set, and control returns to the calling routine. This routine ensures that the predicted value is used for only a certain number of sample periods, determined by the spurious sample counter, before the measured value $PES_{LE}$ is selected in its place.

SETTLING WINDOW DETECTION ROUTINES. The settling window detectors 260 have been described in general terms with reference to FIGS. 23B, and 23C. However, to supplement that general description, the following descriptions of sequential methods are provided.

The INTEGRATOR window. The INTEGRATOR window determines when switch 2748 (FIG. 24) at the output of integral control effort block 2740 is open or closed. That is, this window determines whether the output of the integral control effort block contributes to a determination of the final control effort u(k) on path 112.

First, the DSP determines whether the positional error signal is outside the "high window". Here, the term "high window" denotes a magnitude greater than that of $X+(x_{HYST}/2)$ as shown in FIG. 23A. As a background, the PES may be outside the high window in the early parts of seeks. Even after it is less than the high window for a few measurements, the positional error signal may increase beyond the high window, for example, when the disk drive receives a physical shock.

If the positional error signal is greater than the high window, the settling counter is returned to its initial value, the switch 2748 is opened, and the integrator states saved when the heads were in a previous write window are now re-loaded into the integrator. Thereafter, control returns to the calling routine (LOW GAIN TRACKING or HIGH GAIN TRACKING).

If, above, it was determined that the positional error signal was not outside the high window, the DSP determines whether the integrator switch 2748 is on. If it is on, control returns to the calling routine. If the integrator switch is not on, the DSP then determines whether the positional error signal is inside the low window.

If the positional error signal is not in the low window, control returns immediately to the calling routine. If the positional error signal is within the low window, the settling counter is decremented, and the DSP then determines whether the settling counter has underflowed (indicating expiration of the counter's settling time; see FIG. 23A). If it has not expired (indicating not enough time has passed to verify stable settling), control returns immediately to the calling routine. However, if the settling counter has underflowed (indicating expiration of the settling counter's time, and therefore stable settling), the integrator switch is turned on, allowing the integrator's output to contribute to the control effort. Control then returns to the calling routine.

The READ WINDOW routine is preferably implemented as follows.

The READ WINDOW routine determines when the read flag should be set or cleared. The DSP reports the state of the read flag to the master, so that the master can intelligently issue commands to read at a proper time.

First, the READ WINDOW routine determines whether the positional error signal is within the "low window". As used herein, the term "low window" denotes a magnitude equal to $x-(x_{HYST}/2)$ as illustrated in FIG. 23A.

If the positional error signal is within the low window, the settling counter is decremented. If the settling counter has expired, control returns to the calling routine (LOW GAIN TRACKING or HIGH GAIN TRACKING). However, if the settling counter has expired, the read flag is set, indicating the settling of the positional error signal for a sufficient length of time to allow reading information from the track. After the read flag is set, control returns to the calling routine.

If, at the outset, the positional error signal is not within the low window, the settling counter is set to its initial value. Then, the DSP determines whether the positional error signal is within the high window. If the positional error signal is within the high window, control returns to the calling routine.

If, however, the positional error signal is not within the high window, the DSP clears the settling counter, as well as the read flag and write flag. Finally, the off track flag is set, indicating the heads are not sufficiently settled on the destination track to justify either a write or a read operation. Immediately after the appropriate flags are set, control returns tot he calling routine. These flags are used by the post processing routine to forward corresponding status information to the master.

The LOW GAIN WRITE WINDOW is preferably implemented as follows.

First, the LOW GAIN WRITE WINDOW routine checks to see whether the read flag is set. If the read flag is not set, it is assured that the positional error signal is outside the read window, and by implication outside the smaller write window. Therefore, the present routine clears the write flag, sets the write protection, and sets the off track bit before returning to the calling routine.

Assuming that the read flag is set, the DSP determines whether the PES is within the low window, $x-(x_{HYST}/2)$. If the positional error signal is within the low window, the spurious sample flag is set (if it was cleared in a previous sample), the states of the integrator 2740 are saved, and the settling counter is decremented.

Then, the DSP checks to see whether the settling counter has underflowed (expired). If it has not expired, the control returns to the calling routine immediately. However, if the settling counter has expired (indicating stable settling), the DSP disables the write protection, sets the read and write flags, and clears the seek flag before returning to the calling routine.

If, originally, the PES was not within the low window, the DSP sets the settling counter to its original value. Then, the DSP determines whether the positional error signal is within the high window. If the PES is within the high window, any spurious sample flag is reset and control is returned to the calling routine. If, however, the PES is not within the high window, the DSP determines whether a spurious sample flag has been set in the previous sample. If the spurious sample flag was not already set, the spurious sample flag is now set in the present routine, before returning to the calling routine. However, if the spurious sample flag was set in the previous sample, the write flag is cleared, the write protect bit is set, the offtrack bit is set, and control returns to the calling routine.

The HIGH GAIN WINDOW routine determines when to enter the high gain mode. First, the DSP determines whether the positional error signal is within the low window, $x-(x_{HYST}/2)$ in FIG. 23A. If the PES is not within the low window, the settling counter is set and control returns to the calling routine. If the PES is within the low window, the DSP determines whether the velocity state is beneath a predetermined threshold. If the velocity state is not smaller than the predetermined threshold, the settling counter is set and control returns to the calling routine.

If the velocity state is small enough, and the positional error signal is within the low window, the settling counter is decremented. If the decremented value of the counter indicates the settling time has expired, the control vector is set to HIGH GAIN TRACKING, described above, before control returns to the calling routine. If the settling counter has not expired, control returns immediately to the calling routine without setting the control vector to HIGH GAIN TRACKING.

The HIGH GAIN WRITE WINDOW routine is entered, assuming the controller is already in the high gain state. First, the read flag is checked. If the read flag is not set, the positional error signal is clearly not within the read window and therefore cannot be within the write window. Under these circumstances, the present routine immediately clears the write flag, enables the write protect, sets the offtrack flag and returns immediately to the calling routine.

If the read flag is set, the DSP determines whether the estimated positional error signal PÊS is inside the low write window. If PÊS is within the low write window, the spurious sample flag is cleared and the integrator states are saved in the event of a physical shock to the system in the near future. Then, the DSP determines whether the observer error output by adder 2550 (FIG. 22) is small enough. If the observer error is not small enough, control returns immediately to the calling routine. However, if the observer error is small enough (below a predetermined threshold), the DSP decrements the settling counter and determines whether it has expired. If the settling counter has not expired, control returns immediately to the calling routine. If, however, the settling counter has expired (indicating stable settling), the DSP disables the write protection, sets the read and write flags, and clears the seek flag before control returns to the calling routine.

If, originally, PÊS is not within the low write window, the settling counter is set to its initial value. The DSP then determines whether PÊS is within the high window. If it is within the high window (implying it is within the hysteresis zone), the spurious sample flag is cleared and control returns immediately to the calling routine. If, however, PÊS is not within the high window, the DSP checks to see whether the spurious sample flag has already been set, in the previous sample period. If the spurious sample flag is already set (indicating two consecutive spurious samples), the write flag is cleared to effectively write-protect the disk and control returns to the calling routine. If, however, the spurious sample flag has not already been set, the present routine sets the spurious sample flag to indicate the present PÊS is outside the high window, and control returns to the calling routine.

The LOW GAIN WINDOW routine include several tests, the routine determining if control should be changed to a low gain mode. This routine is designed for quickly and reliably detecting when an event has occurred to move the head off previously stable high gain tracking. In particular, any of several conditions will cause the controller to exit high gain mode. These conditions include:

1. If the positional error signal is at a maximum value two sample periods in a row, it is assumed that the positional error signal is saturated, indicating an actual positional error too great for the system to measure.

2. The processed positional error signal PES' on path 241 is extrapolated to saturate (exceed its maximum value) based on a very large estimated velocity VÊL. A large estimated velocity state indicates the plant is incapable of being controlled quickly enough to compensate for the anticipated saturation of the positional error.

3. The estimated positional error state PÊS is not within its window.

4. The concurrence of two conditions: (a) the processed positional error signal PES' is not within its window, and (b) the spurious sample flag is set, indicating the previous sample was beyond its window. These two conditions collectively confirm the hypothesis that the positional error is too large for high gain tracking.

5. The concurrence of two conditions: (a) the TrackID from the servo field is not the requested track, and (b) the spurious sample flag is set to indicate a previous sample was not within its window. Collectively, these two conditions indicate the head is not over the correct track.

6. The concurrence of two conditions: (a) the TrackID is measured as being one track different than the requested track, and (b) the positional error signal is at the saturation level. Collectively, these two conditions confirm the head is not over the requested track.

Before the low gain tracking mode is exited, the control vector is set to LOW GAIN TRACKING, the write flag is cleared, and the offtrack bit is set.

POST PROCESSING ROUTINES. Various post processing routines executed within block 166 (FIG. 13) are now described. The choice of which post processing routine is executed is determined by the most recent setting of a post processing vector prior to entry into block 166. The post processing vector may be determined, for example, in either block 167 (during a command routine), in block 165 (during a control routine), or within block 166 (during a previous post processing routine).

PARK. The PARK post processing routine is used to monitor the progress of a "park heads" command execution, described above. First, the DSP determines whether the park process has been completed. If it has been completed, control returns to the main loop. If the park has not been completed, the DSP determines whether the actuator has reached the hypothetical "destination track", track 1300. If "track 1300" has not been reached, a timeout counter is checked for expiration. If the timeout counter has expired, or if the actuator has reached track 1300, then a variety of functions are performed before returning to the main loop. However, if it was determined that the timeout counter has not expired, control returns immediately to the main loop.

The functions which are performed before returning to the main loop, if the actuator has reached destination track 1300 or the timeout counter has expired, include setting the control effort to an open loop bias toward the inner diameter end stop of the disk drive. Both the control vector and the post processing vector are set to NOP, the "no operation" routine which involves an immediate return to the calling routine without any processing. The command status is set to "park complete" for forwarding to the master.

LOAD HEAD. The LOAD HEAD post processing routine is used to monitor the system during head load operations. Briefly, the LOAD HEAD routine involves incrementing actuator current in an open loop fashion until the actuator is biased out of its park position toward a track close to the outer diameter, such as track 100.

The LOAD HEAD routine begins with a determination of whether the load is complete. This determination is made by reference to whether the head is stably positioned within the read window of track 100, for example. If the load is complete, based on this criteria, control returns immediately to the main loop. If, however, the load is not complete, the DSP determines whether the servo is still operating in an open loop fashion. If the servo is not operating in an open loop fashion, the system passes to a "closed loop portion" of the LOAD HEAD routine, that portion to be described below.

When the load is determined not to be complete, and the servo is determined to be operating in an open loop fashion, the DSP then determines whether there have been ten consecutive good synchronization signals received. In this case, indicating it is safe to begin operation in closed loop mode, the destination track is set equal to 100 and the SEEK command routine, described above, is entered at the place where the tracking status is reset.

If, however, the DSP determines that there have not been ten good synchronization signals in a row, the open loop current biasing the actuator toward the outside diameter is incremented upward, and the current level compared to a maximum value. If the current level has not yet reached the maximum value, control returns immediately to the main loop to allow the new, higher level of current to have an effect on the actuator.

If, however, the current level has reached the maximum value, the DSP indicates a "head load failure" command status for forwarding to the master, and applies open loop bias toward the inside diameter stop to attempt to park the actuator before returning to the main loop.

The "closed loop portion" of the LOAD HEAD routine includes the following steps. First, the DSP determines whether the load is complete, such as determining whether the heads have settled stably within the read window of track 100. If the load is complete, the DSP indicates "head load complete" status for the master, and returns immediately to the main loop.

If, however, the load is not indicated as complete based on this criterion, the DSP determines whether the timeout counter has expired. If the timeout counter has not expired, control returns to the main loop immediately. If, however, the timeout counter has expired, the destination track is incremented from 100 on the assumption that something was wrong with track 100 but that the LOAD HEAD routine has not yet been deemed a failure. To ensure that this process of incrementing the destination track does not go on indefinitely, the DSP determines whether the destination track has grown too large (for example, greater than track 105). If the destination track is not too large, control is passed to the portion of the SEEK command routine beginning where the command status is reset. If the destination track has become too large, the DSP indicates "head load failure" to the master, and applies open loop bias toward the inner diameter stop in the disk drive to attempt to park the heads, before returning to the main loop.

SETTLE. The SETTLE post processing routine is used to monitor the settling status for seeks and for head selects. The SETTLE post processing vector is selected during the initial portion of the SEEK command routine described above.

First, the DSP determines whether there has been a change in the status of the read or write windows. That is, the DSP determines whether a read or write window has been exited or entered since the last time the status was checked. If there is no change in the status of the read window or write window, control returns immediately to the calling routine.

If, however, there is a change in status of the read window or write window, any previous offtrack status for the master is cleared, and the new tracking status is indicated to the master. Then, the DSP determines whether the head has settled within the write window. If the head is not settled within the write window, control returns immediately to the calling routine.

If, however, the head has settled within the write window, the post processing vector is set to TRACK, on the principle that the write window is the narrowest window, guaranteeing the head is stably settled over track center. After the post processing vector is set to TRACK, control returns to the calling routine.

As described above, the SETTLE post processing routine is invoked when the SEEK control routine sets the post processing vector to SETTLE. Thus, the SETTLE routine is repeatedly invoked during the sample periods of the first portion of seeks. When the head has stably settled over center track, the post processing vector is set to TRACK for the remainder of the seek.

TRACK. The TRACK post processing routine begins with a determination of whether there is a change in the status of the read window or the write window, analogous to the test performed in the SETTLE post processing routine. If there is no change in these status, control returns immediately to the calling routine. If, however, there has been a change in the status of the read window or write window since the last status check, any previous offtrack status for the master is cleared, a new tracking status is sent to the master, and control is returned to the calling routine.

CALIBRATION POST PROCESSING ROUTINES. Various calibration post processing routines are provided, corresponding to the calibration command routines described above. These include the bias calibration post processing routine, the normalization calibration poet processing routine, the offset calibration post processing routine, and the single track seek feedforward calibration post processing routine.

BIAS CALIBRATION. As described above, the piecewise linear bias feedforward controller is calibrated by averaging a plurality of measurements at a group of head positions distributed between the outside diameter and the inside diameter, as indicated in FIG. 27. Preferred sequential steps involved in collecting data, averaging them, and processing them to arrive at bias feedforward values, are now described.

The BIAS CALIBRATION post processing routine begins with a determination of whether calibration is complete. If the calibration is complete, control returns immediately to the calling routine. However, if calibration is not complete, processing continues as follows.

The DSP determines whether the head has settled within a write window. If the head has not settled within the write window, the settling timeout counter is checked to see whether it has expired. If the settling timeout counter has not expired, control returns immediately to the calling routine. However, if the write window has not been entered, and the settling timeout counter has expired, steps are taken to ensure that the system does not try indefinitely to attempt to average measured values. In this case, the bias force averager is cleared, the sample counter is reset, and the destination track is incremented for a subsequent attempt at bias calibration. If this incremented value of the destination track is too large, the command status is set to "calibration failure" for communication to the master, the DAC control effort is cleared, the control vector is set to NOP (no operation), and the heads are parked, before control is returned to the calling routine. However, if the incremented destination track is not too large, the SEEK command routine is entered at a point where the tracking status is reset.

If it was determined above that the head is within the write window, the bias force sample is contributed to the sum for the average, and a sample counter corresponding to the number of samples to be averaged is decremented. Then, the DSP determines whether the sample count has expired, returning to the calling routine if it has expired. However, if the sample counter has not expired, the DSP determines whether the present data point is a first data point taken.

If this is not the first data point taken, the slope and the Y-intercept between the current measurement and the previous measurement is computed, the slope and Y-intercept then being stored in a table. If this is only the first data point taken, the computation and storage steps described immediately above are skipped.

Then, the DSP determines whether this is the last sample point. If this is the last sample point, the integrator is cleared and the bias feedforward switch is turned on. The command status is set to indicate "bias calibration complete" to communicate completion of the routine to the master before control returns to the calling routine.

If, however, this is not the last sample point, the current measurement is saved for a subsequent sample period, in anticipation that a slope and Y-intercept will have to be computed in the future. The bias force averager is cleared, and the sample counter is reset. Then, the destination track is incremented, and the SEEK command routine is entered at the point where the tracking status is reset.

LOW GAIN NORMALIZATION CALIBRATION. The LOW GAIN NORMALIZATION CALIBRATION post processing routine is implemented as follows. As described above with reference to FIG. 18B, various values are measured when the head is located at a plurality of positions between the outside diameter and the inside diameter of the disk, the values are averaged, and a linear least squares approximation to the processed averages is determined for each zone on the disk. The flow of operations may be as follows.

First, the DSP determines whether calibration is complete. If it is complete, control returns immediately to the calling routine. If it is not complete, processing continues as follows.

The DSP determines whether the head is within the write window and, if not, if the settle timeout counter has expired. If the head is within the write window and the settle timeout counter has not expired, control returns immediately to the calling routine. If, however, the head is not within the write window and the settle timeout counter has expired, the DSP takes actions to ensure that it does not try indefinitely to calibrate using a certain track which may be flawed in some way. In particular, the DSP clears the "A+B" accumulator, resets the sample counter, and increments the destination track so that a new track may be used for the normalization calibration. If the new, incremented destination track is not too large, control passes to the SEEK command routine at the point where the tracking status is reset. If the destination is too large, control passes to a "second portion" of the LOW GAIN NORMALIZATION calibration routine, described below.

Returning to the decision mentioned above, as to whether the head is within the write window, if the head is determined to be within the write window, another "A+B" dibit sample is contributed to the sum for the average, and a sample counter is decremented. The DSP then determines whether the sample counter has expired. If the sample counter has not expired, control returns immediately to the calling routine. However, if the sample counter has expired, the DSP computes $(A+B)_{REF}/(A+B)_{MEAS}$. The sample is saved in a table, along with a corresponding TrackID. If the new, incremented destination track number is not too large (indicating the edge of the zone has not been reached), the SEEK command routine is entered at the point where the tracking status is reset. If, however, the new, incremented destination track number is too large, the "second portion" of the LOW GAIN NORMALIZATION calibration routine mentioned above, is entered.

The "second portion" of the LOW GAIN NORMALIZATION calibration routine includes the following steps.

First, the DSP determines whether there are at least seven (for example) data points. If there are not yet seven data points, the command status is set to "low gain normalization calibration failure" for communication to the master. The control effort to the DAC is cleared, and the heads are parked. Finally, the requested track is set to the current track before control is returned to the calling routine.

If, however, it was determined that there are at least seven data points, processing in the LOW GAIN NORMALIZATION calibration routine may continue. Specifically, a least squares linear fit to the data points is computed, and the slope and Y-intercept for this head and zone are determined. With this portion of the calculations complete, the pointers for the sample buffers are reset, and the sample counter set to is initial value to prepare for decrementing in a subsequent iteration of the calibration loop.

Then, the DSP determines whether the inner zone (assuming there to be two zones) still needs to be performed for the present head. If it needs to be performed, the requested track is set to the zone boundary+20 and the maximum track is set to 1240, thus "bracketing" the zone. Then, the SEEK command routine is entered at the point where the tracking status is reset.

If, however, the DSP determines that the inner zone does not need to be performed for this head, a zone offset is added to the Y-intercept for the inner zone, to compensate for the difference in "Y-intercepts" between the left side and the right side of FIG. 18B. Then, the DSP determines whether the calibration process has been performed for all heads. If the process has not been completed for all heads, the head number is incremented, the requested track is set to 40, the maximum track is set to 760 to "bracket" the zone, and the SEEK command routine is entered at the point where the tracking status is reset.

If, however, the DSP determines that the calibration routine has been completed for all heads, the command status is set to "low gain normalization calibration complete" for communication to the master. A power amplifier gain is set to a nominal value and the requested track is set to the current track before returning to the calling routine.

INPUT OFFSET. The preferred INPUT OFFSET calibration post processing routine includes the following steps, made with reference to FIG. 17B. First, the DSP determines whether the calibration has been completed. If the calibration has been completed, control returns immediately to the calling routine.

If the calibration is not yet complete, processing continues as follows.

First, the DSP determines whether the head is within the write window and, if not, whether the settle timeout counter has expired. If the head is not within the write window but the settle timeout counter has expired, the DSP takes action on the assumption that it should not continue indefinitely trying to calibrate on a potentially flawed track. Specifically, the DSP sets the command status to "calibration failure" for communication to the master. The DSP clears the DAC control effort, and parks the heads. The control vector is set to NOP (no operation) before control is returned to the calling routine.

If, however, the DSP determines that the head is not within the write window but the settle timeout counter has not yet expired, control returns immediately to the calling routine without executing the aforementioned steps.

If it was determined above, that the head was within the write window, the DSP then determines whether this is an offset calibration sector. As described above, in the preferred embodiment, every tenth sector is an offset calibration sector, meaning that the dibits in the $PES_F$ region of the servo field (FIG. 16) are located on the same side of track center, rather than on opposite sides of track center. If this is not a calibration sector, the dibits should effectively be ignored. The DSP determines whether this sector is one immediately preceding an offset calibration sector. If it is not a sector immediately preceding an offset calibration, control returns to the calling routine immediately. If, however, the DSP determines that the present sector immediately precedes an offset calibration sector, the DSP sets a "freewheel next sector" bit to ensure that, during execution of the next control routine, the freewheel mode is entered so that the offset dibits, being on the same side of track center (FIG. 17B), do not contaminate the tracking function which should be performed only after encountering a servo field with dibits on opposite sides of track center (FIG. 5B). After the "freewheel next sector" bit is set, control returns to the calling routine.

If, above, it was determined that the present sector is an offset calibration sector, a positional error signal is added to the offset accumulator, and a sample counter is decremented. The DSP then determines whether this is the last sample to be taken. If not, control returns immediately to the calling routine. However, if this is determined not to be the last sample, the value in the offset accumulator is divided by the sample count, thus arriving at an average. The result of this division is stored in an offset variable, completing the calculation portion of the calibration. Finally, the command status is set to "offset calibration complete" for communication to the master, before control is returned to the calling routine.

SINGLE TRACK SEEK CALIBRATION. The preferred SINGLE TRACK SEEK FEEDFORWARD CALIBRATION post processing routine includes the following steps. Special reference is made to FIGS. 24, 26A, and 26B.

First, the DSP determines whether the calibration is complete. If the calibration is complete, control returns immediately to the calling routine. If the calibration routine is not yet complete, processing continues as follows.

The DSP determines whether the head is currently within the write window and, if not, whether the settle timeout counter has expired. Under these circumstances, the DSP acts on the assumption that an undue amount of time has been spent attempting to calibrate, and terminates the calibration routine early. Specifically, the DSP sets the command status to "calibration failure" to communicate to the master, and parks the heads before control returns to the calling routine. If, however, the DSP determines that the head is not within the write window but the settle timeout counter has not yet expired, a sector counter is incremented, and the present PES is contributed to an accumulated value before control is returned to the calling routine. The accumulation of the PES in this manner relates to the incrementing of the value of the cost function.

If, above, the DSP determines that the head is settled within the write window, processing continues as follows. The DSP determines whether there are more seeks to average, during this particular combination of parameters. If there are more seeks to average, the least significant bit of the requested TrackID is toggled, and the SEEK command routine is entered at the point where the tracking status is reset. Toggling the least significant bit of the requested TrackID causes a subsequent seek to be executed in a direction opposite that of the present seek.

If, above, it was determined that no more seeks are to be averaged for this particular combination of parameters (acceleration and deceleration pulse magnitude and duration), the DSP computes the performance measure for both seek directions. The performance is measured as a function of the sector counter (indicating the time required to enter the write window). The performance is also measured as a function of the accumulated PES, which corresponds to a calculation of the cost function.

Also, the DSP compares the performance measures for both seek directions to the previously stored best performance measures as determined by the minimal cost function previously calculated. Based on the comparative performance, the DSP determines whether the present inward seek or outward seek performance are better than the previously stored measures. If the present performance is better, the present performance measures are saved, as are the particular pulse configurations (acceleration pulse duration and height deceleration pulse duration and height). Of course, if the present performance measures are inferior to those previously determined to be the previous best performance measures, the present performances and pulse characterizations are not stored.

Then, the DSP determines whether there are any more feedforward combinations to try in this zone. If there are more combinations to try, the DSP alters the feedforward pulse combination (one of the pulse duration or pulse height parameters). The DSP clears the sector counters for seeks in both directions, as well as the PES accumulator for both directions. The seek counter is set to its initial value and the least significant bit of the requested track is toggled so as to allow seeking in a direction opposite to that of the present seek. Then, the SEEK command routine is entered at the point where the tracking status is reset.

If, above, the DSP determines that there are no more feedforward combinations to try in this zone, the DSP determines whether there are any more zones on the entire disk to calibrate. If there are more zones to calibrate, the destination track is set to a single track seek calibration in the next zone, and the SEEK command routine is entered at the point where the tracking status is reset.

If, however, the DSP determines that there are no more zones to do, it sets the command status to "single track seek calibration complete" for communication to the master. The single track seek feedforward block, previously having its output disconnected from the system, is activated for use during operation. Finally, control returns to the calling routine.

Conclusion. Modifications and variations of the above-described embodiments of the present invention are possible, as appreciated by those above skilled in the art in light of the above teachings. It is therefore to be understood that, within the scope of the appended claims and their equivalents, the invention may be practiced otherwise than as specifically described. In particular, terms such as device, system, compensator, block, and so forth, need not be implemented in the manner described above to fall within the scope of the invention, but are meant to encompass anything which could reasonably be interpreted as falling within the language of the claims.

What is claimed is:

1. In an information storage apparatus having a reading device for reading information from a recording medium, an arrangement for compensating for variations of gain of the reading device as a function of its position relative to the recording medium, the arrangement comprising:
   a) means for receiving the signals from the reading device; and
   b) means for adjusting a gain that is applied to the signals from the reading device when the reading device is positioned with respect to the recording medium so as to have a gain which varies substantially non-linearly with position, the means for adjusting including:
      b1) a calibrated portion which has been calibrated during a calibration process and which, after the calibration process, adjusts the gain that is applied to the signals by processing the signals through a parameterized transfer function,
   wherein:
      1) the parameterized transfer function is defined by a small number of parameters which are based on calibrated values which were determined during the calibration process and which vary as a function of the position of the reading device relative to the recording medium, and
      2) the calibrated values used for forming the small number of parameters are determined by dividing a reference value by a measured value.

2. The arrangement of claim 1, further comprising:
   second means, for adjusting the magnitude of signals from the reading device when the reading device is positioned with respect to the recording medium so as to have a gain which varies substantially linearly with position.

3. The arrangement of claim 1, wherein:
   the reference value is a predetermined value determined in accordance with an addition of signals derived from dibit pairs; and
   the measured value is a sum of two measured dibit signals currently read through the reading device.

4. The arrangement of claim 1, wherein the adjusting means includes:
   a low gain normalization multiplication portion; and
   a low gain normalization calibration portion for determining a value by which the low gain normalization multiplication portion multiplies a measured positional error signal, in response to a path identification signal which reflects the position of the reading device with respect to the recording medium.

5. The arrangement of claim 4, wherein:
   the low gain normalization calibration portion includes a set of values constituting a piecewise linear approximation to values of the quotient of the reference value and the measured value; and
   different pieces of the piecewise linear function approximate compensation provided in different zones of the recording medium.

6. The arrangement of claim 5, wherein:
   values used by the low gain normalization calibration portion constitute least mean square approximations of averages of quotients of reference sums to measured sums; and
   the low gain normalization calibration portion provides parameters which indicate slope and intercept values to form a normalization value by which the measured positional error signal is multiplied by the low gain normalization multiplication portion.

7. In an information storage apparatus having a reading device for reading information from a recording medium, an arrangement for compensating a reading response of the reading device as a function of its position relative to a track of information in the recording medium, the arrangement comprising:
   a) means for receiving the signals from the reading device; and
   b) means for adjusting a gain that is applied to the signals from the reading device after a calibration process by processing the signals through a parameterized transfer function including a small number of parameters which are based on calibrated values which were determined during the calibration process and which vary as a function of the position of the reading device relative to the track of information, the means for adjusting including means for varying, wherein:
      1) the means for varying varies the transfer function substantially linearly with relative position, when the reading device is within a range about the track; and
      2) the means for varying varies the transfer function with relative position in a manner which is not substantially linear, when the reading device is beyond the range.

8. In an information storage apparatus having a reading device for reading information from a recording medium, an arrangement for compensating for variations in gain of the reading device as a function of its position relative to the recording medium, the arrangement comprising:
   a) first means, for adjusting a gain that is applied to signals from the reading device when the reading device is positioned with respect to the recording medium so as to have a gain which varies substantially linearly with position; and
   b) second means, for adjusting a gain that is applied to signals from the reading device when the reading device is positioned with respect to the recording medium so as to have a gain which varies substantially non-linearly with position, the second means including:
      b1) a calibrated portion which has been calibrated during a calibration process and which includes means for adjusting the gain that is applied to of the signals after the calibration process by processing the signals through a parameterized transfer function, the parameterized transfer function being defined by a small number of parameters which are based on calibrated values which were determined during the calibration process;
   wherein:
      1) each of the calibrated values is determined by dividing a reference values by a measured value; and
      2) the calibrated values vary as a function of the position of the reading device relative to the recording medium.

9. The arrangement of claim 8, wherein:
   the reference value is a predetermined value determined in accordance with an addition of signals derived from dibit pairs; and
   the measured value is a sum of two measured dibit signals currently read through the reading device.

10. The arrangement of claim 8, wherein the second adjusting means includes:

a low gain normalization multiplication portion; and a low gain normalization calibration portion for determining a value by which the low gain normalization multiplication portion multiplies a measured positional error signal, in response to a path identification signal which reflects the position of the reading device with respect to the recording medium.

11. The arrangement of claim 10, wherein:

the low gain normalization calibration portion includes a set of values constituting a piecewise linear approximation to values of the quotient of the reference value and the measured value; and different pieces of the piecewise linear function approximate compensation provided in different zones of the recording medium.

12. The arrangement of claim 11, wherein:

values used by the low gain normalization calibration portion constitute least mean square approximations of averages of quotients of reference sums to measured sums; and the low gain normalization calibration portion provides parameters which indicate slope and intercept values to form a normalization value by which the measured positional error signal is multiplied by the low gain normalization multiplication portion.

13. In an information storage apparatus having a reading device for reading information from a recording medium, an arrangement for compensating a reading response of the reading device as a function of its position relative to a track of information in the recording medium, the arrangement comprising:

a) means for receiving the signals from the reading device; and b) means for adjusting the magnitude of the signals from the reading device by multiplying them by calibrated values, the calibrated values collectively defining a transfer function varying as a function of the position of the reading device relative to the track of information, the means for adjusting including means for varying;

wherein:

1) the means for varying varies the transfer function substantially linearly with relative position, when the reading device is within a range about the track;

2) the means for varying varies the transfer function with relative position in a manner which is not substantially linear, when the reading device is beyond the range;

3) the means for adjusting includes a portion for storing the transfer function values, the values falling in first and second regions;

4) the first region has:

4a) a first sub-region in which values of the transfer function vary linearly as a function of the position of the reading device, the first sub-region being disposed about a zero point of the positional error signal; and 4b) a second sub-region in which values of the transfer function vary non-linearly as a function of the position of the reading device, the second sub-region disposed further from the zero point of the positional error signal than the first sub-region; and 5) a second region in which the reading device provides information which does not reflect the position of the reading device because the reading device is substantially saturated.

14. The arrangement of claim 13, wherein:

the transfer function in the second sub-region varies as a second order equation as a function of the positional error signal.

15. The arrangement of claim 13, wherein:

the output of the transfer function in the second region is substantially identical to the positional error signal input to the means for adjusting, so that the means for adjusting does not adjust the magnitude of the signals from the reading device when the reading device is substantially saturated.

* * * * *